United States Patent
Yi et al.

(10) Patent No.: US 12,457,588 B2
(45) Date of Patent: Oct. 28, 2025

(54) HIGH FREQUENCY TIME DOMAIN RESOURCE ALLOCATION

(71) Applicant: Ofinno, LLC, Reston, VA (US)

(72) Inventors: Yunjung Yi, Vienna, VA (US); Esmael Hejazi Dinan, McLean, VA (US); Jonghyun Park, Syosset, NY (US); Hyoungsuk Jeon, Centreville, VA (US); Ali Cagatay Cirik, Chantilly, VA (US); Hua Zhou, Vienna, VA (US); Nazanin Rastegardoost, McLean, VA (US)

(73) Assignee: Ofinno, LLC, Reston, VA (US)

( * ) Notice: Subject to any disclaimer, the term of this patent is extended or adjusted under 35 U.S.C. 154(b) by 451 days.

(21) Appl. No.: 17/694,322

(22) Filed: Mar. 14, 2022

(65) Prior Publication Data
US 2022/0295484 A1 Sep. 15, 2022

Related U.S. Application Data

(60) Provisional application No. 63/161,100, filed on Mar. 15, 2021.

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC ............. H04W 72/0446; H04W 72/23
See application file for complete search history.

(56) References Cited

U.S. PATENT DOCUMENTS 11,844,147 B2 * 12/2023 Noh .................. H04L 5/0092
2021/0321446 A1 * 10/2021 Lee .................. H04W 72/0446
2022/0159700 A1 * 5/2022 Maleki ................ H04W 72/12

OTHER PUBLICATIONS

R1-2100061; 3GPP TSG RAN WG1 #104-e; e-meeting, Jan. 25-Feb. 5, 2021; Source: Lenovo, Motorola Mobility; Title: PDSCH/PUSCH scheduling enhancements for NR from 52.6 GHz to 71GHz; Agenda Item: 8.2.5; Document for: Discussion.
R1-2100644; 3GPP TSG RAN WG1 Meeting #104-e; e-Meeting, Jan. 25-Feb. 5, 2021; Source: Intel Corporation; Title: Discussion on PDCCH monitoring enhancements for extending NR up to 71 GHz; Agenda item: 8.2.2; Document for: Discussion/Decision.
(Continued)

*Primary Examiner* — Charles C Jiang
*Assistant Examiner* — Margaret Marie Anderson
(74) *Attorney, Agent, or Firm* — Xin Gao; Kavon Nasabzadeh; Jacob L. Mangan

(57) ABSTRACT

A wireless device may receive one or more configuration parameters indicating entries of a time domain resource allocation table and one or more scheduling offsets. Each entry of the entries may comprise a respective slot offset. The wireless device may receive downlink control information (DCI) indicating a first entry of the entries and a first scheduling offset of the one or more scheduling offsets. The wireless device may receive downlink data in a first slot determined based on a slot offset of the first entry and the first scheduling offset.

20 Claims, 34 Drawing Sheets

(56) References Cited

OTHER PUBLICATIONS

R1-2100820; 3GPP TSG RAN WG1#104-e; e-Meeting, Jan. 25-Feb. 5, 2021; Agenda Item: 8.2.5; Source: Spreadtrum Communications; Title: Discussion on PDSCH and PUSCH enhancements for above 52.6GHZ; Document for: Discussion and decision.
R1-2101373; 3GPP TSG RAN WG1 #104-e; e-Meeting, Jan. 25-Feb. 5, 2021; Agenda Item: 8.2.2; Source: Apple Inc.; Title: PDCCH monitoring enhancements for NR between 52.6GHz and 71 GHz; Document for: Discussion/Decision.
R1-2101376; 3GPP TSG RAN WG1 ⊇104-e; e-Meeting, Jan. 25-Feb. 5, 2021; Agenda Item: 8.2.5; Source: Apple Inc.; Title: PDSCH/PUSCH enhancements for NR between 52.6GHz and 71 GHz; Document for: Discussion/Decision.
R1-2101454; 3GPP TSG-RAN WG1 190 104-e; e-Meeting, Jan. 25-Feb. 5, 2021; Agenda item: 8.2.2; Source: Qualcomm Incorporated; Title: PDCCH monitoring enhancements; Document for: Discussion/Decision.
R1-2101457; 3GPP TSG-RAN WG1 #104-e; e-Meeting, Jan. 25-Feb. 5, 2021; Agenda item: 8.2.5; Source: Qualcomm Incorporated; Title: PDSCH and PUSCH enhancements for 52.6-71GHz band; Document for: Discussion/Decision.
R1-2101776; 3GPP TSG RAN WG1 Meeting #104-e; E-meeting, Jan. 25-Feb. 5, 2021; Source: Moderator (vivo); Title: Summary of PDSCH/PUSCH enhancements (Bandwidth/Timeline/Reference signals); Agenda item: 8.2.5; Document for: Discussion and decision.
R1-2101858; 3GPP TSG RAN WG1 #104-e; e-Meeting, Jan. 25-Feb. 5, 2021; Agenda Item: 8.2.5; Source: Moderator (LG Electronics); Title: Summary #2 of PDSCH/PUSCH enhancements (Scheduling/HARQ); Document for: Discussion and decision.
R1-2101874; 3GPP TSG RAN WG1#104-e; e-Meeting, Jan. 25-Feb. 5, 2021; Agenda Item: 8.2.2; Source: Moderator (Lenovo); Title: Feature lead summary for [104-e-NR-52-71GHZ-02] Email discussion/approval on PDCCH monitoring enhancements; Document for: Discussion, Decision.
R1-2101883; 3GPP TSG RAN WG1 Meeting #104-e; E-meeting, Jan. 25-Feb. 5, 2021; Source: Moderator (vivo); Title: Discussion summary #1 of [104-e-NR-52-71GHz-05]; Agenda item: 8.2.5; Document for: Discussion and decision.
R1-2101972; 3GPP TSG RAN WG1 #104-e; e-Meeting, Jan. 25-Feb. 5, 2021; Agenda Item: 8.2.5; Source: Moderator (LG Electronics); Title: Summary #3 of PDSCH/PUSCH enhancements (Scheduling/HARQ); Document for: Discussion and decision.
R1-2102072; 3GPP TSG RAN WG1 Meeting #104-e; E-meeting, Jan. 25-Feb. 5, 2021; Source: Moderator (vivo); Title: Discussion summary #2 of [104-e-NR-52-71GHz-05]; Agenda item: 8.2.5; Document for: Discussion and decision.
R1-2102080; 3GPP TSG RAN WG1 #104-e; e-Meeting, Jan. 25-Feb. 5, 2021; Agenda Item: 8.2.5; Source: Moderator (LG Electronics); Title: Summary #4 of PDSCH/PUSCH enhancements (Scheduling/HARQ); Document for: Discussion and decision.
R1-2102142; 3GPP TSG RAN WG1#104-e; e-Meeting, Jan. 25-Feb. 5, 2021; Agenda Item: 8.2.2; Source: Moderator (Lenovo); Title: Feature lead summary#2 for [104-e-NR-52-71GHz-02] on PDCCH monitoring enhancements; Document for: Discussion, Decision.
R1-2102192; 3GPP TSG-RAN WG1 Meeting #104-e; e-Meeting, Jan. 25-Feb. 5, 2021; Agenda item: 8.2; Title: Session notes for 8.2 (Study on supporting NR from 52.6 GHz to 71 GHZ); Source: Ad-hoc Chair (Ericsson); Document for: Endorsement.
R1-2102237; 3GPP TSG RAN WG1 Meeting #104-e; E-meeting, Jan. 25-Feb. 5, 2021; Source: Moderator (vivo); Title: Discussion summary #3 of [104-e-NR-52-71GHz-05]; Agenda item: 8.2.5; Document for: Discussion and decision.
R1-2102242; 3GPP TSG RAN WG1#104-e; e-Meeting, Jan. 25-Feb. 5, 2021; Agenda Item: 8.2.2; Source: Moderator (Lenovo); Title: Feature lead summary#3 for [104-e-NR-52-71GHz-02] on PDCCH monitoring enhancements; Document for: Discussion, Decision.

* cited by examiner

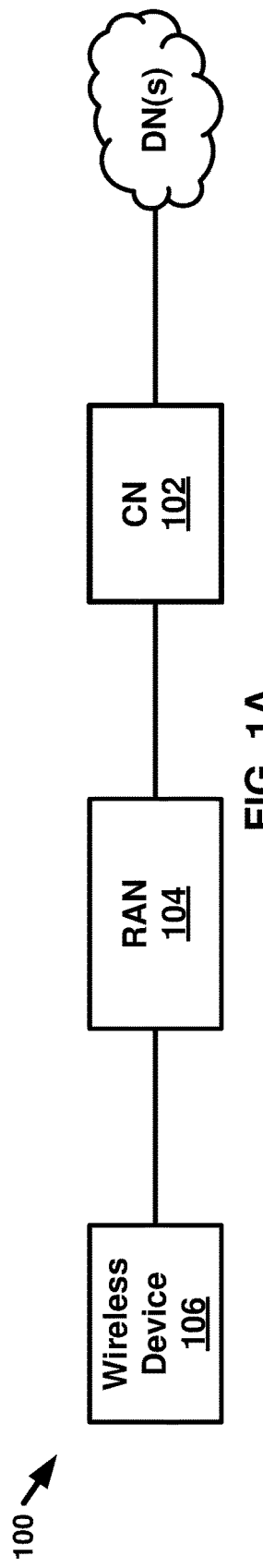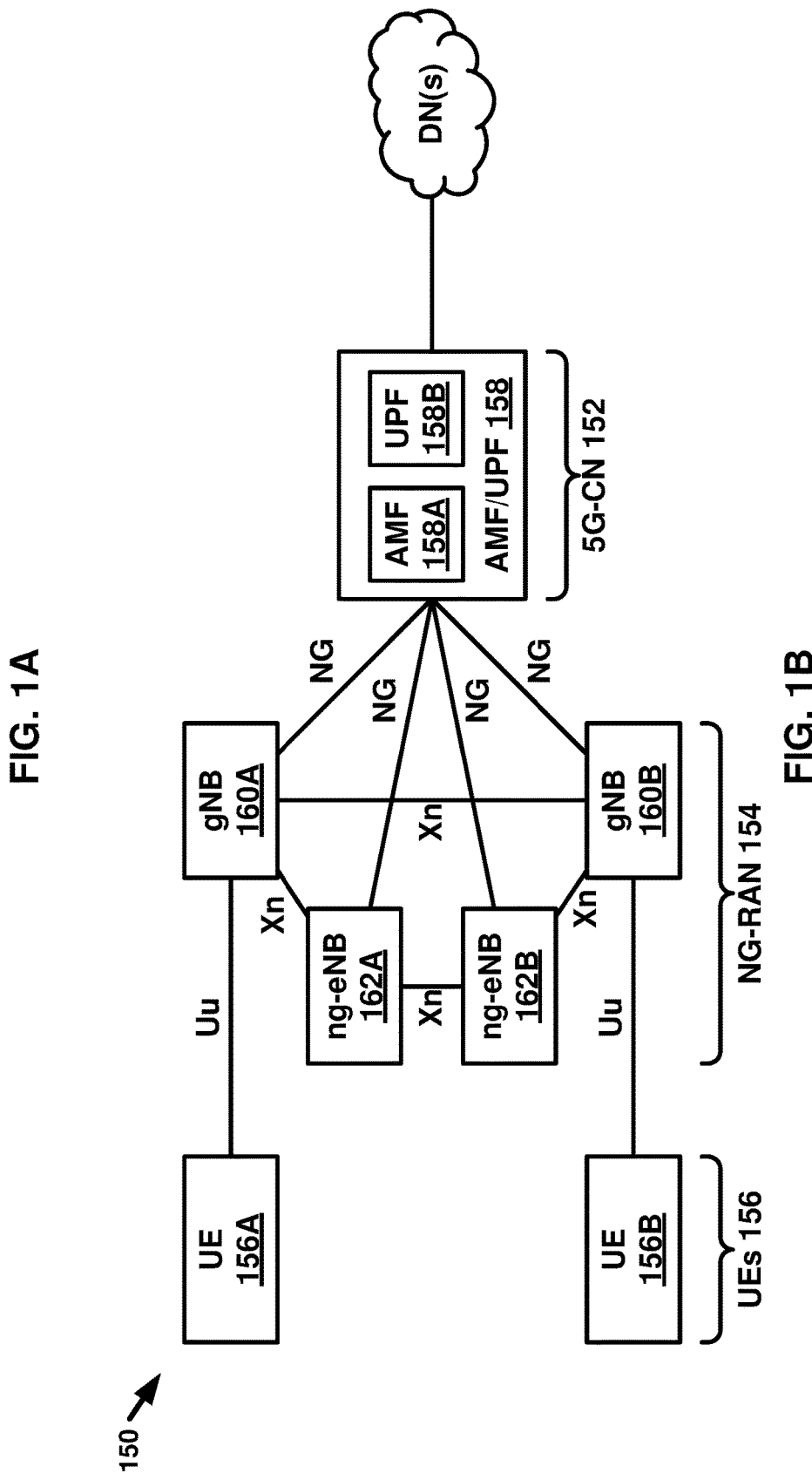

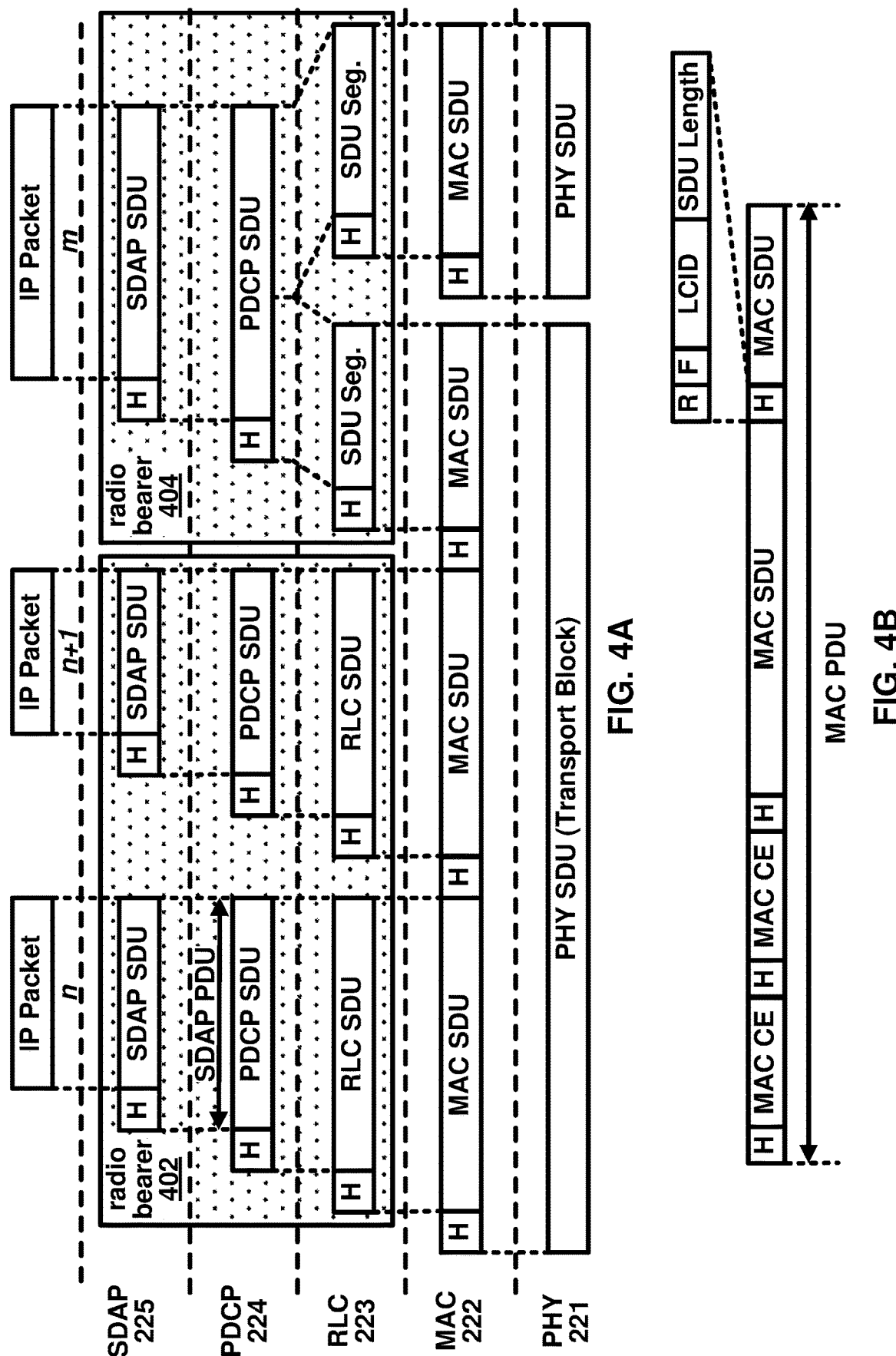

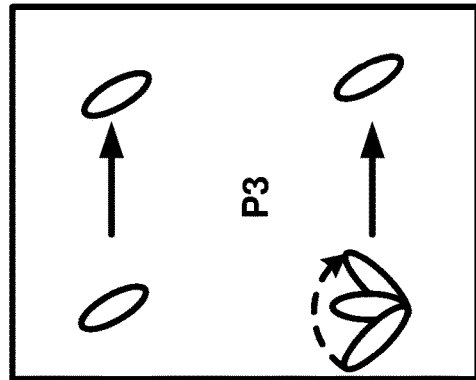
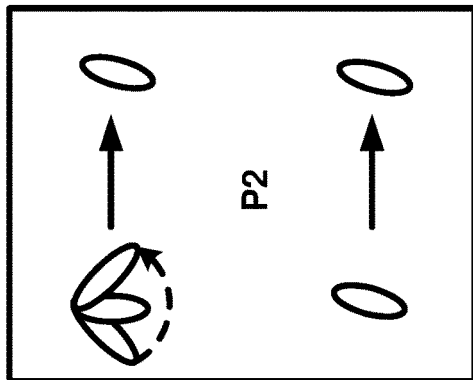
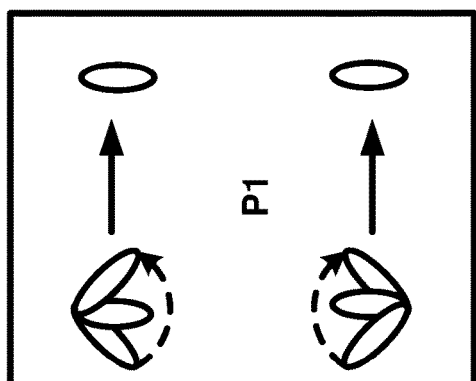
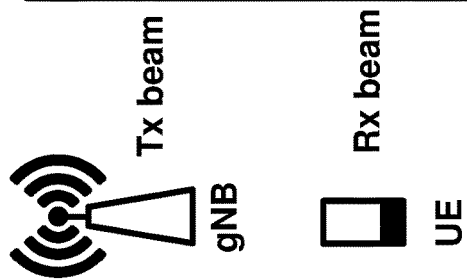
FIG. 12A
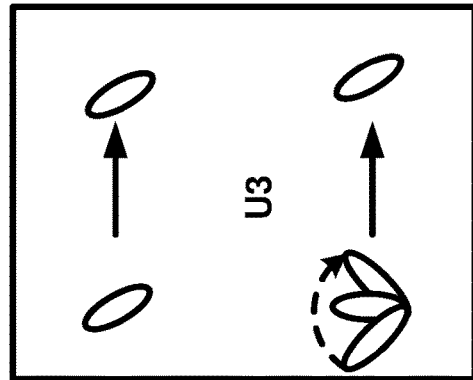
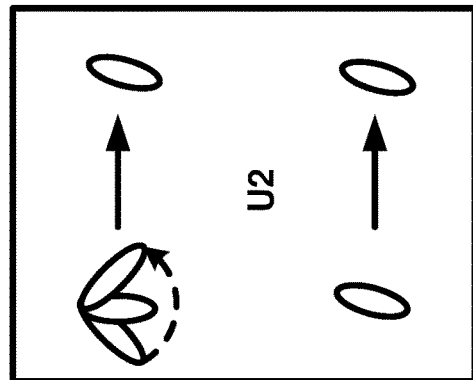
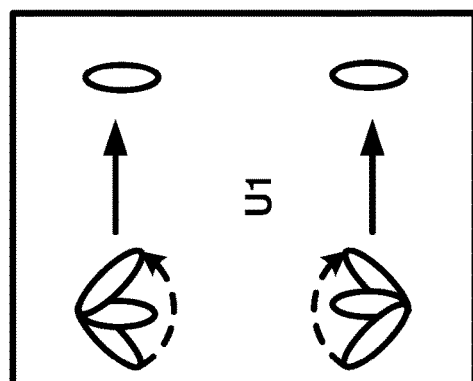
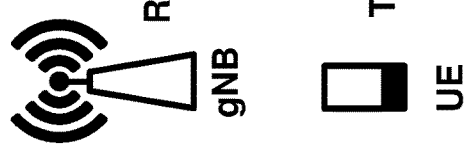
FIG. 12B

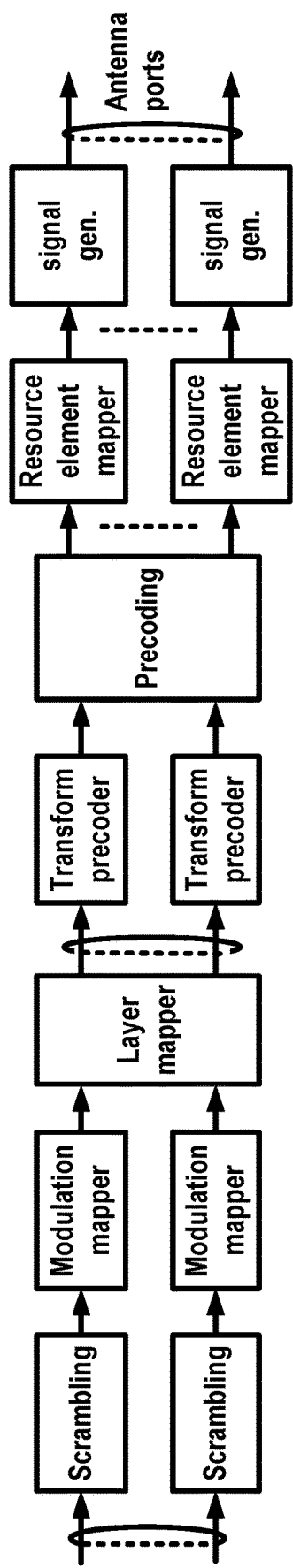
FIG. 16A
FIG. 16B
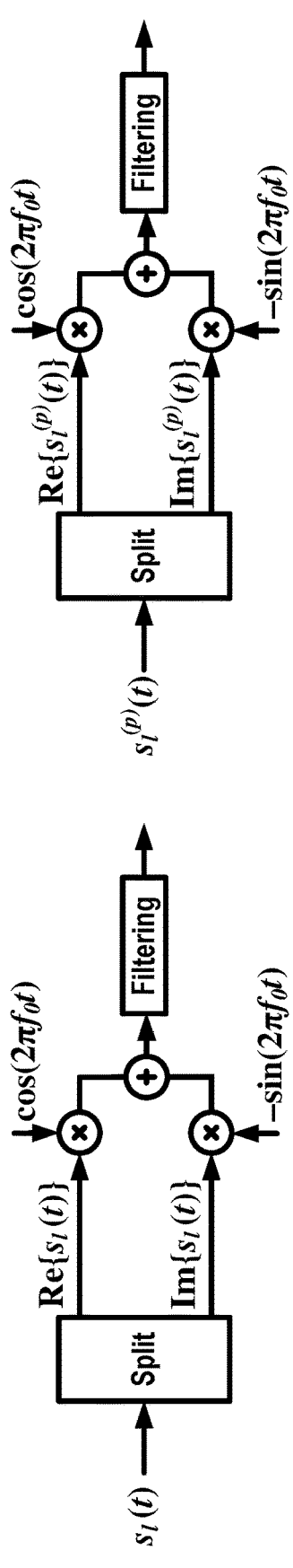
FIG. 16D
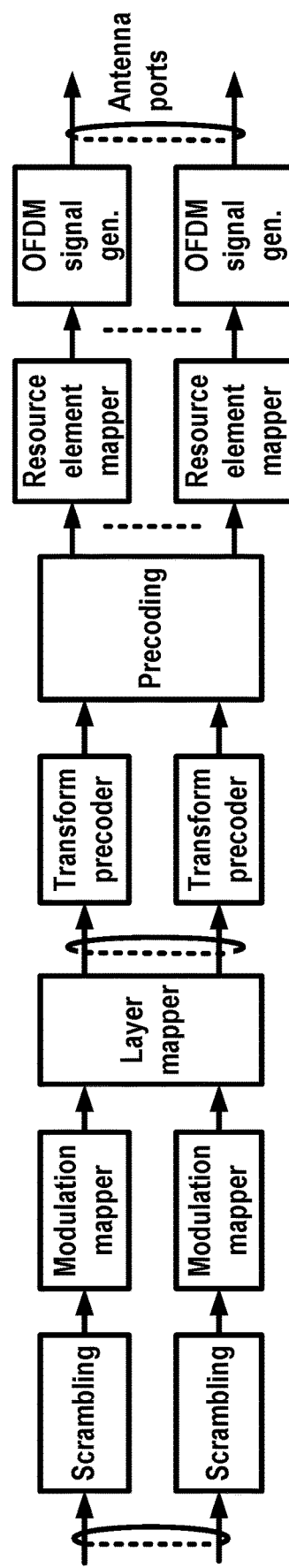
FIG. 16C

| DCI format | Usage |
| --- | --- |
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause [x.x] of [10, TS 38.473] |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

| Scheduling Cell | Scheduled Cell | Additional Scheduling Offset (ASO) |
|---|---|---|
| 15 kHz | 240 kHz | k1 |
| 15 kHz | 480 kHz | k2 |
| 15 kHz | 960 kHz | k3 |
| 30 kHz | 240 kHz | k4 |

· · ·

| | | |
|---|---|---|
| 240 kHz | 480 kHz | kp |
| 240 kHz | 960 kHz | kq |

FIG. 25

```
PUSCH-TimeDomainResourceAllocationList ::=    SEQUENCE (SIZE(1..maxNrofUL-Allocations))
OF PUSCH-TimeDomainResourceAllocation PUSCH-TimeDomainResourceAllocation ::=   SEQUENCE {
    k2                      INTEGER(0..32)
OPTIONAL,     -- Need S
    mappingType             ENUMERATED {typeA, typeB},
    startSymbolAndLength    INTEGER (0..127)
}

PUSCH-TimeDomainResourceAllocationList-r16 ::=   SEQUENCE (SIZE(1..maxNrofUL-
Allocations-r16)) OF PUSCH-TimeDomainResourceAllocation-r16

PUSCH-TimeDomainResourceAllocation-r16 ::=   SEQUENCE {
    k2-r16                  INTEGER(0..32)                    OPTIONAL,    --
Need S
    puschAllocationList-r16         SEQUENCE (SIZE(1..maxNrofMultiplePUSCHs-
r16)) OF PUSCH-Allocation-r16,
    ...
```

FIG. 28

```
PUSCH-SLIVList ::=  SEQUENCE (SIZE(1..maxNrofSLIVs)) OF PUSCH-SLIV
PUSCH-SLIV  ::= SEQUENCE {
    startSymbolAndLength              INTEGER (0..127)
}

PUSCH-TimeDomainResourceAllocationList-r17 ::=  SEQUENCE (SIZE(1..maxNrofUL-Allocations-r16)) OF PUSCH-TimeDomainResourceAllocation-r17

PUSCH-TimeDomainResourceAllocation-r17 ::= SEQUENCE {
    k2-r17                            INTEGER(0..196)              OPTIONAL,
    -- Need S
    puschAllocationList-r17                        SEQUENCE
(SIZE(1..maxNrofMultiplePUSCHs-r17)) OF PUSCH-SLIV,
    ...
}

PUSCH-SLIVList[0] = 0 (reserved)
```

FIG. 30

HIGH FREQUENCY TIME DOMAIN RESOURCE ALLOCATION

CROSS-REFERENCE TO RELATED APPLICATIONS

This application claims the benefit of U.S. Provisional Application No. 63/161,100, filed Mar. 15, 2021, which is hereby incorporated by reference in its entirety.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 17 illustrates an example of various DCI formats used for various purposes.

FIG. 25 illustrates an example of the list of the combinations as per an aspect of an embodiment of the present disclosure.

FIG. 28 illustrates example configuration parameters of a TDRA table as per an aspect of an embodiment of the present disclosure.

FIG. 30 illustrates an example embodiment as per an aspect of an embodiment of the present disclosure.

DETAILED DESCRIPTION

Figure 2A:
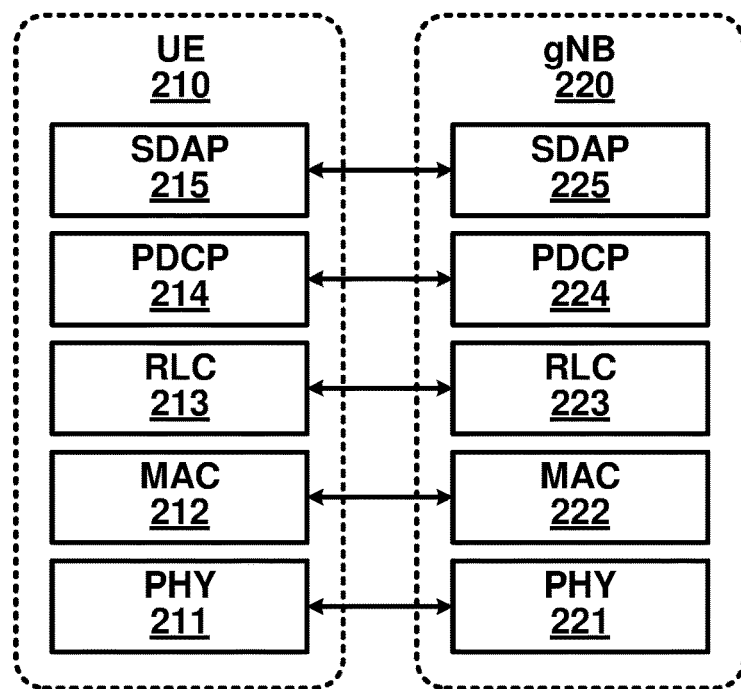
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
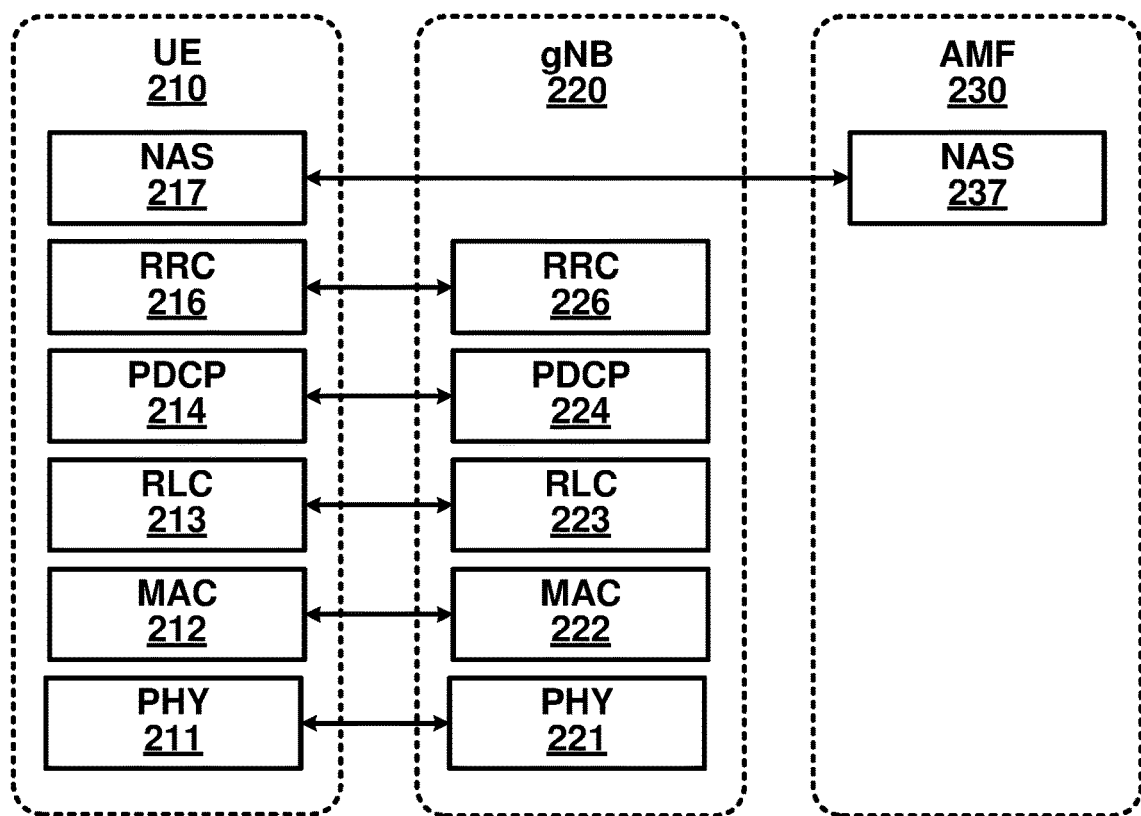

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
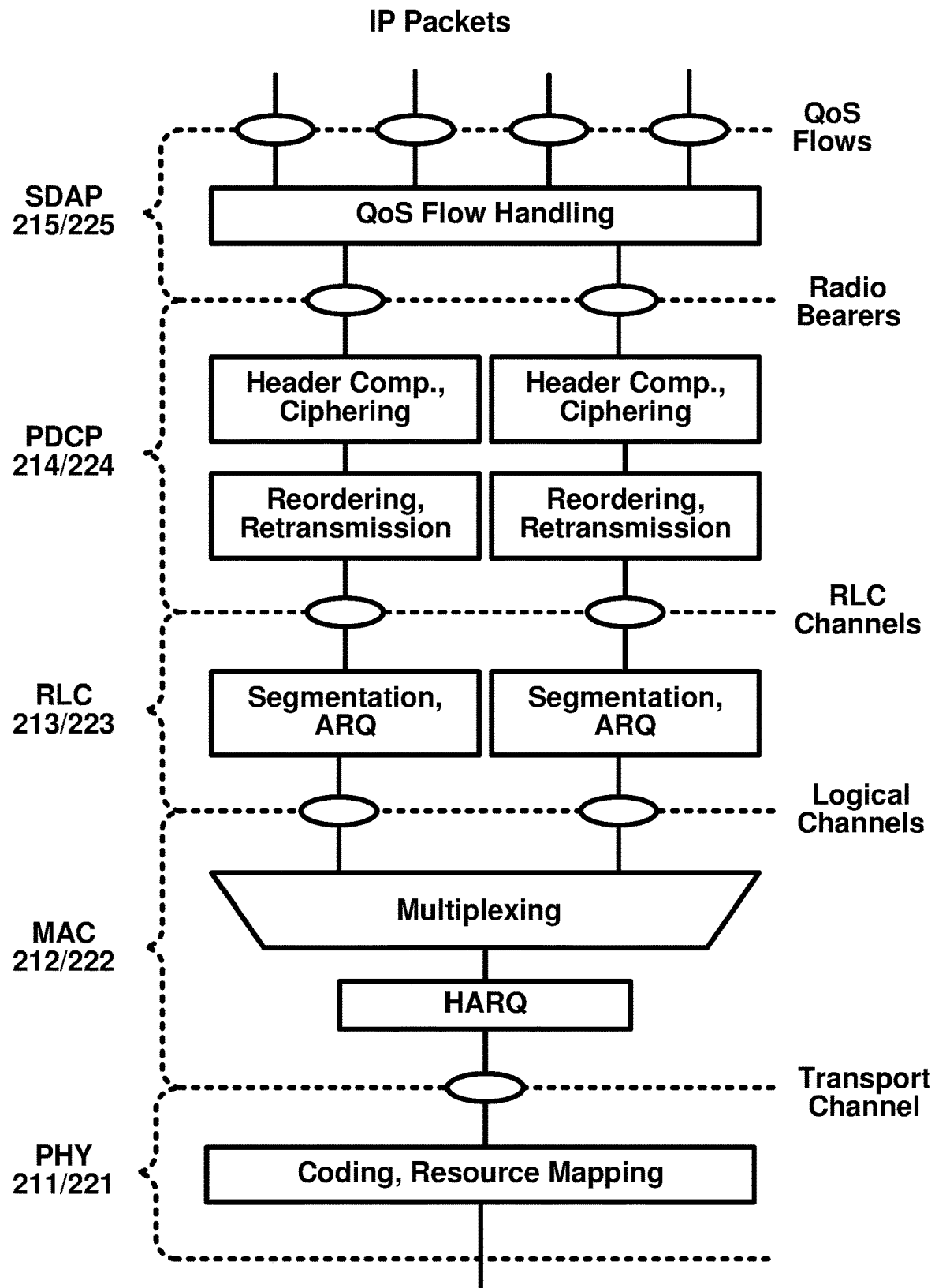
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
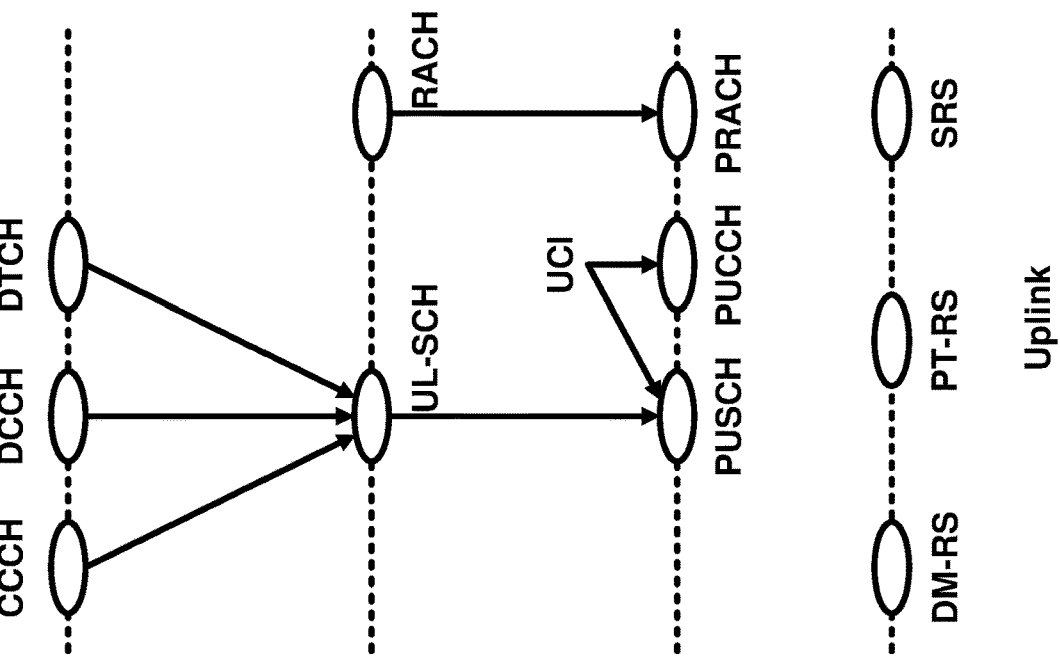
FIG. 5A and FIG. 5B respectively illustrate a mapping between logical channels, transport channels, and physical channels for the downlink and uplink.
Figure 5A:
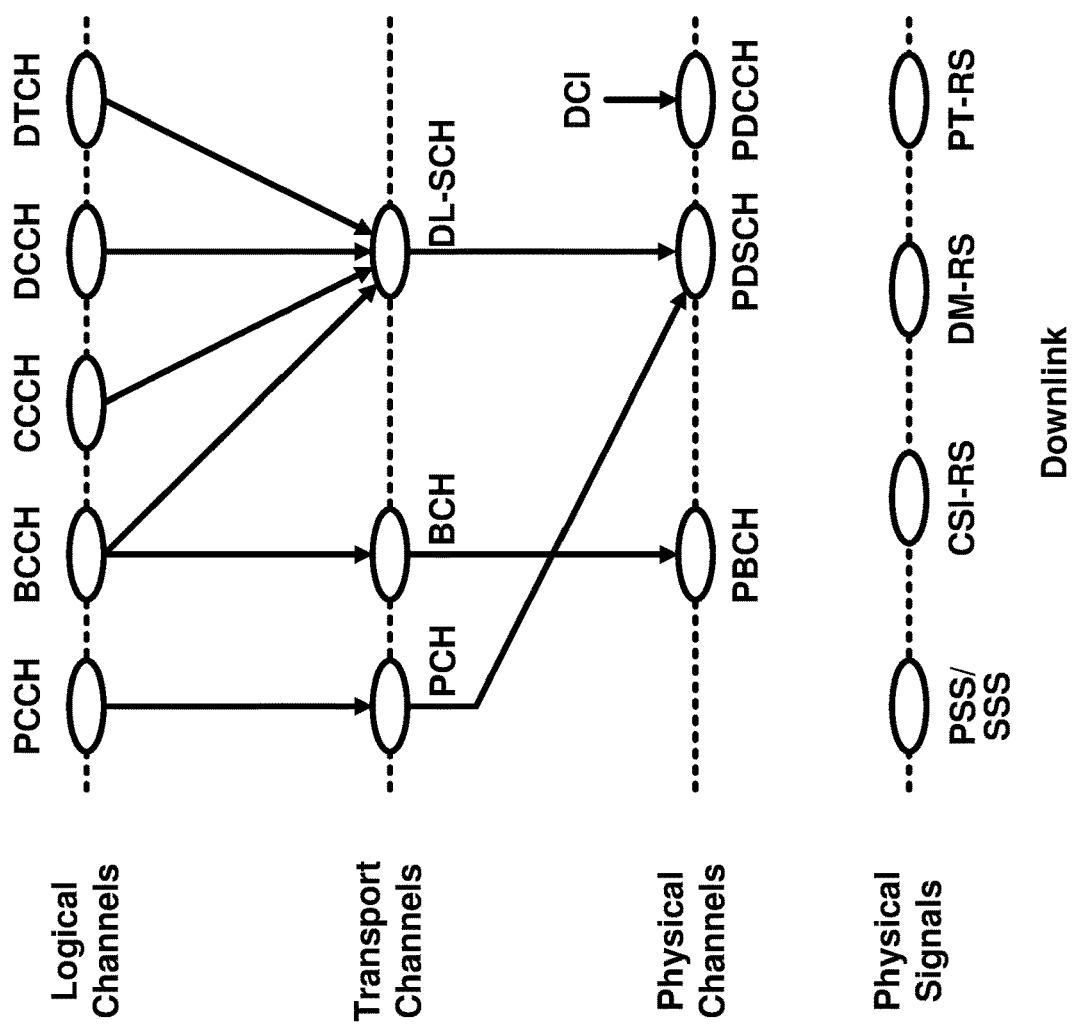

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
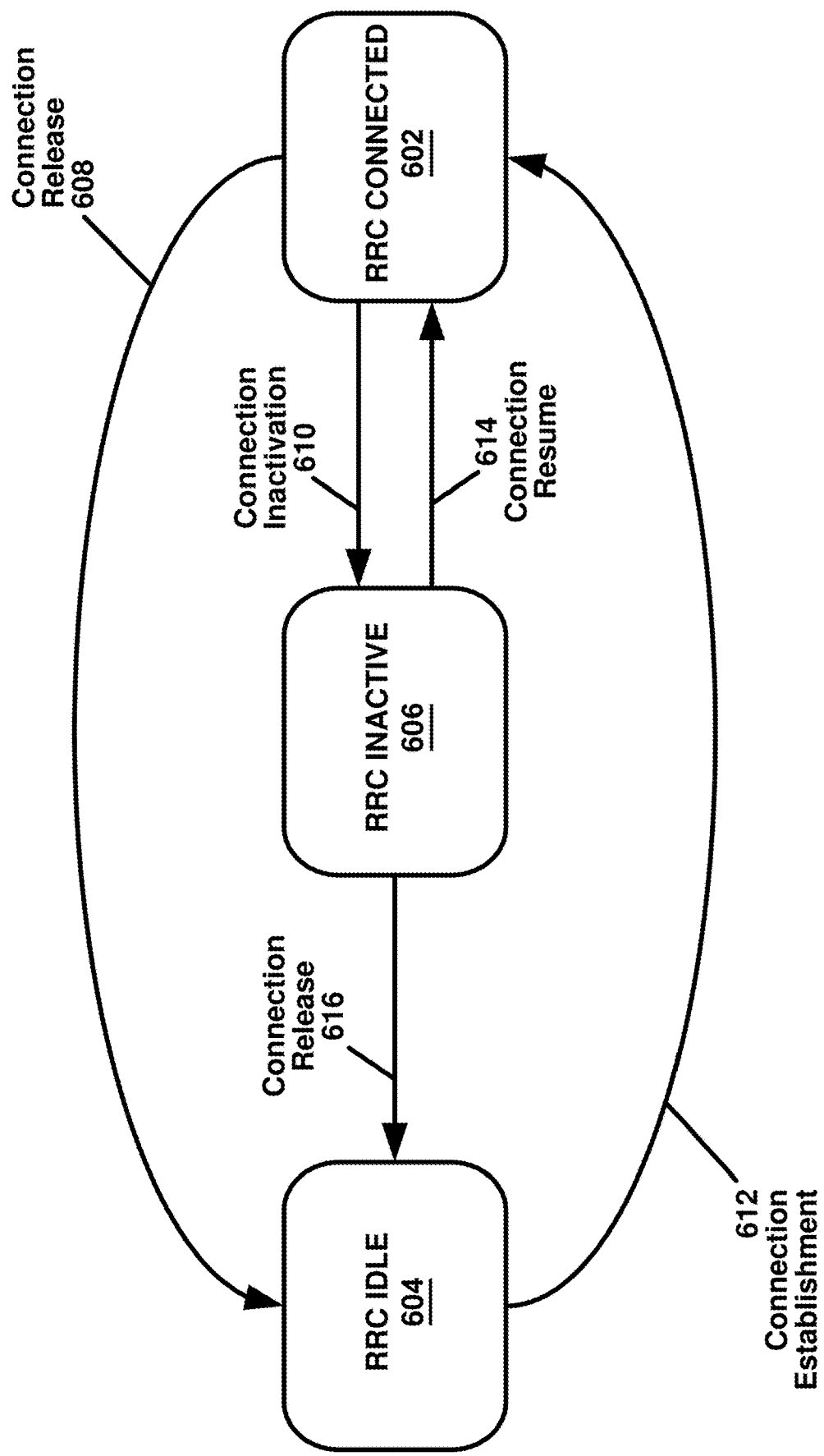
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
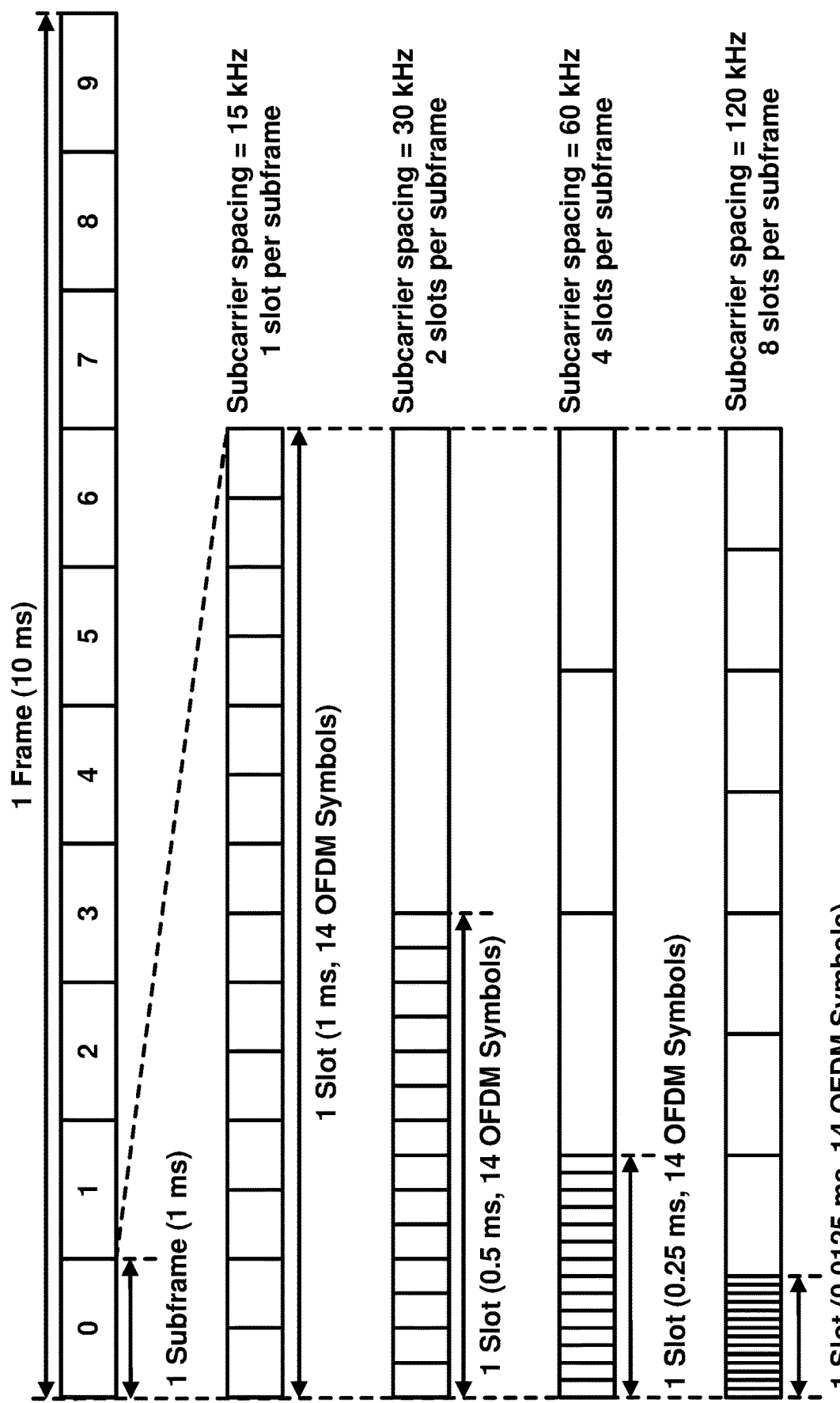
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
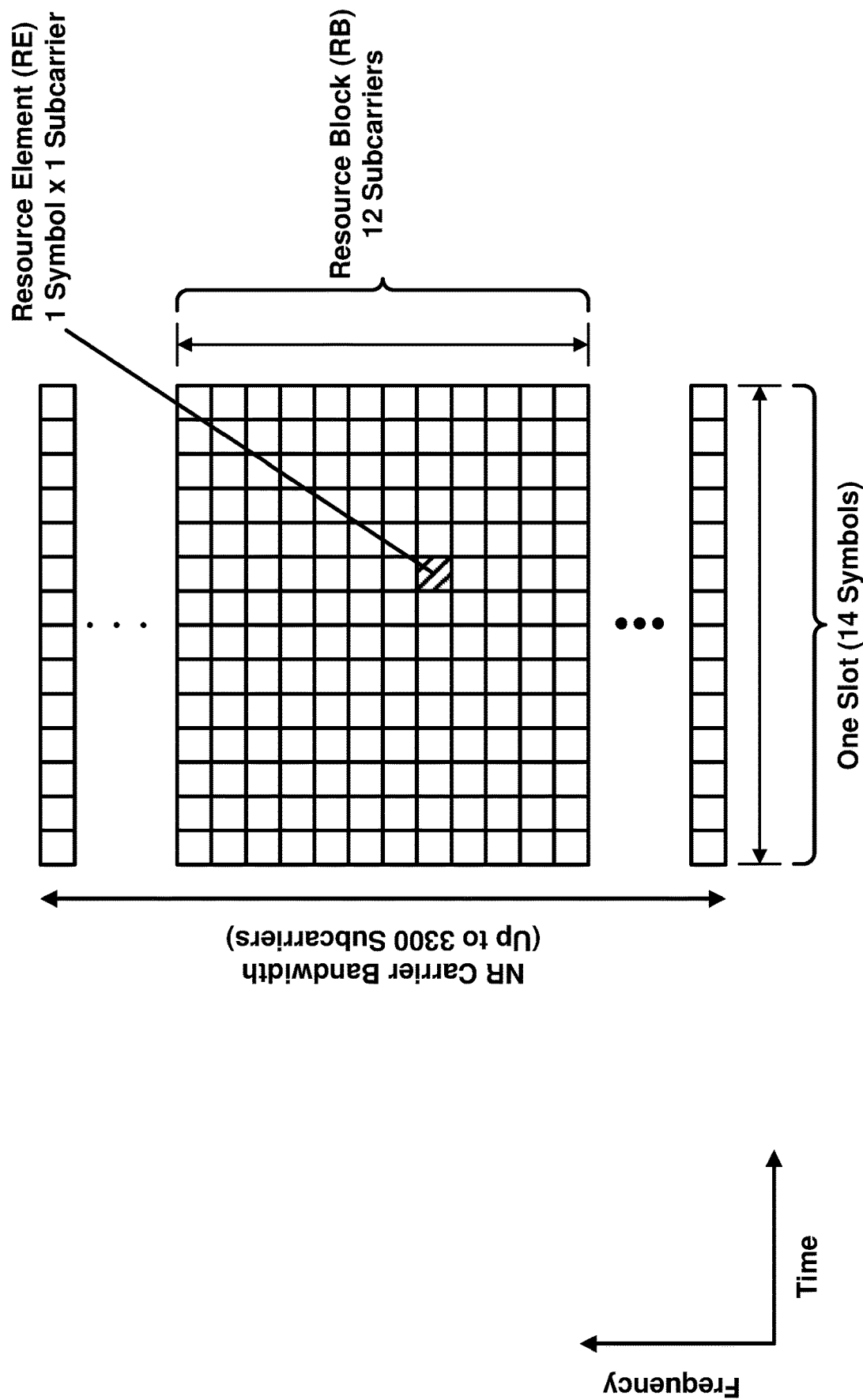
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
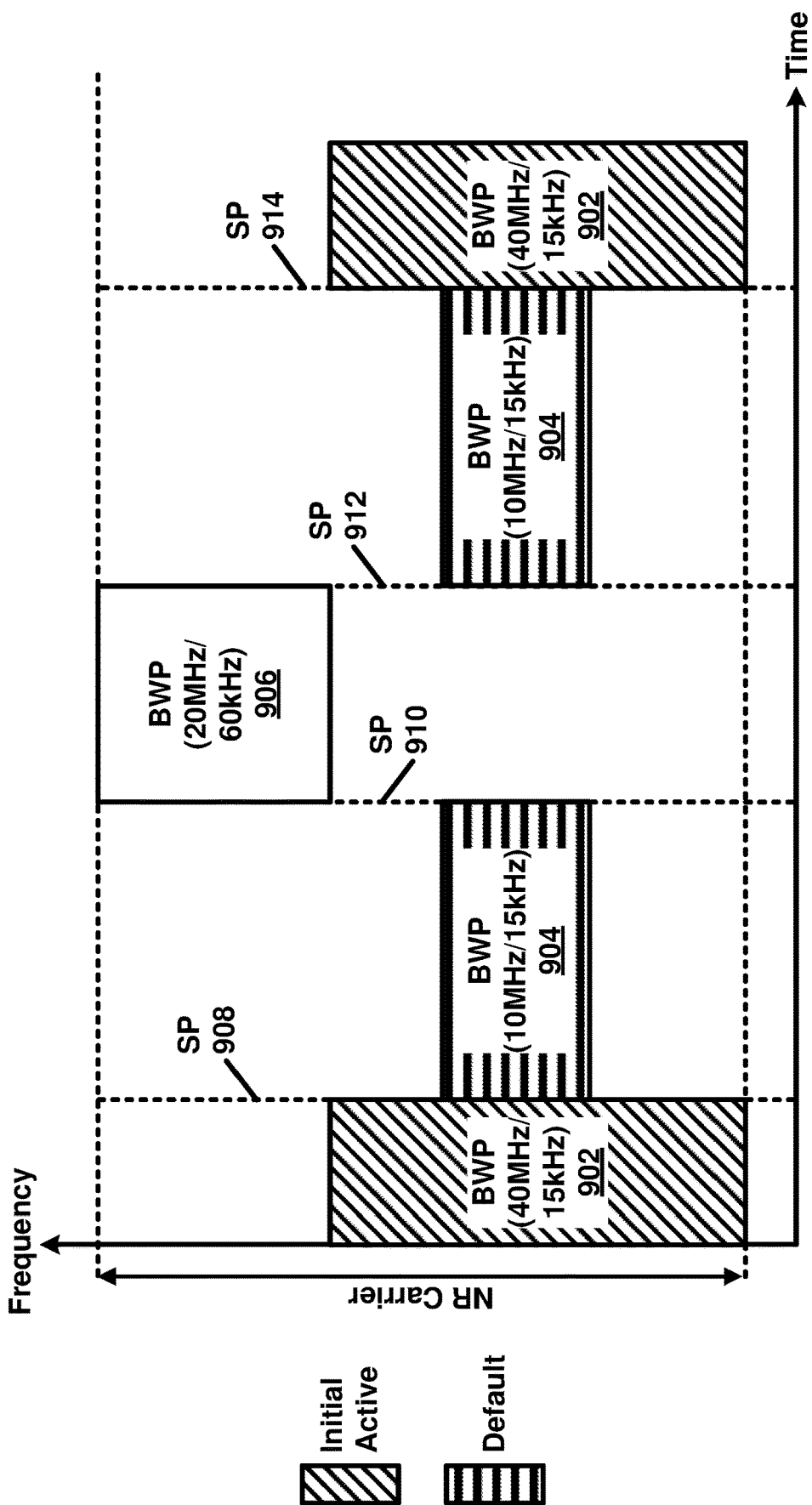
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

4.2 Carrier Aggregation

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
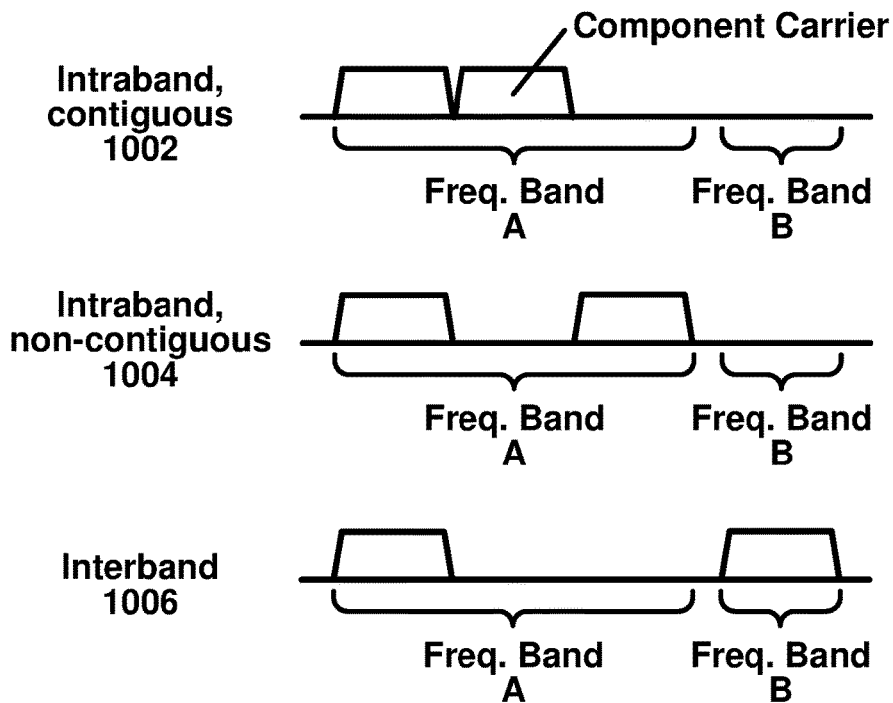
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
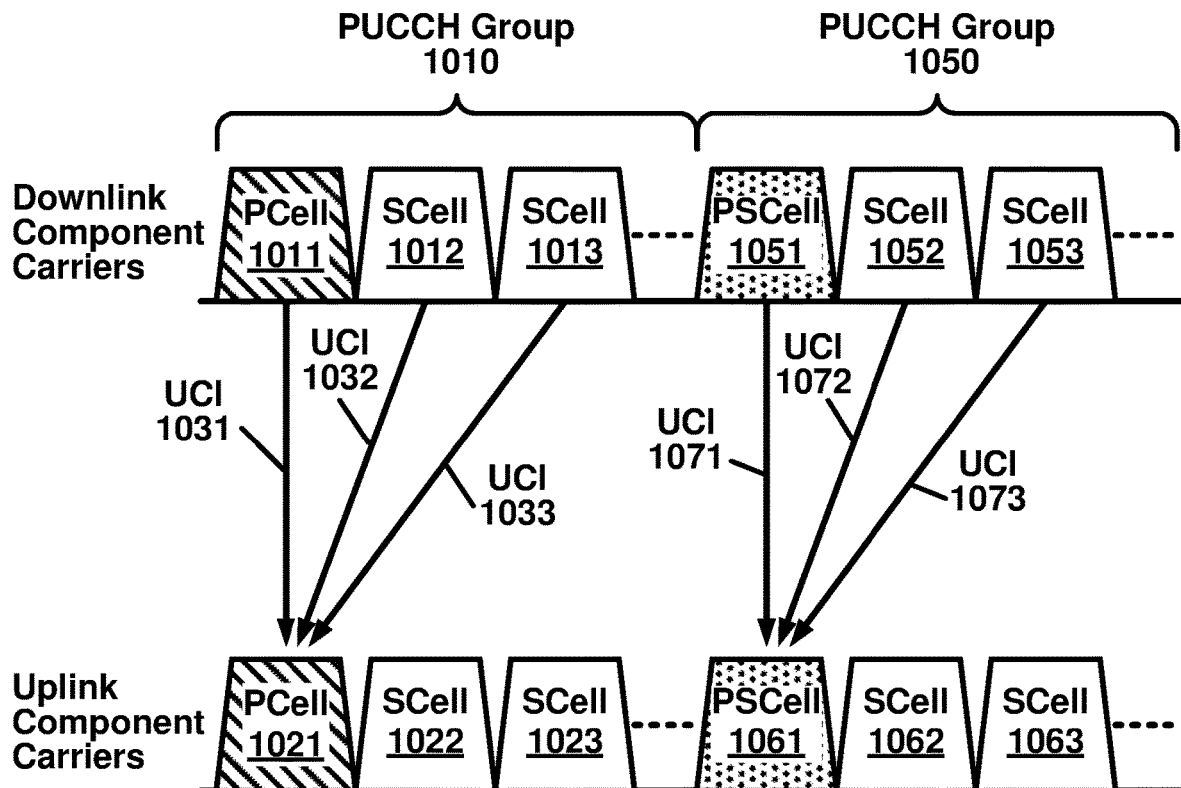
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a Pcell1011, an Scell1012, and an Scell1013. The PUCCH group 1050 includes three downlink CCs in the present example: a Pcell1051, an Scell1052, and an Scell1053. One or more uplink CCs may be configured as a Pcell1021, an Scell1022, and an Scell1023. One or more other uplink CCs may be configured as a primary Scell (PSCell) 1061, an Scell1062, and an Scell1063. Uplink control information (UCI) related to the downlink CCs of the PUCCH group 1010, shown as UCI 1031, UCI 1032, and UCI 1033, may be transmitted in the uplink of the Pcell1021. Uplink control information (UCI) related to the downlink CCs of the PUCCH group 1050, shown as UCI 1071, UCI 1072, and UCI 1073, may be transmitted in the uplink of the PScell1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the Pcell1021 and the PScell1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
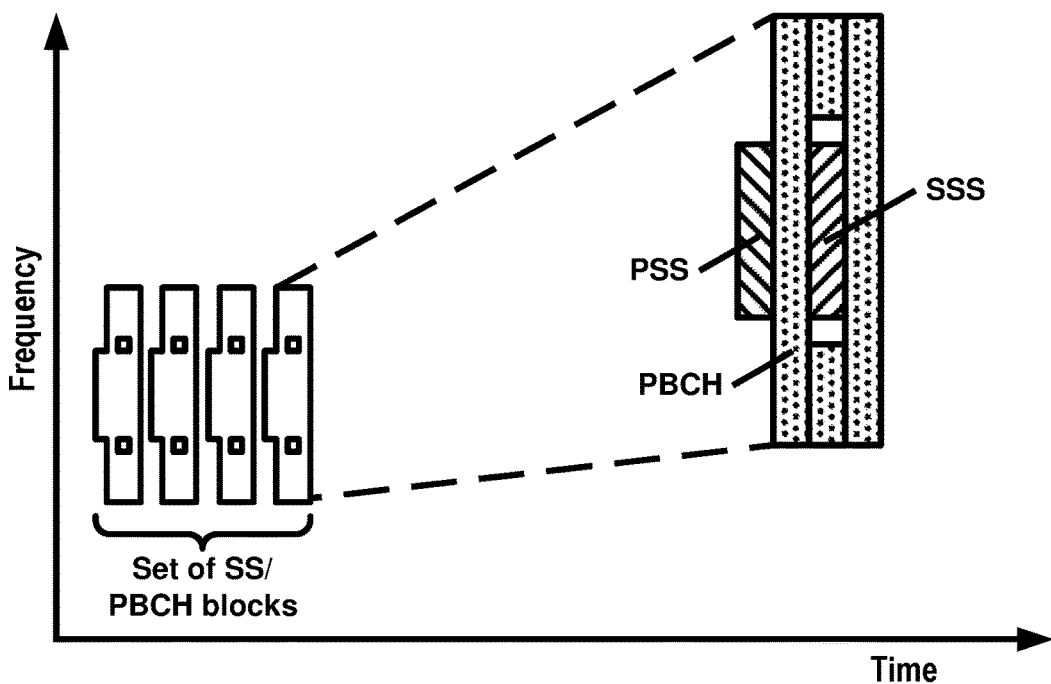
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
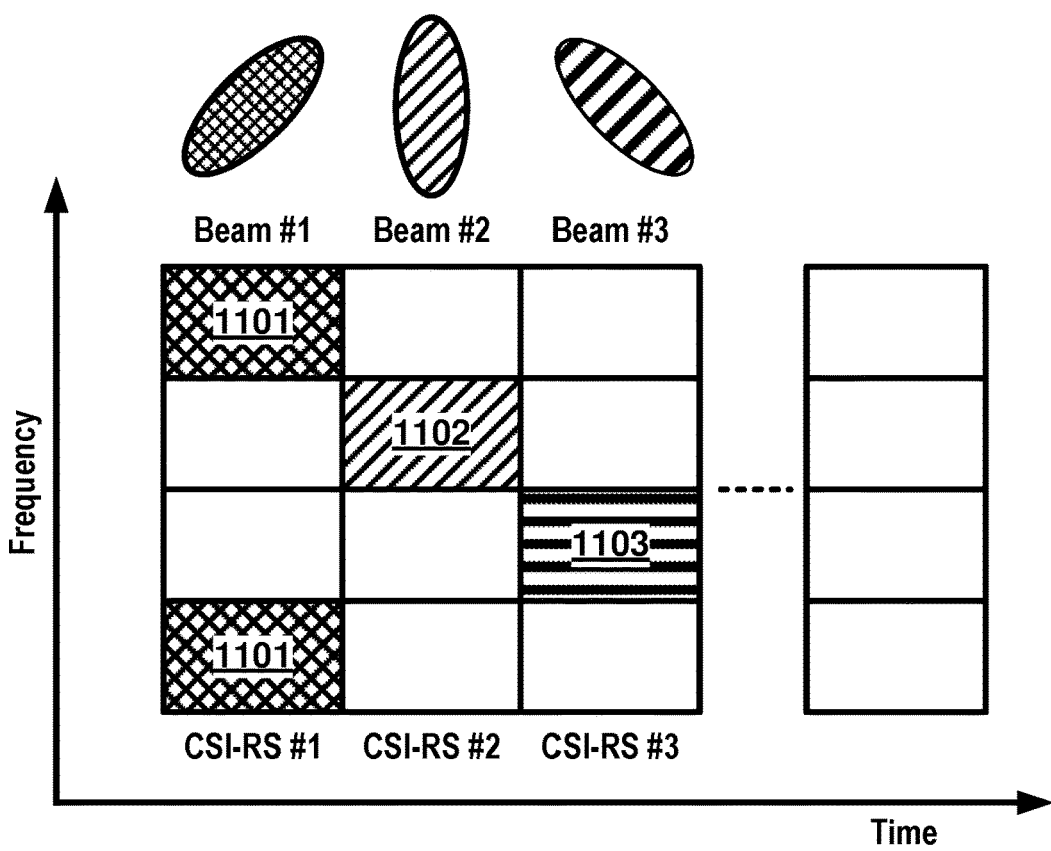
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
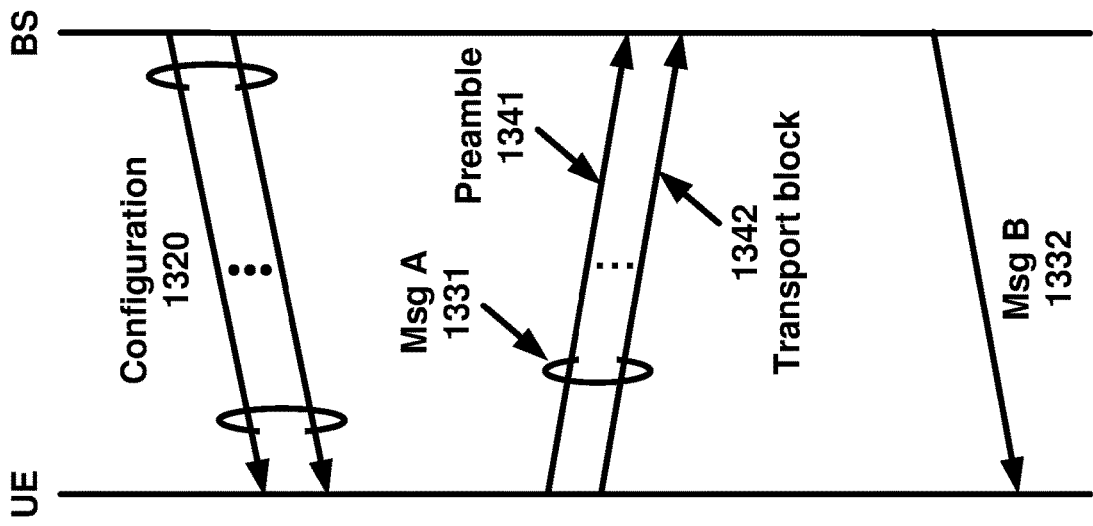
FIG. 13A, FIG. 13B, and FIG. 13C respectively illustrate a four-step contention-based random access procedure, a two-step contention-free random access procedure, and another two-step random access procedure.
Figure 13B:
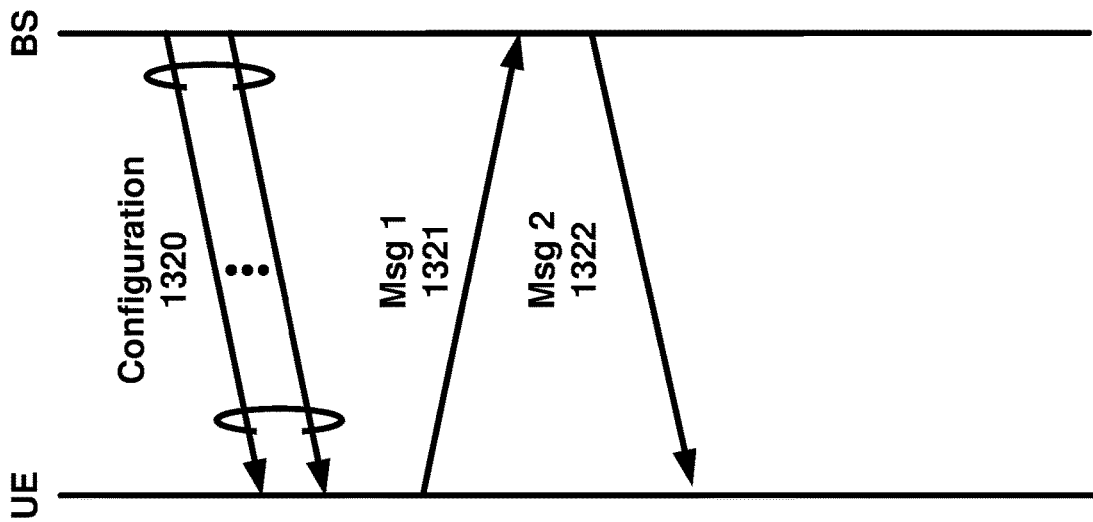
Figure 13A:
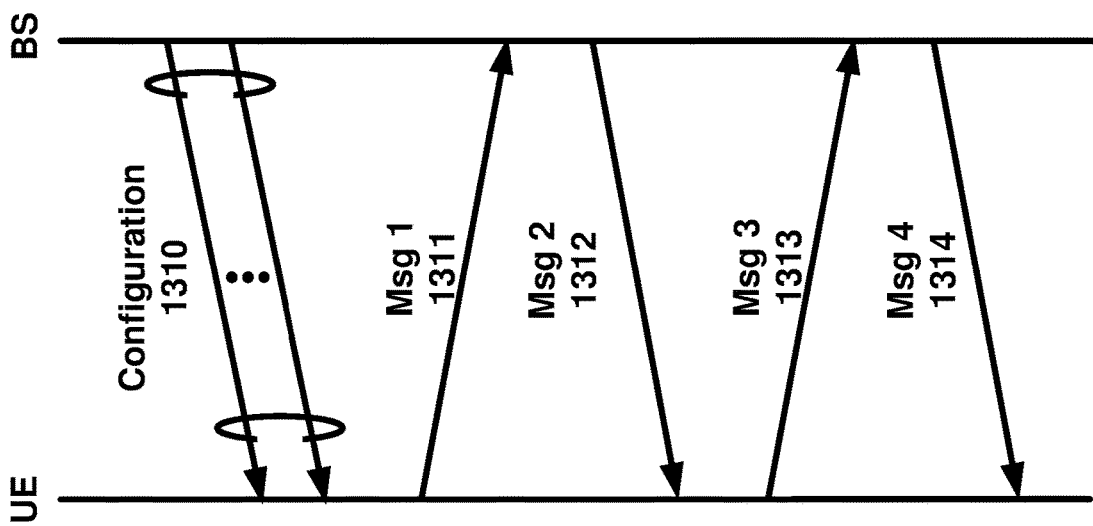

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1320 may be transmitted in an uplink transmission by the UE. Msg A 1320 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1350 after or in response to transmitting the Msg A 1320. The Msg B 1350 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1350.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE;

and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
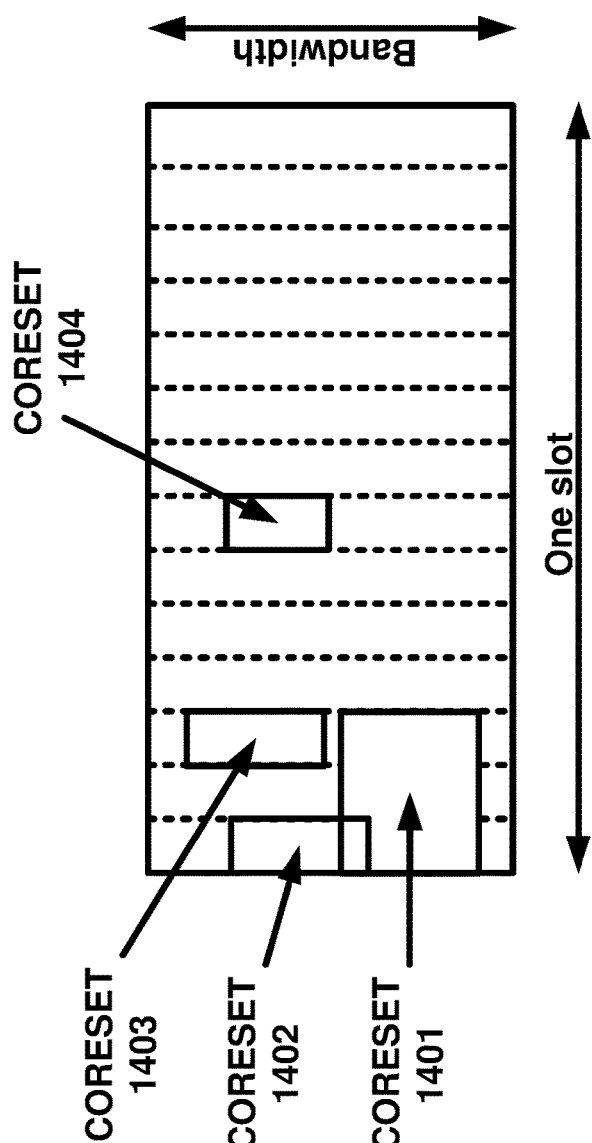
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a size and a location of the CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
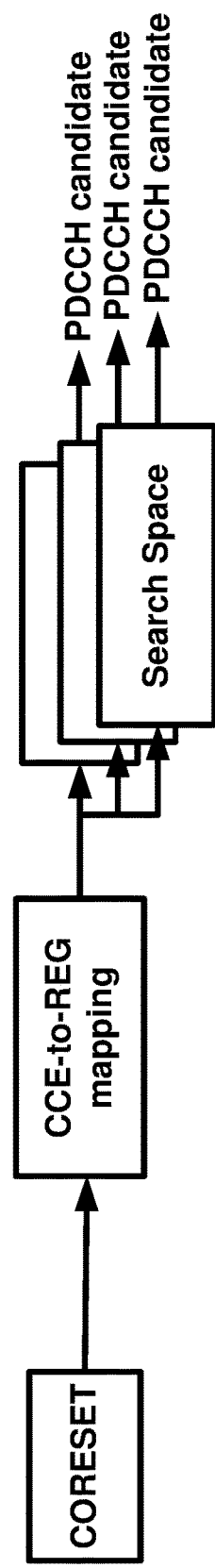
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
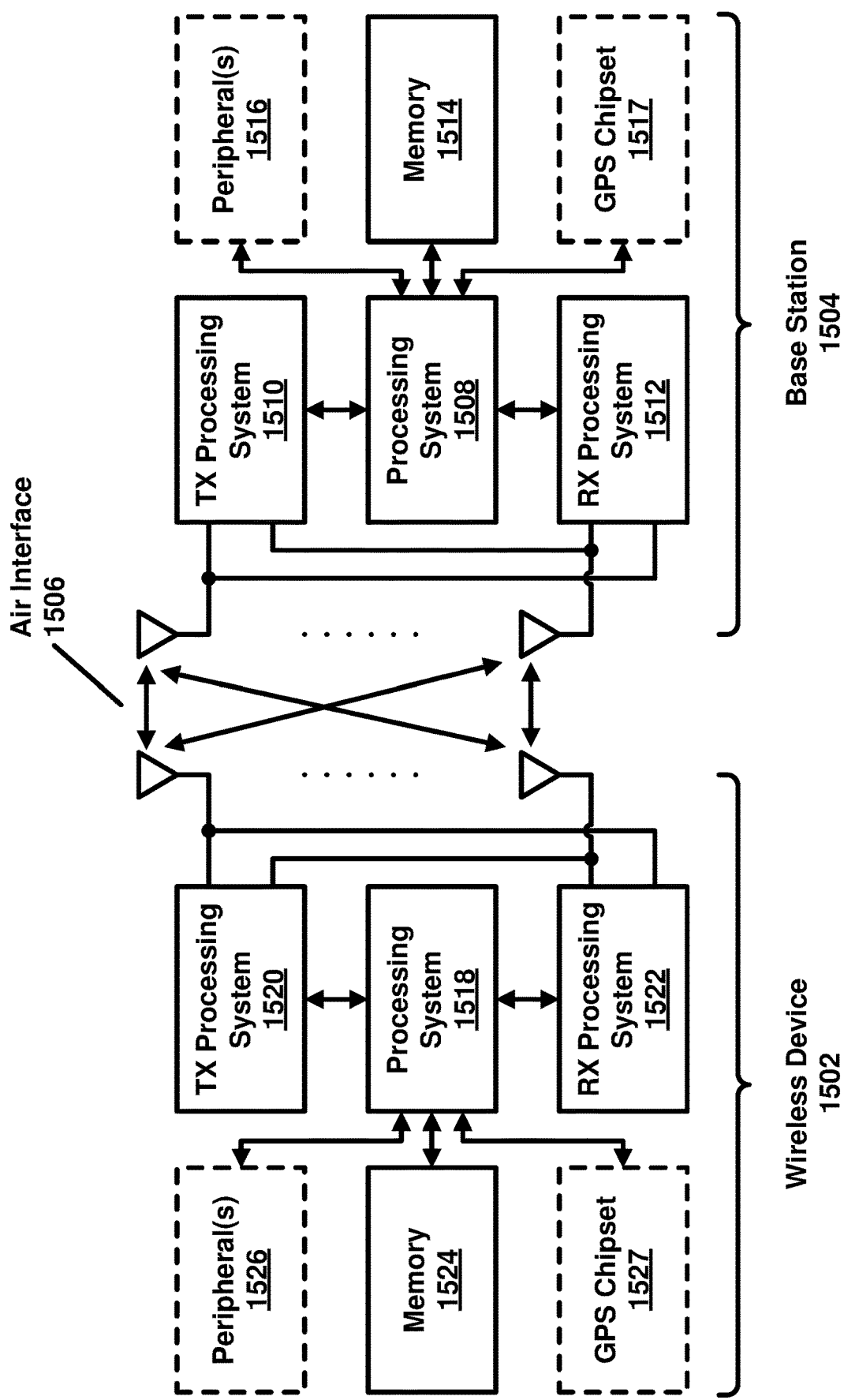
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of:

scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g., two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

In an example, a base station and a wireless device may use a plurality of downlink control information (DCI) formats to communicate control information to schedule downlink data and/or uplink data or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

FIG. 17 illustrates example cases of various DCI formats. In an example, a DCI format 0_0 and a DCI format 1_0 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 1_2 may be referred as a compact DCI format for scheduling uplink and downlink respectively. A base station may configure one or more DCI formats for scheduling downlink and/or uplink resources. FIG. 17 illustrates that a DCI format 0_0, 0_1 and 0_2 may be used to schedule uplink resource(s) for one or more PUSCHs. A DCI format 1_0, 1_1 and 1_2 may be used to schedule downlink resource(s) for one or more PDSCHs. A DCI format 2_0, 2_1, 2_2, 2_3, 2_4, 2_5 and 2_6 may be used for a group-common DCI transmission. Each format of DCI format 2_x may be used for different information. For example, the DCI format 2_4 may be used to indicate uplink resources for a group of wireless devices. In response to receiving a DCI based on the DCI format 2_4, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIBs.

For example, the wireless device may determine one or more first DCI sizes of one or more first DCI fields of a DCI format 0_1 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_1. In FIG. 19, there are one or more second DCI fields that may present in the DCI format 0_1 regardless of the wireless device specific RRC message(s). For example, the DCI format 0_1 may comprise a 1-bit DL/UL indicator where the bit is configured with zero ('0') to indicate an uplink grant for the DCI format 0_1. DCI field(s) shown in dotted boxes may not be present or a size of the DCI field(s) may be configured as zero. For example, a carrier indicator may be present when the DCI format 0_1 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_1 schedules a resource for an uplink carrier or a supplemental uplink. The UL/SUL indicator field may be present when the wireless device is configured with a supplemental uplink for a scheduled cell of the DCI. Otherwise, the UL/SUL indicator field may not be present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18-19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2(BW(BW+1)/2), wherein BW is the bandwidth of the active uplink BWP).

The wireless device may determine a resource allocation indicator value (RIV) table, where an entry of the table may comprise a starting PRB index and a length value. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW(BW+ 1)/2)−K bits to indicate the uplink resource(s) based on the resource allocation type 1, when frequency hopping is enabled.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. A new data indicator (NDI) field may indicate whether the DCI schedules the uplink resource(s) for a new/initial transmission or a retransmission. A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists.

A DCI field of hybrid automatic repeat request (HARQ) process number (HARQ process # in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The DCI format 0_1 may have a first downlink assignment index ($1^{st}$ DAI) and/or a second DAI ($2^{nd}$ DAI). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of code block group (CBG) transmission information (CBGTI) may indicate HARQ-ACK feedback(s) for one or more CBGs. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs. A field of SCell dormancy indication (Scell dormancy) may indicate transitioning between a dormant state and a normal state of one or more secondary cells.

Figure 18:
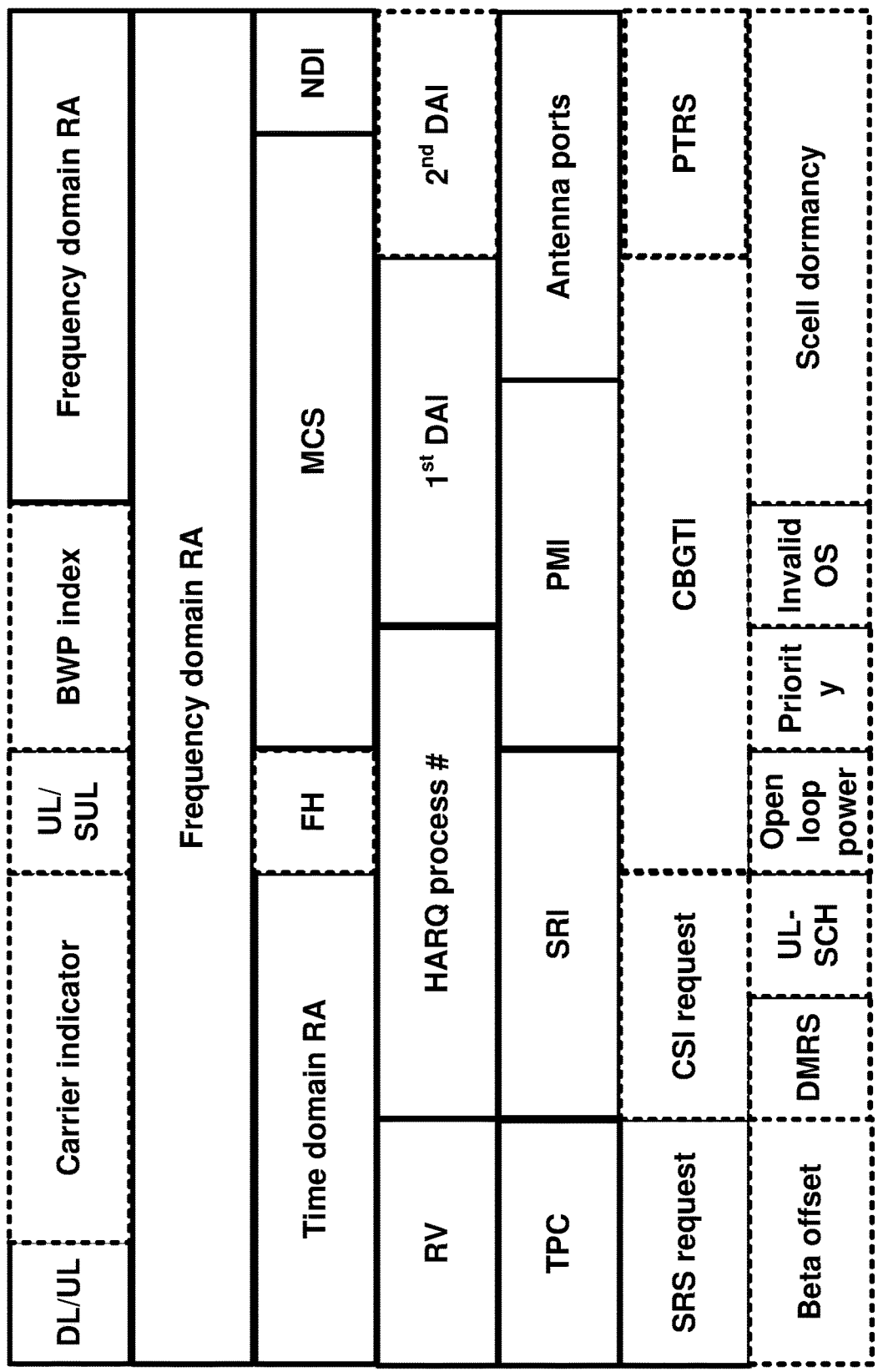
FIG. 18 illustrates an example DCI format for scheduling uplink resource of a single cell.
Figure 19:
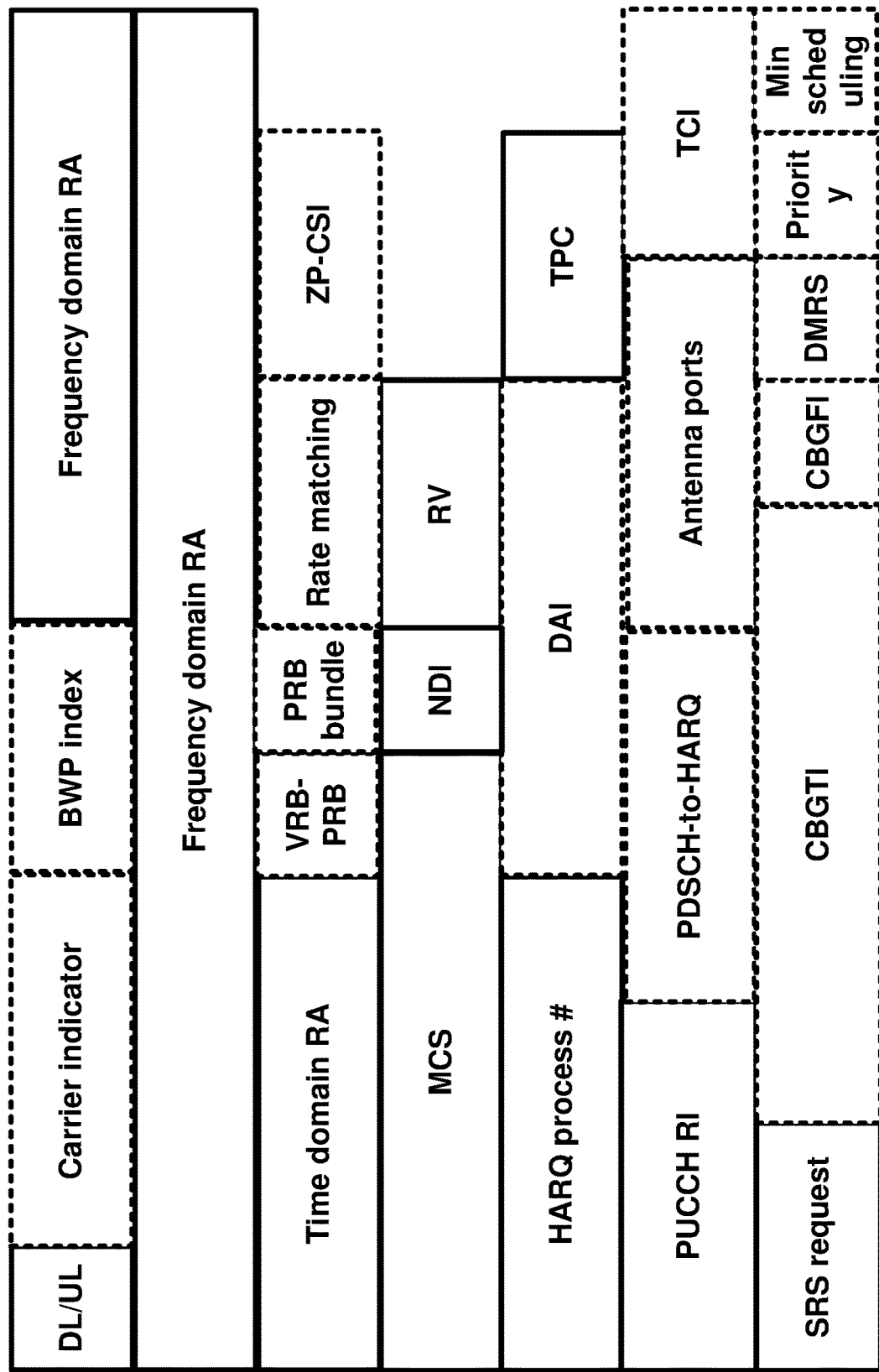
FIG. 19 illustrates an example DCI format for scheduling downlink resource of a single cell.

Note that additional DCI field(s), though not shown in FIG. 18, may present for the DCI format 0_1. For example, a downlink feedback information (DFI) field indicating for one or more configured grant resources may present for an unlicensed/shared spectrum cell. For example, the unlicensed/shared spectrum cell is a scheduled cell. When the DCI format 0_1 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

FIG. 18 shows an example of a DCI format 1_1. For example, the DCI format 1_1 may schedule a downlink resource for a scheduled downlink cell. The DCI format 1_1 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 18), an antenna ports, a transmission configuration indication (TCI), a SRS request, a CBG transmission information (CBGTI), a CBG flushing out information (CB_GFI), DMRS sequence initialization (DMRS), a priority indicator (priority), and a minimum applicable scheduling offset indicator.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_1 may also include MCS, NDI and RV for a second transport block, in response to a max number of codewords scheduled by DCI may be configured as two. The DCI format 1_1 may not include MCS, NDI and RV field for the second transport block, in response to the max number of codewords scheduled by DCI may be configured as one. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states. For example, the CBGTI may indicate whether to flush a soft buffer corresponding to a HARQ process indicated by the HARQ process #. For example, the Min scheduling field may indicate enable or disable applying a configured minimum scheduling offset (e.g., when a minimum scheduling offset is configured) or select a first minimum scheduling offset or a second minimum scheduling offset (e.g., when the first minimum scheduling offset and the second minimum scheduling offset are configured).

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 18) may indicate whether a DCI based the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 18) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil(log 2(BW/K1(BW/K1+1)/2) and the resource allocation type1 granularity. E.g., the BW is the bandwidth of the active uplink BWP. E.g., the K1 is the resource allocation type1 granularity.).

The wireless device may determine a resource allocation indicator value (RIV) table, where an entry of the table may comprise a starting PRB index and a length value. The wireless device may determine the RIV table based on the resource allocation type1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1(BW/K1+1)/2)−K bits to indicate the uplink resource(s) based on the resource allocation type 1, when frequency hopping is enabled. Otherwise, the base station/wireless device may use ceil(log 2(BW/K1(BW/K1+1)/2) bits to indicate the uplink resource(s) based on the resource allocation type 1.

In an example, a base station may transmit one or more messages comprising configuration parameters of a BWP of a cell. The configuration parameters may comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 18) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 18). For example, the FH flag may present when the base station may enable a frequency hopping of the scheduled cell or the active UL BWP of the scheduled cell. A DCI field of modulation and coding scheme (MCS) (shown as MCS in FIG. 18) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process # in FIG. 18) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may comprise a bit size for the HARQ process # field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index ($1^{st}$ DAI) and/or a second DAI ($2^{nd}$ DAI). The configuration parameters may comprise a parameter to indicate whether to use DAI for the DCI format 0_2 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 18) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 18) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 18) may indicate an association between one or more ports of PTRS and one or more ports of DM-RS. The one or more ports may be indicated in the field of antenna ports. A field of beta_offset indicator (beta offset in FIG. 18) may indicate a code rate for transmission of uplink control information (UCI) via a PUSCH of the one or more scheduled PUSCHs. A field of DM-RS sequence initialization (shown as DMRS in FIG. 18) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 18) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), though not shown in FIG. 18, may present for the DCI format 0_1/0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

FIG. 19 shows an example of a DCI format 1-1 and/or 1-2. For example, the DCI format 1-1 or 1-2 may schedule a downlink resource for a scheduled downlink cell. The DCI format 1-1 or 1-2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ_feedback timing indicator (PDSCH-to-HARQ in FIG. 19), an antenna ports, a transmission configuration indication (TCI), a SRS request, DMRS sequence initialization (DMRS), and a priority indicator (priority).

The base station may transmit one or more messages indicating configuration parameters for the DCI format 1-2. The configuration parameters may comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1-2 may also include MCS, NDI and RV for a second transport block, in response to a max number of codewords scheduled by DCI may be configured as two. The DCI format 1-2 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-InactivityTimer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1-1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1-1 for paired spectrum operation or if the UE may not detect a DCI format 1-1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1-1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state.

In an example, during a DRX mode, the UE may power down most of its circuitry when there are no packets to be received. The UE may monitor PDCCH discontinuously in the DRX mode. The UE may monitor the PDCCH continuously when a DRX operation is not configured. During this time the UE listens to the downlink (DL) (or monitors PDCCHs) which is called DRX Active state. In a DRX mode, a time during which UE doesn't listen/monitor PDCCH is called DRX Sleep state.

In an example, a frequency range of 52.6 to 71 GHz (e.g., a frequency region 3, a frequency range 3, a third frequency range, a third frequency region) may support additional numerologies. For example, the additional numerologies may comprise a 120 kHz subcarrier spacing with a normal CP. For example, the additional numerologies may comprise a 240 kHz subcarrier spacing with the normal CP. For example, the additional numerologies may comprise a 480 kHz subcarrier spacing with the normal CP and/or an extended CP. For example, the additional numerologies may comprise a 960 kHz subcarrier spacing with the normal CP and/or the extended CP.

Figure 20:
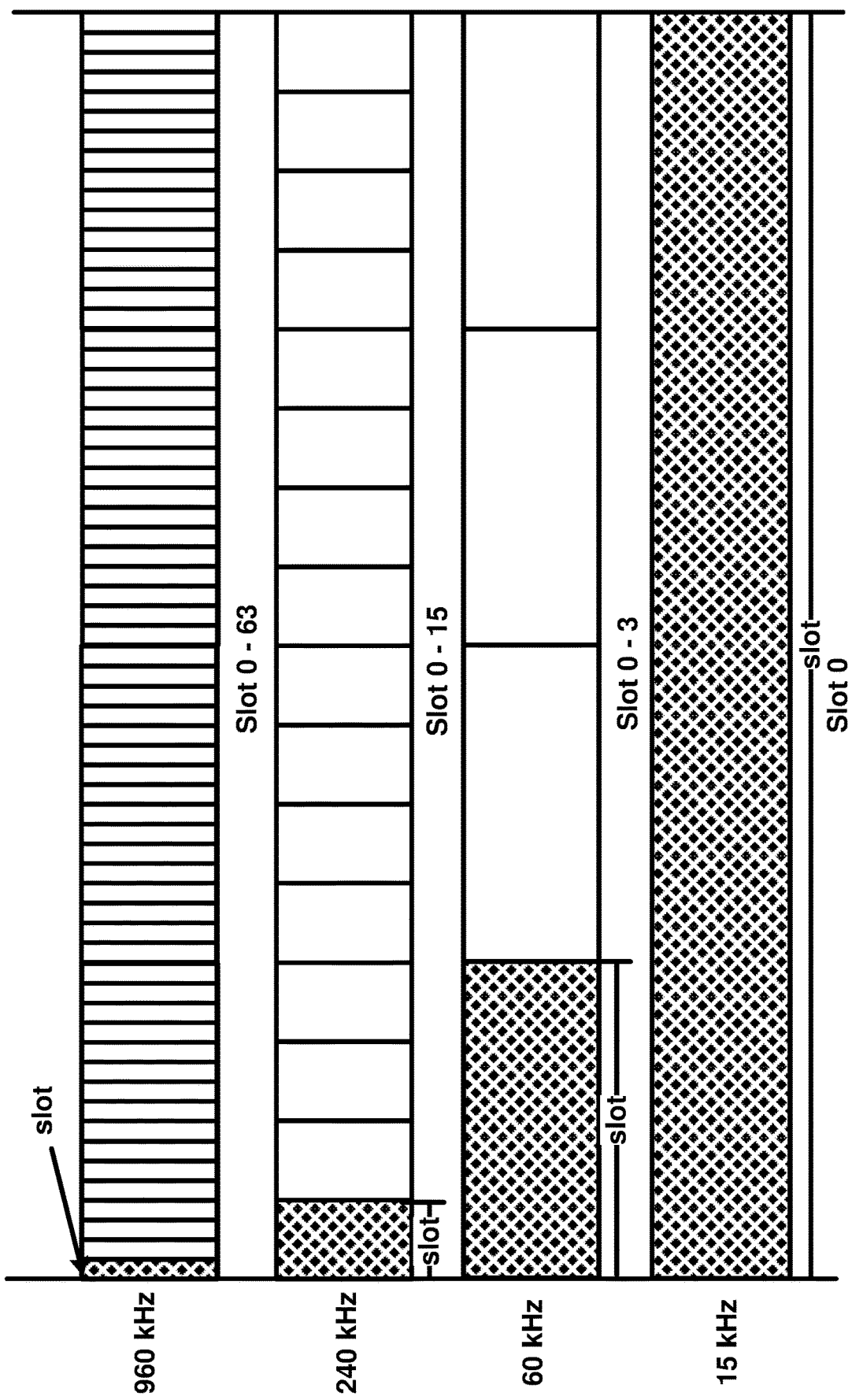
FIG. 20 illustrates an example of different numerologies as per an aspect of an embodiment of the present disclosure.

FIG. 20 illustrates an example of different numerologies that the wireless device may support for one or more cells in different frequency ranges. For example, 15 kHz subcarrier spacing with the normal CP and/or the extended CP may be supported in a frequency region 1 (e.g., FR1). For example, 60 kHz (and/or 120 kHz) subcarrier spacing with the normal CP and/or the extended CP may be supported in a frequency region 2 (e.g., FR2). For example, 240 kHz and/or 480 kHz and/or 960 kHz subcarrier spacings with the normal CP and/or the extended Cp may be supported in a frequency region 3 (e.g., FR3).

A length of a slot with the 15 kHz subcarrier spacing may be 1 msec. A length of a slot with a subcarrier spacing that is 15 kHz*2^u may be ½^u msec. For example, a length of the slot with a subcarrier spacing 120 kHz is ⅛=0.125 msec. A length of a slot with a subcarrier spacing 240 kHz is 1/16=62.5 us. A length of a slot with a subcarrier spacing 960 kHz is 1/64=16 us.

In a millisecond, one slot may be present with a subcarrier spacing of 15 kHz, 4 slots with 60 kHz subcarrier spacing, 16 slots with 240 kHz subcarrier spacing and 64 slots with 960 kHz subcarrier spacing.

Figure 21:
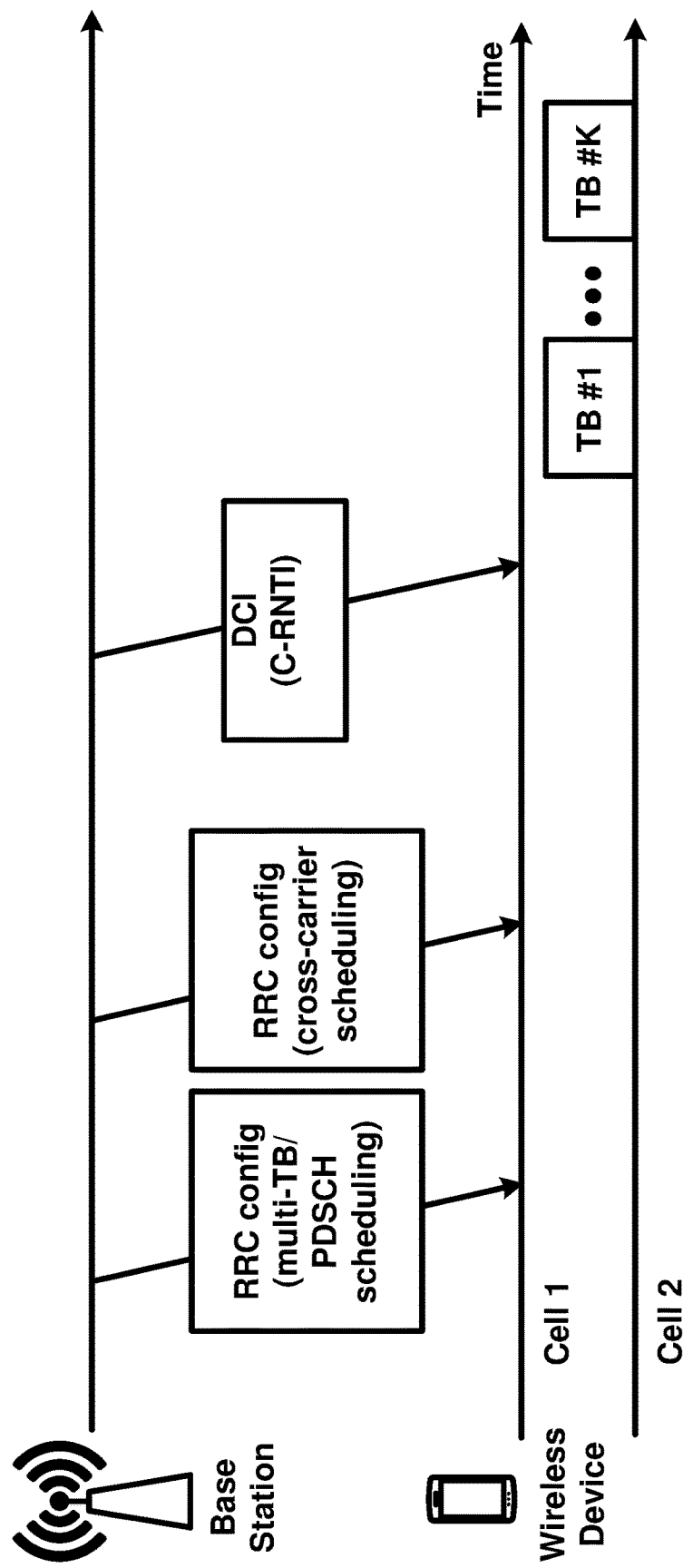
FIG. 21 illustrates an example of embodiments of a multi-PDSCH scheduling as per an aspect of an embodiment of the present disclosure.

FIG. 21 illustrates an example of embodiments of a multi-PDSCH scheduling as per an aspect of an embodiment of the present disclosure. When a wireless device is configured with a multi-PDSCH scheduling for a serving cell, the wireless device may receive a DCI that indicates resource assignment(s) and/or CSI/SRS requests for one or more PDSCHs via the serving cell. Each PDSCH of the one or more PDSCHs may comprise one or more transport blocks. A first PDSCH of the one or more PDSCHs may comprise a first transport block. A second PDSCH of the one or more PDSCHs may comprise a second transport block. The first transport block may be different from the second transport block. The DCI may comprise one or more NDI bits or one or more NDI fields. Each NDI bit of the one or more NDI bits or each NDI field of the one or more NDI fields may correspond to each of the one or more PDSCHs. The DCI may comprise one or more RV bits or one or more RV fields. Each RV bit of the one or more RV bits or each RV field of the one or more RV fields may correspond to the each of the one or more PDSCHs.

FIG. 21 illustrates a multi-PDSCH scheduling based on a cross-carrier scheduling. For example, a second cell (e.g., cell 2) is a scheduled cell by a first cell (e.g., cell 1). The first cell may operate with a first numerology (e.g., 15 kHz with a normal CP). The second cell may operate with a second numerology (e.g., 960 kHz with an extended CP or 480 kHz with an extended CP). During 1 msec, the first cell may have 1 slot. During 1 msec, the second cell may have a plurality of slots (e.g., 32 slots with 480 kHz, 64 slots with 960 kHz).

The base station may transmit one or more RRC messages indicating configuration parameters. The configuration parameters may comprise/indicate a multi-PDSCH scheduling for the second cell. The configuration parameters may comprise/indicate a number of PDSCHs schedulable by a single DCI. For example, a maximum number of PDSCHs (M) by a single DCI may be indicated by the configuration parameters. A DCI, of a multi-PDSCH scheduling, may comprise resource assignment(s) for one or more PDSCHs, where a number of the one or more PDSCHs or one or more slots scheduled with the one or more PDSCHs is less than or equal to the maximum number of PDSCHs. The base station may transmit one or more second RRC messages indicating second configuration parameters. The second configuration parameters may comprise/indicate a cross-carrier scheduling for the second cell. For example, the first cell is indicated as a scheduling cell. The first cell may schedule the second cell.

The DCI may be CRC-scrambled with a first RNTI (e.g., C-RNTI, CS-RNTI). The DCI may schedule a first TB (TB #1) via a first PDSCH, a second TB (TB #2) via a second PDSCH, and so on. For example, FIG. 21 illustrates that up to K TBs via K PDSCHs are scheduled by the DCI. FIG. 21 illustrates that the DCI schedules the TB #1 to TB #K. For example, one or more slots of the one or more PDSCHs may be contiguous. For example, the one or more slots may be non-contiguous. The DCI may comprise a time domain resource allocation field that indicates time domain resources indicating the one or more slots. The time domain resource allocation field may indicate a starting symbol and a duration in each slot of the one or more slots. A first slot of the one or more slots may have a first starting symbol and a first duration. A second slot of the one or more slots may have a second starting symbol and a second duration. The first starting symbol may be different from the second starting symbol. The first duration may be different from the second duration.

The configuration parameters may indicate to enable or disable the multi-PDSCH scheduling. The second cell may operate with a plurality of TRPs/coreset pools. The one or more TBs or the one or more PDSCHs may be scheduled via the plurality of TRPs/coreset pools.

For example, a first PDSCH of the one or more PDSCHs may be associated with a first transmission and reception point (TRP) or a first coreset pool/group or a first group or a first TCI group. The second PDSCH of the one or more PDSCHs may be associated with a second TRP or a second coreset pool/group or a second group or a second TCI group. When the second cell is operating with a single TRP, the first TRP may be same as the second TRP. The first TRP or the first coreset pool is assumed to be present as a default for the single TRP operation.

A multi-PDSCH or a multi-TB DCI (DCI-M) may represent a DCI based on a multi-PDSCH scheduling or a multi-TBscheduling. For example, the one or more configuration parameters may comprise one or more control resource set (coreset)s and/or one or more search spaces. The DCI of the multi-PDSCH scheduling may be transmitted via the one or more coresets and/or the one or more search spaces. The one or more configuration parameters may comprise/indicate one or more RNTIs that may be used for the DCI of the multi-PDSCH scheduling. The one or more RNTIs may not comprise a C-RNTI. The one or more RNTIs may comprise the C-RNTI.

The base station may transmit one or more MAC CEs/one or more DCIs to activate the multi-PDSCH scheduling. For example, the one or more MAC CEs may comprise a MAC CE activating and/or deactivating one or more secondary cells. The base station may transmit one or more DCIs. The one or more DCIs may indicate a BWP switching from a first BWP to a second BWP of a cell. The first BWP is an active BWP of the cell. The first BWP may not comprise one or more coresets of the multi-PDSCH scheduling. The second BWP may comprise one or more second coresets of the multi-PDSCH scheduling. For example, the one or more MAC CEs may comprise indication(s) of activating and/or deactivating a multi-PDSCH scheduling. For example, the one or more DCIs may comprise an indication to activate or deactivate the multi-PDSCH scheduling of the second cell. For example, the configuration parameters may comprise/indicate a plurality of BWPs. A first BWP of the plurality of BWPs may comprise/indicate a first DCI format that is used for a multi-PDSCH scheduling. A second BWP of the plurality of BWPs may comprise/indicate a second DCI format that is used for a single-PDSCH scheduling. The wireless device may determine the multi-PDSCH scheduling is activated in response to the first BWP being an active BWP of the second cell. The wireless device may determine the multi-PDSCH scheduling is deactivated in response to the second BWP being an active BWP of the second cell.

Similar mechanisms may be applied for a PUSCH scheduling. Similarly, a multi-PUSCH scheduling may be used for scheduling one or more PUSCHs via a single DCI. For a cell, the multi-PDSCH scheduling and the multi-PUSCH scheduling may be configured/activated/deactivated simultaneously or may be independently configured/activated/deactivated. For example, when a first DCI format used for scheduling PDSCH(s) for a cell may be size-aligned with a second DCI format used for scheduling PUSCH(s) for the cell. When the first DCI format and the second DCI format are size-aligned, the multi-PDSCH and the multi-PUSCH scheduling may be both activated or both deactivated.

The wireless device may activate the multi-PDSCH (and/or multi-PUSCH) scheduling in response to receiving the one or more RRC messages. The one or more MAC CEs/the one or more DCIs may be optional. The base station may reconfigure to deactivate or activate the multi-PDSCH (or the multi-PUSCH) scheduling of a cell via RRC signaling. In response to activating the multi-PDSCH (or the multi-PUSCH) scheduling, the base station may transmit a DCI, based on the multi-PDSCH (or the multi-PUSCH) scheduling, comprising resource assignments for the first downlink/uplink carrier/cell (e.g., cell 2). The DCI may indicate a plurality of downlink/uplink resources for a repetition of a TB via one or more slots (e.g., TB #1, . . . TB #K are same).

In an example, a DCI, of a multi-PDSCH and/or a multi-PUSCH scheduling, may comprise a MCS field or one or more MCS fields. A value of the MCS field or one or more values of the one or more MCS fields may be applied to each of the one or more PDSCHs. The one or more values of the one or more MCS fields may be applied for one or more TBs scheduled via each PDSCH of the one or more PDSCHs. For example, the DCI may comprise a first MCS field indicating a value of MCS values (e.g., 32 values). The DCI may additionally comprise one or more second MCS fields where each of the one or more second MCS fields indicates a gap/offset compared to the first MCS field. For example, the each of the one or more second MCS fields may have k1 bits (e.g., k1=2) that is smaller than k2 bits of the first MCS field (e.g., k2=5).

In an example, the DCI may comprise one or more MCS fields where each of the one or more MCS fields may correspond to each of the one or more PDSCHs.

In an example, the DCI may comprise a first RV field indicating an index of a redundancy version for a first PDSCH. When two TBs may be scheduled for the first PDSCH, the first RV field may comprise two RV values where each corresponds to a first TB and a second TB of the two TBs.

The wireless device may determine one or more second RV values for one or more second PDSCHs of the one or more PDSCHs. The one or more second PDSCHs may be present when the one or more PDSCHs comprise additional PDSCHs than the first PDSCH. The wireless device may determine the one or more second RVs based on configuration parameters configured by the base station. For example, the configuration parameters may comprise a list of RV values, where each entry of the list of RV values comprises a set of RV values {the first RV value, a second RV value, a third RV value, and son on}. The first RV value is determined based on the first RV field. The second RV value may correspond to a second PDSCH of the one or more PDSCHs. The second PDSCH is a PDSCH occurring in a second earliest among the one or more PDSCHs. The third RV value may be applied or correspond to a third PDSCH (e.g., a third earliest PDSCH) of the one or more PDSCHs.

For example, the DCI may comprise a RV field indicating an index of the first RV. For example, the second RV may be determined based on the first RV and one or more configuration parameters. The configuration parameters may comprise/indicate a RV offset. The second RV may be determined as the index of (the first RV+the RV offset) mod K. The K is a number of RVs (e.g., K=4). An index of RV may be determined as an order in the V sequence. For example, an index of RV 3 is 3, and an index of RV 1 is 4. Similarly, the DCI may comprise a HARQ process ID field indicating an index of the first HARQ process ID. The wireless device may determine the second HARQ process ID based on the first HARQ process ID and one or more configuration parameters. The configuration parameters may comprise/indicate a HARQ process ID offset or a list of HARQ process IDs of the one or more PDSCHs. For example, the wireless device may increment the HARQ process ID for each PDSCH of the one or more PDSCHs. For example, the wireless device may apply the HARQ process ID indicated by the DCI for an earliest PDSCH of the one or more PDSCHs. The wireless device may increment the HARQ process ID for a second earliest PDSCH of the one or more PDSCHs. The wireless device may determine a HARQ process ID of a PDSCH of the one or more PDSCHs as (HARQ process ID+i) % MAX HARQ process ID where i is an order of the PDSCH among the one or more PDSCHs or i is a slot offset of the PDSCH from a first slot of the earliest PDSCH of the one or more PDSCHs. The MAX HARQ process ID may represent a number of maximum HARQ processes that the wireless device is configured with or supports for the cell.

In an example, the DCI may comprise a first NDI bit for the first PDSCH of the one or more PDSCHs. The DCI may comprise a second NDI bit for the second PDSCH of the one or more PDSCHs. The DCI may comprise one or more NDI bits for the one or more PDSCHs. Each NDI bit of the one or more of NDI bits may correspond to each PDSCH of the one or more PDSCHs.

For example, the DCI may comprise a first frequency domain resource assignment field and a second frequency domain resource assignment field. The first frequency domain resource assignment field may indicate first resource(s) of the first TRP/coreset pool in frequency domain. The second frequency domain resource assignment field may indicate a second resource of the second TRP/coreset pool in frequency domain. For example, the DCI may comprise a first frequency domain resource assignment (RA) field. The first frequency domain RA field may indicate an entry of one or more frequency domain resource allocation lists. The entry may comprise a first field indicating first resource(s) of the first TRP/coreset pool and a second field indicating second resource(s) of the second TRP/coreset pool.

For example, the DCI may comprise a first time domain resource assignment field and a second time frequency domain resource assignment field. The first time domain resource assignment field may indicate first resource(s) of the first TRP/coreset pool in time domain. The second time domain resource assignment field may indicate a second resource of the second TRP/coreset pool in time domain. For example, the DCI may comprise a first time domain resource assignment (RA) field. The first time domain RA field may indicate an entry of one or more time domain resource allocation lists. The entry may comprise a first field indicating first resource(s) of the first TRP/coreset pool and a second field indicating second resource(s) of the second TRP/coreset pool. An entry of the one or more time domain resource allocation lists may comprise a plurality of fields/sub-entries.

In an example, a physical downlink control channel (PDCCH) may comprise one or more control-channel elements (CCEs). For example, the PDCCH may comprise one CCE, that may correspond to an aggregation level (AL)=1. For example, the PDCCH may comprise two CCEs, that may correspond to an AL of two (AL=2). For example, the PDCCH may comprise four CCEs, that may correspond to an AL of four (AL=4). For example, the PDCCH may comprise eight CCEs, that may correspond to an AL of eight (AL=8). For example, the PDCCH may comprise sixteen CCEs, that may correspond to an AL of sixteen (AL=16).

In an example, a PDCCH may be carried over one or more control resource set (coreset). A coreset may comprise N_rb_coreset resource blocks (RBs) in the frequency domain and N_symbol_coreset symbols in the time domain. For example, the N_rb_coreset may be multiple of 6 RBs (e.g., 6, 12, 18, . . . ,). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or a RB index. The wireless device may move to a next symbol in response to all RBs of the first symbol may have been indexed. The wireless device may map one or more REG indices for one or more 6 RBs of N_rb_coreset RBs within N_symbol_coreset OFDM symbols of the coreset.

In an example, a wireless device may receive configuration parameters from a base station. The configuration parameters may comprise one or more coresets. One coreset may be associated with one CCE-to-REG mapping. For example, a single coreset may have a single CCE mapping to physical RBs/resources of the single coreset. For example, a CCE-to-REG of a coreset may be interleaved or non-interleaved. For example, a REG bundle may comprise L consecutive REGs (e.g., iL, iL+1, . . . , iL+L−1). For example, L may be a REG bundle size (e.g., L=2 or 6 for N_symbol_coreset=1 and L=N_symbol_coreset or 6 when N_symbol_coreset is 2 or 3). A index of a REG bundle (e.g., i), may be in a range of [0, 1, . . . N_reg_coreset/L−1]. For example, N_reg_coreset may be defined as N_rb_coreset*N_symbol_coreset (e.g., a total number of REGs in the single coreset). For example, a j-th indexed CCE may comprise one or more REG bundles of {f(6j/L), f(6j/L+1), . . . , f(6j/L+6/L−1)}. For example, f(x) may be an interleaver function. In an example, f(x) may be x (e.g., j-th CCE may comprise 6j/L, 6j/L+1, . . . , and 6j/L+6/L−1), when the CCE-to-REG mapping may be non-interleaved. When the CCE-to-REG mapping may be interleaved, L may be defined as one of {2, 6} when N_symbol_coreset is 1 or may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R−1, c=0, 1, . . . , C−1, C=N_reg_coreset/(L*R), and R is one of {2, 3, 6}.

For example, the configuration parameters may comprise a frequencyDomainResources that may define N_rb_coreset. The configuration parameters may comprise duration that may define N_symbol_coreset. The configuration parameters may comprise cce-REG-MappingType that may be selected between interleaved or non-interleaved mapping. The configuration parameters may comprise reg-BundleSize that may define a value for L for the interleaved mapping. For the non-interleaved mapping, L=6 may be predetermined. The configuration parameters may comprise shfitIndex that may determine n_shift as one of {0, 1, . . . , 274}. The wireless device may determine/assume a same precoding for REGs within a REG bundle when precorder granularity (e.g., a precoderGranularity indicated/configured by the configuration parameters) is configured as sameAsREG-bundle. The wireless device may determine/assume a same precoding for all REGs within a set of contiguous RBs of a coreset when the precoderGranularity is configured as all-ContiguousRBs.

For a first coreset (e.g., CORESET#0) may be defined/configured with L=6, R=2, n_shift=cell ID, and precoderGranularity=sameAsREG-bundle.

In an example, a wireless device may receive up to M DCIs via a slot or a PDCCH monitoring occasion or a span of a scheduling cell. Each DCI of the M DCIs may schedule one or more PDSCHs for a scheduled cell. The wireless device may inform a wireless device capability of the M for a band/band combination or for each numerology pair between a scheduling cell and a scheduled cell.

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RBs, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+(N_start_BWP mode P))/P) where a size of a first RBG is P−N_start_BWP mode P, a size of a last RBG is (N_start_BWP+bandwidth) mode P wherein is (N_start_BWP+bandwidth) mode P is greater than zero, a size of other RB_Gs are P, and P is the rbg-Size. The bitmap of N_RBG bits with one bitmap bit per a corresponding RBG, such that the corresponding RBG may be scheduled. The one or more RB_Gs may be indexed in an order of increasing frequency, and indexing may start from a lowest frequency of the active BWP. The order of the bitmap may be determined such that RBG #0 to RBG# N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS. The frequency domain resource allocation field based on the resource allocation type 1 may use a resource allocation value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth−L_rbs+1)+(bandwidth−1−RB_start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI. The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PUSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHz), almost contiguous allocation may be supported. In frequency range 2 (e.g., above 7 GHz and below 52.6 GHz), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M(M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M(M+1)/2 (e.g., RIV>=M(M+1)/2), the RIV may indicate a starting interlace index m_0 and a set of values 1 based on one or more set of values. For example, an entry may represent {RIV−M(M+1)/2, m_0, 1}. T For example, the one or more set of values may comprise {0, 0, {0, 5}}, {1, 0, {0, 1, 5, 6}}{2, 1, {0, 5}1, {3, 1, {0, 1, 3, 5, 6, 7, 8}}, {4, 2, {0, 5}}, {5, 2, {0, 1, 2, 5, 6, 7}}, {6, 3, 10, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicaor-ForDCIFormat0_1 to 'puschRep-TypeB' indicating a repetition type B. In response to being configured with 'puschRepTypeB', the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to 'puschRepTypeB' to apply the repetition type B for a second DCI based on a DCI format 0_2. When the base station may not configure PUSCHRepTypeIndicaor-ForDCIFormat0_1 indicating 'puschRepTypeB', the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLF value may define SLIV=14*(14−L+1)+(14−1−S) when (L−1) is larger than 7. For example, L would be greater than 0, and may be smaller than or equal to 14−S. In an uplink BWP with an extended CP, 12 OFDM symbols may be assumed for a slot. A SLIV value may be determined by 12*(L−1)+S or 12*(12−L+1)+(14−1−S) respectively based on L−1 being smaller than/equal to 6 or larger than 6. For the repetition type A, the configuration parameters may comprise/indicate a TypeA or Type B for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the typeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {{0, . . . , 13}, {1, . . . , 14}, {1, . . . , 14} for a repetition type A, {1, . . . , 27} for a repetition type B} for the normal CP, and {{0, . . . , 11}, {1, . . . , 12}, {1, . . . , 12}} for the extended CP.

For a repetition type A, a wireless device may determine a repetition number K based on a row of a time domain resource allocation table. The row may comprise a number of repetitions. The wireless device may determine based on an RRC parameter, 'pusch-AggregationFactor' when the row may not comprise the number of repetitions. The wireless device may determine a single transmission based on the row may not comprise the number of repetitions nor the 'pusch-AggregationFactor' is not configured. The wireless device may determine the single transmission for a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted when the slot may not have a sufficient number of uplink OFDM symbols for the PUSCH transmission. For a repetition type B, a wireless device may determine one or more slots for a number of nominal repetition number N. For a i-th nominal repetition, wherein i is 0, . . . , N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+(i+1)*L−1)/N_slot_symbol), and an ending symbol in the second slot may be determined as mod (S+(i+1)*L−1, N_slot_symbol). The Ks may be determined as a starting slot indicated by the time domain resource allocation field of the DCI.

When the wireless device is configured with the repetition type B, the wireless device may determine invalid OFDM symbol for PUSCH repetitions based on a tdd-UL-DL-ConfigurationCommon/a tdd-UL-DL-ConfigurationDedicated and/or an InvalidSymbolPattern indicated by an RRC signaling. For example, the wireless device may determine a downlink symbol based on the tdd-UL-DL-ConfigurationCommon or the tdd-UL-DL-ConfigurationDedicated as an invalid OFDM symbol for the repetition type B. The base station may transmit the InvalidSymbolPattern, a bitmap of OFDM symbols over one slot or two slots. A bit of the bitmap may indicate '1' to invalidate a corresponding OFDM symbol. The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, a invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPatternIndicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a row of a time domain resource allocation may comprise one or more resource assignments for one or more contiguous PUSCHs. A K2 of the row may indicate a first PSCH of the one or more contiguous PUSCHs. Each PUSCH of the one or more contiguous PUSCHs may be indicated/scheduled with a separate SLIV value and a PUSCH mapping type.

A similar mechanism may be used to schedule a time domain resource for a downlink data.

In an example, a scheduling with a first numerology may be configured to schedule downlink and/or uplink resources of a scheduled cell with a second numerology. A DCI of a cross-carrier scheduling may comprise a time domain resource allocation field (TDRA field). The TDRA field may indicate an entry or an index of a row of a TDRA table. A base station may transmit one or more RRC messages indicating/comprising configuration parameters. The configuration parameters may indicate/comprise the TDRA table that comprise a list of TDRA entries. A TDRA entry may comprise at least one of a scheduling offset, a mapping type and a starting and length indicator vector (SLIV). Based on a size of the list, a bit size of the TDRA field may be determined. For example, when the TDRA table has 16 entries, the bit size of the TDRA field may be 4 bits. When the TDRA table has 64 entries, the bit size of the TDRA field may be 6 bits.

In existing technologies, the configuration parameters may comprise a limited number of TDRA entries (e.g., 16, 32 or 64) in the TDRA table. A first entry of the TDRA table may comprise a first scheduling offset (k0) and a first SLIV value. A second entry of the TDRA table may comprise a second scheduling offset (k0) and a second SLIV value. When the first numerology is much smaller than the second numerology, a slot of the first cell based on the first numerology may correspond or overlap with a plurality of slots of the second cell based on the second numerology. For example, when the first numerology is 15 kHz with a normal CP and the second numerology is 960 kHz with an extended/normal CP, the slot of the first cell corresponds to 64 slots of the second cell. For example, a DCI scheduled via the slot of the first cell may need to indicate one of 64 slots as a slot of the scheduled cell. This may impose a value of the scheduling offset being at least between [0, . . . , 63]. For example, when a cross-slot scheduling from the first cell perspective becomes available (e.g., 1 slot, 2 slot, . . . M slots), a value range of the scheduling offset becomes [0, . . . , 64*M]. For example, when M is 4, the value range becomes [0, . . . , 255].

To accommodate various values of the scheduling offset, a number of TDRA entries may be increased considerably. For example, to capture a single entry for a scheduling offset value, 64*M entries are needed (e.g., 256 entries when M=4). An increased number of TDRA entries may increase signaling overhead via RRC signaling and also increase DCI overhead by increasing a field size of the TDRA field (e.g., 8 bits for 256 entries). The overhead may linearly increase with a number of SLIV entries required for each slot. For example, when K (e.g., K=4) different SLIV values are needed for each slot, the number of TDRA entries in the TDRA table may increase up to 64*M*K=1024, and a field size of the TDRA field increases to 10 bits. Implementation of existing technologies may not be scalable for a scenario where subcarrier spacing of a scheduling cell is much smaller than a subcarrier spacing of a scheduled cell. Enhancements to time domain resource allocation mechanism may be needed for the cases of different numerologies being used for a cross-carrier scheduling scenario.

In an example, a base station may transmit one or more RRC messages comprising configuration parameters. The configuration parameters may comprise a list of TDRA entries for a TDRA table. Each entry or each row of the list of TDRA entries or the TDRA table may comprise a scheduling offset and a SLIV value. The configuration parameters may additionally comprise a list of additional scheduling offset (e.g., a list of additional scheduling ratio) values. An additional scheduling offset value of the list of additional scheduling offset values may represent a number of slots that determines a gap between a scheduling DCI and a first PDSCH scheduled by the DCI. The wireless device may receive a DCI, scheduling one or more PDSCHs, indicating a first value indicating one of the list of additional scheduling offset values. The DCI may further indicate a second value indicating an entry of the TDRA table or an entry of the list of TDRA entries. The wireless device may determine a first slot for a first PDSCH of the one or more PDSCHs based on the scheduling offset (e.g., K0) of the entry of the TDRA table and the one of the list of additional scheduling offset values (e.g., ASO, K0_min, K0_ratio). For example, the first slot may be a slot after K of a slot n, where the wireless device receives the DCI via the slot n. The K may be determined as a sum of the scheduling offset and the one of the list of additional scheduling offset values (e.g., K=K0+K0_min). For example, K may be determined as a multiplication of the scheduling offset and the one of the list of additional scheduling offset values (e.g., K=K0*K0_ratio). The wireless device may determine one or more slots for the one or more PDSCHs based on the first slot and the entry of the TDRA table. The wireless device may determine one or more symbols of the first slot for the first PDSCH based on the entry of the TDRA table. The wireless device may receive the first PDSCH via the first slot and the one or more symbols. The wireless device may receive the one or more PDSCHs via the one or more slots. Example embodiments may reduce signaling overhead of a TDRA table configuration via RRC signaling. Example embodiments may enhance scheduling flexibility by additional scheduling offset that may be dynamically indicated via DCI/MAC CE signaling or semi-statically indicated via RRC signaling.

In an example, a base station may transmit one or more RRC messages comprising configuration parameters. The configuration parameters may comprise a list of SLIV values. For example, a number of values in the list of SLIV values is a limited number M (e.g., M=4, 8). The configuration parameters may comprise a list of TDRA values/indexes, where each TDRA value or index may indicate a TDRA entry of a TDRA table. The TDRA entry may comprise a scheduling offset and a value of the list of SLIV values. A wireless device may receive a scheduling DCI, indicating resources for one or more PDSCHs, comprising a TDRA field indicating an entry or an index of the TDRA table. The wireless device may determine time domain resources of the one or more PDSCHs based on the entry or the index of the TDRA table. The wireless device may receive the one or more PDSCHs based on the time domain resources. Example embodiments may reduce signaling overhead of a TDRA table by reducing a bit size require for a SLV value for each entry of the TDRA table.

Embodiments in the specification may be applied to a scenario where a DCI schedules multiple PDSCHs/PUSCHs where the multiple PDSCHs/PUSCHs comprise one or more repetitions of at least one transport block. Embodiments may be also applied to a sidelink control information scheduling one or more physical sidelink shared channels (PSSCHs) or a DCI scheduling resources for one or more PSSCHs.

In an example, a base station may transmit one or more RRC messages indicating configuration parameters. The configuration parameters may comprise parameters of a cross-carrier scheduling for a scheduled cell. The configuration parameters may indicate/comprise parameters for a multi-PDSCH scheduling. For example, the parameters of the cross-carrier scheduling may comprise an index of a scheduling cell. The parameters of the cross-carrier scheduling may comprise/indicate one or more search spaces for the cross-carrier scheduling. The parameters of the cross-carrier scheduling may comprise/indicate one or more coresets and/or one or more scheduling search spaces of a BWP of the scheduling cell. The wireless device may monitor one or more DCI formats via the one or more coresets and/or the one or more scheduling search spaces, where the one or more DCI formats may be used to schedule resources of one or more PDSCHs via the scheduled cell and/or one or more resources of one or more PUSCHs via the scheduled cell. For example, the one or more DCI formats may comprise at least one of a DCI format 1-1, a DCI format 1-2, a DCI format 0_1, a DCI format 0_2, a DCI format 1_3 or a DCI format 0_3.

For example, the configuration parameters may comprise/indicate a list of TDRA entries of a TDRA table for the scheduled cell. An entry or a row of the TDRA table or the list of TDRA entries may comprise one or more of {a scheduling offset, a mapping type, a SLIV value}. A DCI, based on a DCI format of the one or more DCI formats, may indicate an index or an entry of the list of TDRA entries of the TDRA table as a time domain resource for the scheduled cell. The DCI may indicate frequency resources via the scheduled cell. For example, the scheduling cell may be configured with one or more BWPs, where each BWP of the one or more BWPs is configured with a numerology or a subcarrier spacing. The scheduled cell may be configured with one or more second BWPs, where each BWP of the one or more second BWPs is configured with a numerology or a subcarrier spacing. For example, the one or more BWPs of the scheduling cell may be configured with 15 kHz and/or 30 kHz subcarrier spacings. The one or more second BWPs of the scheduled cell may be configured with 240 kHz, 480 kHz and/or 960 kHz subcarrier spacings.

Figure 22:
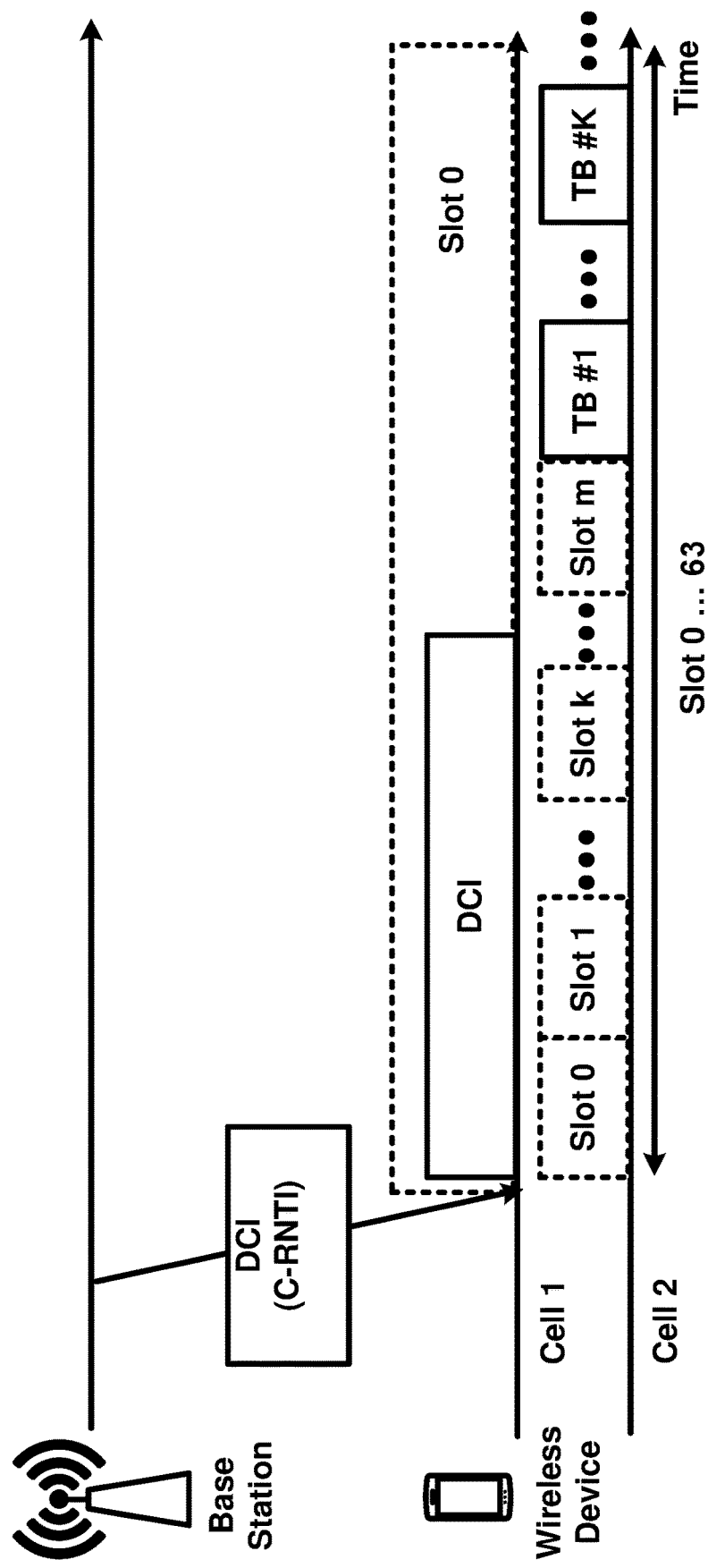
FIG. 22 illustrates an example of a cross-carrier scheduling of a multi-PDSCH scheduling as per an aspect of an embodiment of the present disclosure.

FIG. 22 illustrates an example of a cross-carrier scheduling of a multi-PDSCH scheduling as per an aspect of an embodiment of the present disclosure. The base station transmits a DCI via a scheduling cell (e.g., Cell 1) for a scheduled cell (e.g., Cell 2). A first active BWP of the scheduling cell operates with a first numerology (e.g., 15 kHz with a normal CP). A second active BWP of the scheduled cell operates with a second numerology (e.g., 960 kHz with a normal CP). For example, a slot of the scheduling cell may overlap with a plurality of slots of the scheduled cell. For example, 64 slots of the scheduled cell may overlap with the slot of the scheduling cell. The DCI may be spanned over P symbols of the scheduling cell (e.g., P=2 or 3). The DCI may overlap with k slots of the scheduled cell. The DCI may comprise resources for plurality of PDSCHs of a plurality of TBs. For example, each of the plurality of PDSCHs may correspond to one or two TBs of the plurality of TBs. For example, a PDSCH may correspond to a TB in response to multiple TBs are disabled or not configured for the scheduled cell. The PDSCH may correspond to two TBs in response to the multiple TBs are enabled and/or being configured for the scheduled cell.

In FIG. 22, the DCI may schedule K PDSCHs, where each PDSCH may schedule a TB. For example, the K PDSCHs may be scheduled via slot m+1, . . . , slot m+K. The K PDSCHs may be scheduled via contiguous slots. For example, the K PDSCHs may be scheduled via slot m+1, . . . , slot m+P (e.g., P>K). The PDSCHs may be scheduled via non-contiguous slots. For example, the wireless device may skip one or more slots that are indicated as uplink slots. For example, the wireless device may skip one or more slots that are indicated as skipped or not allocated with a time domain resource by the DCI.

The DCI may indicate an index to an entry of the TDRA table. The wireless device may determine time domain resources of the one or more PDSCHs based on the index to the entry of the TDRA table. The DCI may indicate/comprise frequency domain resources for the one or more PDSCHs. For example, the frequency domain resources are common or same across the one or more PDSCHs. For example, the frequency domain resources may be determined based on a frequency resource allocation indicated by the DCI and one or more hopping patterns.

For example, when an inter-slot hopping pattern is indicated/enabled and/or configured, the wireless device may determine frequency resources of a PDSCH of the one or more PDSCHs based on a frequency domain resource allocation field of the DCI and a hopping pattern indicated by the DCI and/or one or more hopping patterns configured via a RRC signaling. Based on the inter-slot hopping pattern, for example, a first PDSCH of the one or more PDSCHs may occur a set of PRBs (e.g., PRB#1, ..., PRB#M). A second PDSCH of the one or more PDSCHs may occur a second set of PRBs that has offset of a hopping offset based on the hopping pattern (e.g., PRB#1+o, ..., PRB#M+o, where o is the hopping offset). For example, when intra-slot hopping is used, different frequency resources may be used for a first half of a PDSCH and a second half of the PDSCH.

For example, hopping pattern may be configured where the wireless device may determine frequency resources of a PDSCH of the one or more PDSCHs based on the hopping pattern.

As shown in FIG. 22, the DCI transmitted via a first slot of the scheduling cell (e.g., slot 0) may be able to schedule one or more PDSCHs via a plurality of slots (e.g., sot 0, ... slot 63). A scheduling offset of the DCI may need to cover from 0 to 63 at least. For example, FIG. 22 shows that the scheduling offset indicated by the DCI is m+1. An earliest PDSCH of the one or more PDSCHs may start at the slot m+1 based on the scheduling offset.

Figure 23:
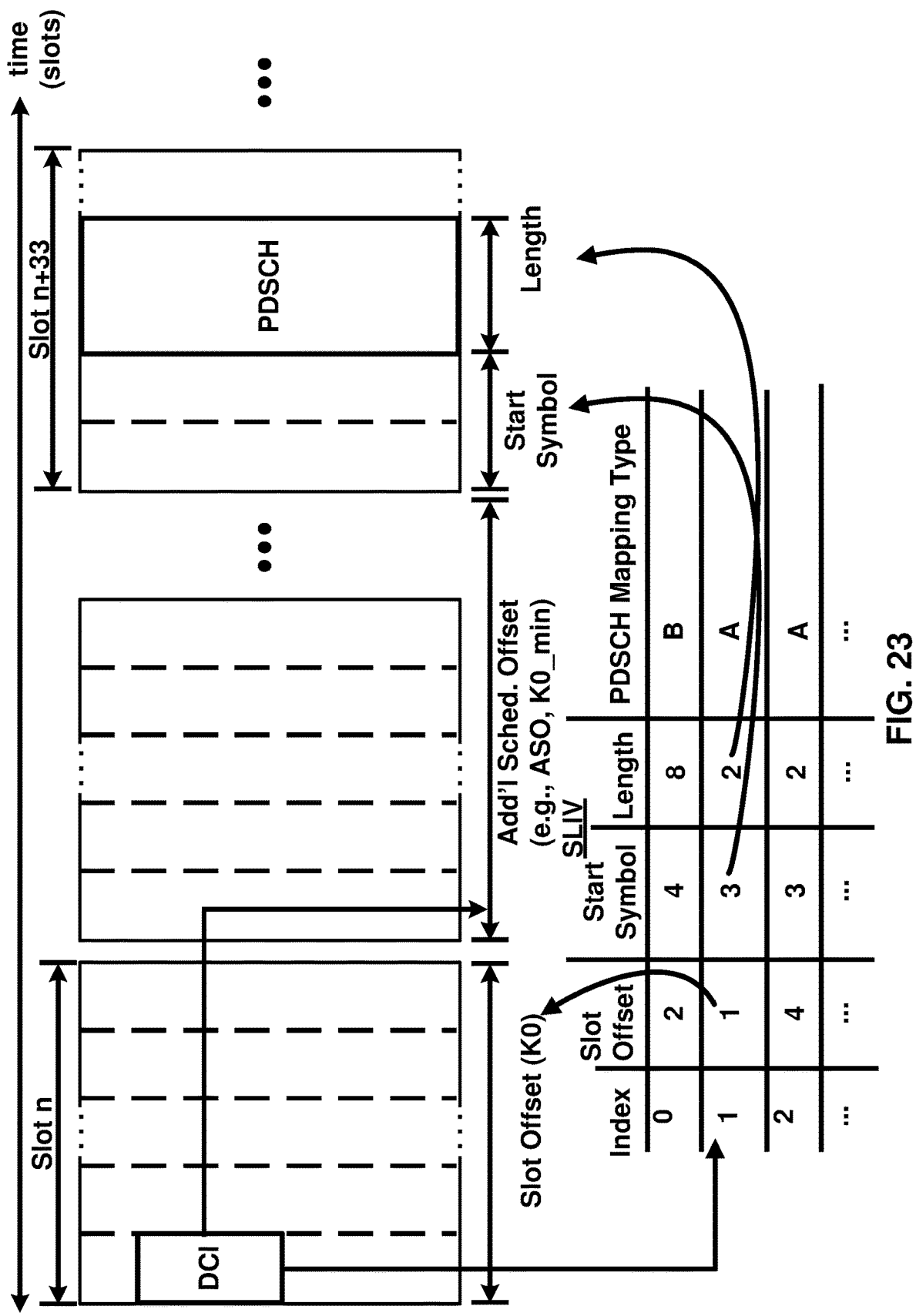
FIG. 23 illustrates an example embodiment as per an aspect of an embodiment of the present disclosure.

FIG. 23 illustrates an example embodiment as per an aspect of an embodiment of the present disclosure. Based on the configuration parameters, the wireless device may determine a time domain resource allocation table shown in FIG. 23. For example, the time domain resource allocation (TDRA) table has a list of entries. Each entry comprises an index (e.g., an index of the entry, an index of a row of the entry in the time domain resource allocation table), a scheduling offset (or a slot offset, K0, k0), a SLIV (e.g., a starting symbol and a length) and a mapping type (e.g., PDSCH Mapping Type). The wireless device may receive the DCI in a slot n. The DCI may indicate an index=1 for the TDRA table. The wireless device may determine a scheduling offset value 1, and a starting symbol of 3 and a length of 2 based on an index=1 of the TDRA table. The DCI may indicate an additional scheduling offset value (e.g., k0_min, ASO). For example, the additional scheduling offset value is 32. The wireless device may determine resources scheduled by the DCI, wherein the resources are in a slot n+33 (based on slot n and the scheduling offset 1 and the additional scheduling offset value is 32) and $3^{rd}$ and $4^{th}$ symbols of the slot n+33. The wireless device may receive a PDSCH via the resources. The wireless device may decode a transport block carried via the PDSCH based on the receiving the PDSCH.

In an example, the configuration parameters may indicate/comprise a set of additional scheduling offset values. For example, the set of additional scheduling offset values may comprise {0, m, 2*m, 4*m, ... }. For example, the set of additional scheduling offset values may comprise {0, m}. For example, the set of additional scheduling offset values may be a single additional scheduling offset value. In an example, the wireless device may update/determine the TDRA table or the list of TDRA entries based on the set of additional scheduling offset values or the single additional scheduling offset. For example, the wireless device may update each entry of the TDRA table or the list of TDRA entries as {a scheduling offset configured by the configuration parameters+an additional scheduling offset value, a SLIV value configured by the configuration parameters}. The wireless device may determine the additional scheduling offset value of the set of additional scheduling offset values based on one or more determination rules or based on the single additional scheduling offset value.

For example, a size of the set of additional scheduling offset values may be P. The wireless device may determine an additional scheduling offset of a DCI based on one or more examples. For example, the DCI, comprising resource assignment(s) for the one or more PDSCHs, may comprise a bit field indicating one of the set of additional scheduling offset values. For example, a bit size of the bit field is log 2(P) (e.g., 2 bits when P=4). For example, the DCI may indicate a second value of the set of additional scheduling offset values (e.g., m). The wireless device may determine a first slot of the one or more PDSCHs based on a time domain resource allocation field of the DCI and the bit field of the DCI. For example, the wireless device may determine the first slot that starts after k0+m, where k0 is a scheduling offset indicated by the TDRA field of the DCI and m is an additional scheduling offset value indicated by the bit field of the DCI.

Figure 24:
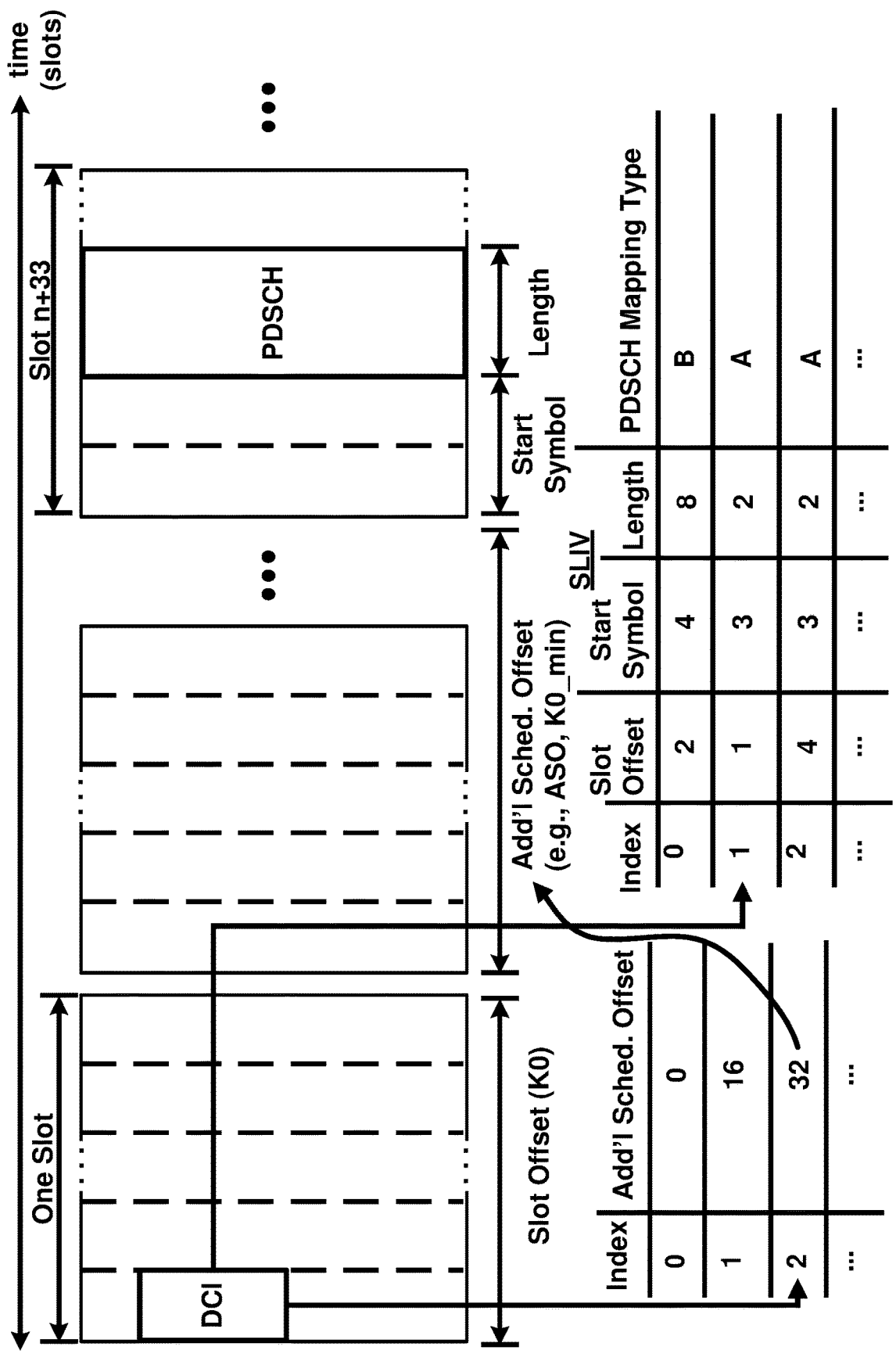
FIG. 24 illustrates an example embodiment as per an aspect of an embodiment of the present disclosure.

FIG. 24 illustrates an example embodiment as per an aspect of an embodiment of the present disclosure. FIG. 24 shows a similar example to FIG. 23 except that additional configuration of a set of additional scheduling offset values (e.g., Add'l Sched. Offset). The configuration parameters may comprise the set of additional scheduling offset values. The wireless device may determine an index of each additional scheduling offset value of the set of additional scheduling offset values based on an order of the each additional scheduling offset values. For example, an earliest or first value has an index 0 (or 1), second value has an index 1 (or 2) and so on. The DCI may indicate a first index indicating one of the set of additional scheduling offset values (e.g., the first index=2) and a second index indicating one entry of the TDRA table (e.g., the second index=1). For example, the wireless device may determine an additional scheduling offset for the PDSCH based on the first index and the set of additional scheduling offset values (e.g., the additional scheduling offset=32 in FIG. 24). The wireless device may determine a scheduling offset and a SLIV for the PDSCH based on the second index and the TDRA table (e.g., the scheduling offset is 4 and SLIV is (3, 2)). The wireless device may determine the slot of resources of the PDSCH based on the additional scheduling offset and the scheduling offset (e.g., sum of the additional scheduling offset and the scheduling offset=36, multiply the additional scheduling offset and the scheduling offset=32*4=128). The wireless device may determine a slot index of n+36 as the slot where the wireless device receives the PDSCH. The wireless device may determine symbols in the slot based on the SLIV value (e.g., $3^{rd}$ and $4^{th}$ symbols of the slot n+36 are used for the PDSCH). The wireless device may receive the PDSCH via the $3^{rd}$ and $4^{th}$ symbols of the slot n+36. The wireless device may decode a transport block carried via the PDSCH.

In an example, the configuration parameters may indicate/comprise a set of {an additional scheduling offset, a first subcarrier spacing, a second subcarrier spacing}. For example, the first subcarrier spacing may be a first threshold for a scheduling cell. For example, the additional scheduling offset may be used when a subcarrier spacing of a scheduling cell may be smaller than or equal to the first subcarrier spacing. The second subcarrier spacing may be a second threshold for a scheduled cell. For example, the additional scheduling offset may be used when a subcarrier spacing of a scheduled cell may be larger than or equal to the second subcarrier spacing.

The configuration parameters may comprise one or more of {an additional scheduling offset, a first subcarrier spacing, a second subcarrier spacing}. Based on a numerology of the scheduling cell and a numerology of the scheduled cell, an additional scheduling offset may be determined.

In an example, the configuration parameters may indicate/comprise a set of {an additional scheduling offset, a subcarrier spacing ratio}. For example, the additional scheduling offset may be used when a first subcarrier spacing of a scheduling cell is smaller than or equal to a second subcarrier spacing of a scheduled cell divided by the subcarrier spacing ratio. For example, the subcarrier spacing ratio may be 16. When the scheduling cell operates with 15 kHz and the scheduled cell operates with 240 kHz or higher than 240 kHz, the additional scheduling offset may be applied for a time domain resource allocation.

The configuration parameters may comprise one or more of {an additional scheduling offset, a subcarrier spacing ratio}. Based on a numerology of the scheduling cell and a numerology of the scheduled cell, an additional scheduling offset may be determined.

In an example, a wireless device may determine an additional scheduling offset or a minimum scheduling offset based on a list of one or more combination of {a first subcarrier spacing (SCS) of a scheduling cell, a second SCS of a scheduled cell, an additional scheduling offset (ASO)}. FIG. 25 illustrates an example of the list of the combinations as per an aspect of an embodiment of the present disclosure. The list may be (pre)-defined per a pair of SCS combination between a scheduled cell and a scheduling cell. When a pair of {a first SCS of a scheduling cell, a second SCS of a scheduled cell} is not present in the list, the wireless device may assume/determine an additional scheduling offset or a minimum scheduling offset is zero (in case of K0_min is added or used for addition to a scheduling offset, or one in case K0_ratio is multiplied for the scheduling offset). For example, the wireless device may determine the additional scheduling offset or the minimum scheduling offset being zero (or one) in response to a self-carrier scheduling is used/enabled.

When the wireless device is configured with a cross-carrier scheduling and a self-carrier scheduling for a serving cell, the wireless device may apply a first additional scheduling offset for one or more DCIs scheduled via cross-carrier scheduling and a second additional scheduling offset for one or more second DCIs scheduled via self-carrier scheduling. The first additional scheduling offset may be different from the second additional scheduling offset. The wireless device may determine the self-carrier or the cross-carrier based on search space and/or coreset that the wireless device monitors the one or more DCIs or the one or more second DCIs via.

In an example, an additional scheduling offset may comprise two sub-values. For example, the additional scheduling offset may comprise a ratio (R) and an offset (O). The wireless device may determine the ratio based on a maximum number of PDSCHs or a maximum number of PUSCHs (e.g., M, M1 for PDSCH, M2 for PUSCH) scheduled by a single DCI. In an example, the configuration parameters may indicate a value for the ratio and the offset. For example, the configuration parameters may indicate a value for the offset. For example, the offset may be determined based on the maximum number of PDSCHs or the maximum number of PUSCHs. The ratio may be configured via the configuration parameters. The wireless device may determine a first slot, of a first PDSCH scheduled by a DCI indicating a scheduling offset (k0, or a slot offset), based on the k0 and the additional scheduling offset. For example, an index of the first slot K may be determined as n+(k0*R+0) where n is a slot index of a second slot where the wireless device receives the DCI. The wireless device may multiple the ratio and add/sum the offset based on the slot/scheduling offset to determine the first slot.

In the specification, the wireless device may apply the additional scheduling offset (e.g., K0_min, ASO, K0_ratio) to determine a slot of a PDSCH scheduled by a DCI indicating a scheduling offset based on a function. For example, the function is a sum of the additional scheduling offset and the scheduling offset (or slot offset). For example, the function is a multiplication of the additional scheduling offset and the scheduling offset (or slot offset). For example, the function is a subtraction the scheduling offset by the additional scheduling offset. For example, the function is dividing the scheduling offset by the additional scheduling offset. For example, the function is a combination of multiplication and addition (e.g., the scheduling offset is multiplied by a ratio of the additional scheduling offset and added by an offset of the additional scheduling offset). The additional scheduling offset may be referred as a minimum scheduling offset, a minimum slot offset, a scheduling offset ratio, a slot offset ratio, a ratio, and/or the like. The additional scheduling offset may be (pre-)determined based on a first SCS of a scheduling cell and a second SCS of a scheduled cell.

In the specification, when the wireless device determines a first slot of a PDSCH scheduled by a DCI or a resource of a configured grant or a SPS, the wireless device may use one example of the function between a scheduling offset, indicated by the DCI, and an additional scheduling offset.

FIG. 25 shows that when a first SCS of the scheduling cell is 15 kHz and a second SCS of the scheduled cell is 240 kHz, an additional scheduling offset (ASO) of k1 slots may be used. For example, a first cell operating with 15 kHz schedules a second cell operating with 240 kHz. The wireless device may receive a DCI, via the first cell, comprising a time domain resource allocation indicating a scheduling offset (k0) and a SLIV value for the second cell. The wireless device may determine a first slot that is an earliest slot of the resources indicated by the DCI based on the scheduling offset (k0) and the additional scheduling offset (e.g., k0+k1). The wireless device may determine symbol(s) in the first slot based on the SLIV.

The wireless device may determine a first SCS of the scheduling cell based on a SCS of an active BWP of the scheduling cell. The wireless device may determine a second SCS of the scheduled cell based on a SCS of an active BWP of the scheduled cell.

When an active BWP of the scheduled cell and/or an active BWP of the scheduling cell changes, the wireless device may determine an additional scheduling offset based on a combination of a current (e.g., new) active BWP of the scheduled cell and a current (e.g., new) active BWP of the scheduling cell.

In an example, a wireless device may determine an entry of the list of the one or more combination of {a first SCS, a second SCS, an ASO} based on a first SCS of a first active BWP of a scheduling cell and a second SCS of a second active BWP of a scheduled cell. The wireless device may determine an entry where a first SCS of the entry is smaller than or equal to the first SCS of the first active BWP and a second SCS of the entry is larger than or equal to the second SCS of the second active BWP. When there are a plurality of entries satisfying the determining, the wireless device may select an entry among the plurality of entries, wherein the entry has a smallest (or largest) ASO value among the plurality of entries or the entry has a largest (or smallest) first SCS among the plurality of entries or the entry has a smallest (or largest) second SCS among the plurality of entries.

In an example, a list of {an additional scheduling offset, a ratio threshold} may be (pre-)determined/(pre-)configured. For example, a wireless device may determine a ratio between a first SCS of a scheduling cell and a second SCS of a scheduled cell. For example, the ratio may be 64 (e.g., 960 kHz of the scheduled cell/15 kHz of the scheduling cell). For example, an entry of the list may comprise {k1, 32}. When the ratio becomes higher than or equal to the ratio threshold, the wireless device may apply k1 as the additional scheduling offset. The ratio may be determined by a second SCS of the scheduled cell divided by a first SCS of the scheduling cell.

When there are multiple entries in the list, which satisfy based on a first active BWP of the scheduling cell and a second active BWP of the scheduled cell, the wireless device may determine an entry with a largest value of a ratio threshold. The wireless device may determine a largest (or smallest) ratio threshold that a first SCS of the first active BWP and a second SCS of the second active BWP satisfy among one or more ratio threshold values of the list.

In an example, a base station may transmit one or more RRC messages indicating/comprising configuration parameters. The configuration parameters may comprise/indicate a cross-carrier scheduling for a second cell. The configuration parameters may comprise/indicate a first cell cross-carrier scheduling the second cell. The configuration parameters may indicate a maximum number of DCIs (e.g., M), for the second cell, received via a PDCCH monitoring occasion of the first cell or a slot or a PDCCH monitoring span. A wireless device may receive up to M DCIs, via the first cell, scheduling resources of the second cell in a PDCCH monitoring occasion/span or in a slot of the first cell.

In an example, the wireless device may determine the M (e.g., the maximum number of DCIs) based on a capability of the wireless device for a pair of {a first SCS of a scheduling cell, a second SCS of a scheduled cell}. For example, the wireless device may transmit a value for each pair of {a first SCS of a scheduling cell, a second SCS of a scheduled cell, a number of cross-carrier scheduling cells}. For example, the number of cross-carrier scheduling cells may indicate an allowed number of cross-carrier configuration across configured/activated serving cells based on the second SCS. The wireless device may assume the number of cross-carrier scheduling cells for a pair of {a first SCS, a second SCS} as one (1).

The wireless device may determine the M based on a reported capability for a pair of {a first SCS, a second SCS}, where the first SCS is a SCS of a first active BWP of the scheduling cell and the second SCS is a SCS of a second active BWP of the scheduled cell.

The configuration parameters may comprise/indicate a number of maximum DCIs M via a PDCCH monitoring occasion/span/a slot, where the M is smaller than or equal to a capability of the wireless device. For example, the wireless device may receive $1^{st}$ DCI, $2^{nd}$ DCI, . . . , and M-th DCI via a PDCCH monitoring occasion, a span, or a slot of the scheduling cell. For example, a span is a number of consecutive symbols in a slot where the UE is configured to monitor PDCCH. Each PDCCH monitoring occasion is within one span. The span may comprise one or more coresets and/or one or more PDCCH monitoring occasions, where the span may be contiguous symbols.

The wireless device may determine an order of M DCIs via a PDCCH monitoring occasion, a span or a slot of the scheduling cell based on one or more rules. For example, a DCI of the M DCIs may comprise/indicate a DCI index (e.g., DCII). The DCI index may indicate an order of the DCI among the M DCIs. For example, $1^{st}$ DCI may indicate 0 (or 1) for the DCI index. $2^{nd}$ DCI may indicate 1 (or 2) for the DCI index. M-th DCI may indicate M−1 (or M) for the DCI index. In an example, a DCI of the M DCIs may determine an order based on a CRC scrambling used for the DCI. For example, a first RNTI may be used to indicate $1^{st}$ DCI. A second RNTI may be used to indicate $2^{nd}$ DCI. The configuration parameters may indicate/comprise one or more RNTIs. The wireless device may determine an order of the DCI based on a CRC (e.g., RNTI) scrambled/used for the DCI.

In an example, the configuration parameters may comprise/indicate a set of additional scheduling offset values. Each of the set of additional scheduling offset values may correspond to an DCI index or an order of DCI among M DCIs of a PDCCH monitoring occasion, a span or a slot of the scheduling cell.

For example, the set of additional scheduling offset values may comprise {k1, k2, . . . , kM} where ki maps to i-th DCI of M DCIs. The set of {k1, k2, . . . , kM} may be configured via RRC/MAC-CE/DCI signaling or may be pre-configured to the wireless device.

In an example, the set of {k1, k2, . . . , kM} may be pre-configured/pre-determined based on an initial value and a gap. For example, the initial value may be k0_min, and the gap is K slots. The wireless device may determine a first additional scheduling offset for the $1^{st}$ DCI as k0_min. The wireless device may determine a second scheduling offset for the $2^{nd}$ DCI as k0_min+K. The wireless device may determine a scheduling offset for the P-th DCI as k0_min+K*(P−1). The gap may determine a step to increment between two DCIs for the additional scheduling offset. The k0_min may determine a first value to the additional scheduling offset.

In an example, the K may be determined based on a maximum number of PDSCHs (M1) or PUSCHs (M2) that a DCI may schedule for the scheduled cell. For example, when the DCI may schedule up to Q PDSCHs or Q PUSCHs based on a multi-PDSCH or a multi-PUSCH scheduling, the K may be set to Q. For example, the initial value k0_min may be determined based on a capability of the wireless device. For example, k0_min may be determined based on a pair of {a first SCS of the scheduled cell, a second SCS of the scheduling cell}. For example, k0_min may be determined as a number of symbols or a number of slots of the scheduled cell. For example, k0_min may be 14 OFDM symbols when the second SCS of the scheduled cell is 480 kHz and the first SCS of the scheduling cell is 60 kHz.

Figure 26:
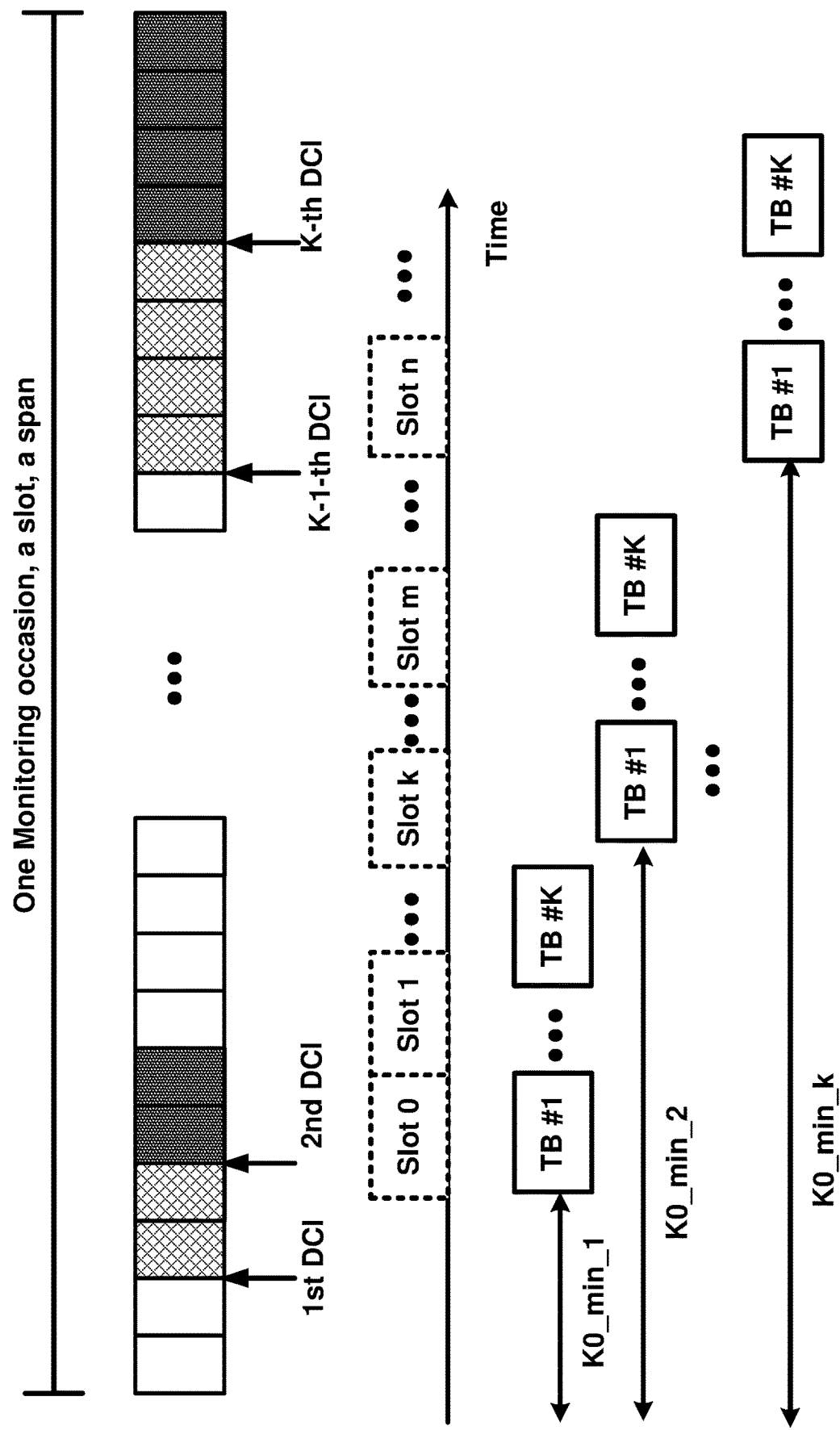
FIG. 26 illustrates an example of multiple DCIs via a span an aspect of an embodiment of the present disclosure.

FIG. 26 illustrates an example of multiple DCIs via a PDCCH monitoring occasion (or a slot or a span) an aspect of an embodiment of the present disclosure. For example, each of the multiple DCIs may schedule resources for one or more PDSCHs of a scheduled cell or one or more PUSCHs of the scheduled cell. The base station schedules $1^{st}$ DCI, $2^{nd}$ DCI, . . . , K-th DCI via the PDCCH monitoring occasion or the span or the slot of a scheduling cell. For example, an additional scheduling offset (e.g., K0_min) may be determined for each DCI based on an order of the each DCI among the multiple DCIs. For example, $1^{st}$ DCI may apply K0_min_1, that may be determined based on a capability of the wireless device for the scheduling cell. For example, K0_min_1 may be 0 or K0_min_1 is a processing time of a DCI. $2^{nd}$ DCI may apply K0_min_2 that is determined based on the K0_min_1+m*M where m is an order of $2^{nd}$ DCI among the multiple DCIs (e.g., M=an order−1) and M is a maximum number of PDSCHs (e.g., M=M1) or a maximum number of PUSCHs (e.g., M=M2) that a single DCI of the multiple DCIs may schedule (e.g., M=8, 16). The wireless device may determine K0_min_k for K-th DCI as K0_min+1+(K−1)*M.

Figure 27:
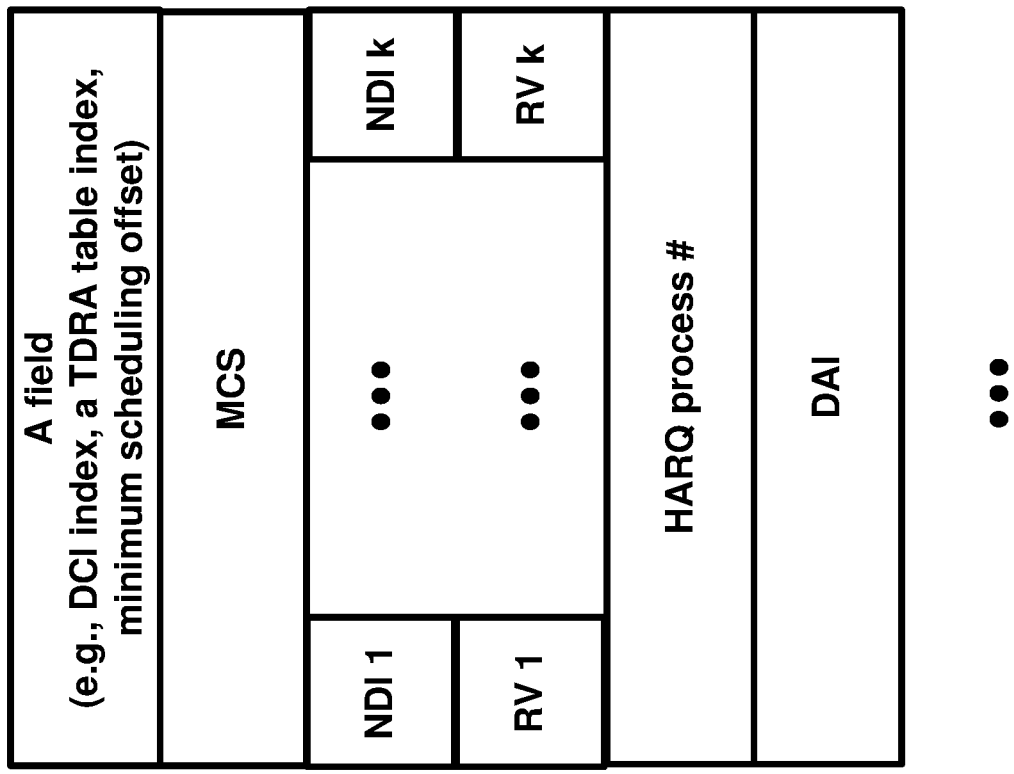
FIG. 27 illustrates an example of a DCI field comprising a field indicating an additional scheduling offset value as per an aspect of an embodiment of the present disclosure.

FIG. 27 illustrates an example of a DCI field comprising a field indicating an additional scheduling offset value as per an aspect of an embodiment of the present disclosure. For example, the DCI field may indicate an order of a DCI (e.g., a DCI index) among the multiple DCIs via a PDCCH monitoring occasion, a span or a slot. For example, the field may indicate a DCI index that indicates an order of the DCI. The wireless device may be configured with a set of additional scheduling offset values, where each of the set of additional scheduling offset values may be used for a DCI index of one or more DCI indices. The wireless device may determine an additional scheduling offset value based on a minimum additional scheduling offset value and a gap between two adjacent DCI index values.

For example, the field may indicate a TDRA table index. The wireless device may be configured with a plurality of TDRA tables, where each TDRA table may determine different range of scheduling offset values (e.g., a first TDRA table, of the plurality of TDRA tables, with k0 in [0, 31], a second TDRA table, of the plurality of TDRA tables, with k0 in [32, 63], and son on). The field may indicate an index of a TDRA table of the plurality of TDRA tables. The wireless device may determine an entry of the TDRA table for determining time domain resources scheduled by the DCI.

In an example, the field may indicate one of one or more minimum or additional scheduling offset values. The wireless device may be configured with the one or more minimum or additional scheduling offset values via RRC, MAC-CE and/or DCI signaling.

In an example, a list of time domain resource allocation (e.g., TimeDomainResourceAllocationList, TDRA list) may comprise a sequence/list of time domain resource allocations. Each time domain resource allocation of the list of TDRA list may comprise at least one of a scheduling offset (e.g., k0 for a downlink data/PDSCH, k2 for an uplink data/PUSCH), a mapping type (e.g., typeA or typeB), and a SLIV (startingSymbolAndLength).

FIG. 28 illustrates an example configuration parameters of a TDRA table for a single-PUSCH scheduling and a multi-PUSCH scheduling (e.g., a multi-TTI PUSCH scheduling) as per an aspect of an embodiment of the present disclosure. For example, PUSCH-TimeDomainResourceAllocationList (a TDRA table) comprises a sequence of time domain resource allocation (e.g., PUSCH-TimeDomainResourceAllocation). The PUSCH-TimeDomainResourceAllocation, for the single-PUSCH scheduling, may comprise a scheduling offset (k2), a mapping type and a SLIV value. The PUSCH-TimeDomainResourceAllocationList-r16 (e.g., a list of TDRAs, a TDRA table) may be used for a multi-TTI or a multi-PUSCH scheduling. The list of TDRAs may comprise a sequence or a list of TDRA-r16 (PUSCH-TimeDomainResourceAllocation-r16). The TDRA-r16 may comprise a scheduling offset (e.g., k2-r16), and a list of puschAllocation (e.g., puschAllocationList). The list of puschAllocation may comprise one or more time domain allocation information for one or more PUSCHs. For example, each of the list of puschAllocation may correspond to each of the one or more PUSCHs.

For example, a puschAllocation may comprise a mapping type (e.g., typeA or typeB) and a SLIV value. For example, a puschAllocation may comprise a mapping type, a starting symbol, a length and a number of repetitions.

For downlink data/PDSCH scheduling, the configuration parameters may comprise PDSCH-TimeDomainResourceAllocation (a downlink TDRA table) for a scheduled cell. Each entry/row of the downlink TDRA table may comprise a scheduling offset (k0), a mapping type, and a SLV value. In another example, each entry/row of the downlink TDRA table may comprise a scheduling offset (k0), a mapping type, a SLV value, and a number of repetition. In another example, each entry/row of the downlink TDRA table may comprise a scheduling offset (k0) and a list of pdschAllocation. For example, each of the list of pdschAllocation may comprise a mapping type and a SLIV value. For example, each of the list of pdschAllocation may comprise one or more of a mapping type, a starting symbol index, a length, and a number of repetition.

The configuration parameters may comprise one or more PUSCH-TimeDomainResourceAllocation (e.g., one or more uplink TDRA tables). The configuration parameters may comprise one or more PDSCH-TimeDomainResourceAllocation(e.g., one or more downlink TDRA tables).

In an example, a TDRA table may comprise a list of slot offset values and a set of SLIV values. For example, the list of slot offset values may comprise one or more slot offset values (e.g., scheduling offset values, k0 for downlink, k2 for uplink). The set of SLIV values may comprise one or more SLIV values. For example, a size of the list of slot offset values may be K1. For example, a second size of the list of the SLIV values may be K2. For example, K2 may be 128 based on possible values of SLIV values within a slot.

In an example, a TDRA table may comprise a list of slot offset values and a set of a list of SLIV values. For example, each list of SLIV values may comprise one or more SLIV values, where each of the each list of SLIV values may correspond to a PDSCH of one or more PDSCHs scheduled by a DCI or a PUSCH of one or more PUSCHs scheduled by a second DCI. For example, a size of the each list of SLIV values may be determined based on a number of the one or more PDSCHs or a number of the one or more PUSCHs. For example, a size of the each list of SLIV values may be determined based on a maximum number of one or more PDSCHs or one or more PUSCHs that may be scheduled by a single DCI.

A base station may transmit/schedule a DCI for a multi-PDSCH or a multi-PUSCH scheduling. The DCI may comprise a time domain resource allocation field. The time domain resource allocation field may comprise/indicate a first field or first bit(s) indicating one of the list of slot offset values. The time domain resource allocation field may comprise/indicate a second field or second bit(s) indicating one of the set of SLIV values or one list of the set of the list of SLIV values. For example, first most significant bits (MSBs) of the time domain resource allocation field may be assigned/used for the first field or the first bit(s). Remaining bits of the time domain resource allocation field may be assigned/sed for the second field or the second bit(s). For example, first P (e.g., P=3) MSBs of the time domain resource allocation field may be used for the first field.

The second field or the second bit(s) may indicate a SLIV value for a single PDSCH or a single PUSCH scheduling. The second field or the second bit(s) may indicate a list of SLIV values for a plurality of PDSCHs or a plurality of PUSCHs. For example, the list of SLIV values may comprise one or more SLIV values, wherein each SLIV value of the one or more SLIV values may correspond to at least one PDSCH of the one or more PDSCHs or at least one PUSCH of the one or more PUSCHs.

In an example, a wireless device may be configured with a first cell with a first SCS. The wireless device may be configured with a second cell with a second SCS. For example, the first SCS is smaller than or equal to a SCS threshold (e.g., 240 kHz). The second SCS is larger than the SCS threshold. A base station may transmit one or more RRC messages comprising configuration parameters. The configuration parameters may comprise the SCS threshold. The configuration parameters may comprise a first TDRA table for the first cell. An entry of the first TDRA may comprise a scheduling offset, a mapping type and a SLIV value for a single PDSCH/PUSCH scheduling. The configuration parameters may comprise a second TDRA table for the second cell. An entry of the second TDRA may comprise a set of slot offset values and a set of SLIV values.

An entry of a TDRA table or a list of TDRA entries may be determined based on a SCS of a serving cell, where the TDRA table is used for scheduling resources for the serving cell. An entry of a TDRA table or a list of TDRA entries may be determined based on a first SCS of a scheduling cell and a second SCS of a scheduled cell. For example, one or more fields of the entry of the TDRA table or the list of TDRA entries may be determined based on a ratio between the first SCS and the second SCS. For example, when the ratio is larger than or equal to a threshold, the entry may comprise a set of slot offset values and a set of SLIV values (or a set of a list of SLIV values for a multi-PDSCH/multi-PUSCH scheduling).

In an example, a wireless device may receive a DCI, for a second cell with a second SCS and via a first cell with a first SCS, comprising/indicating resources of one or more PDSCHs. The DCI may comprise a time domain resource allocation field indicating a scheduling offset (k0). The wireless device may determine a first slot of the resources of the one or more PDSCHs based on a second slot and the scheduling offset. For example, the wireless device may determine the second slot of the second cell, wherein the second slot is a latest slot that overlaps in time with a symbol of the scheduling cell. The symbol may be used for transmitting the DCI. The wireless device may determine the latest slot of the scheduling cell that overlaps in time with the scheduling cell's PDCCH monitoring occasion for the DCI.

Figure 29:
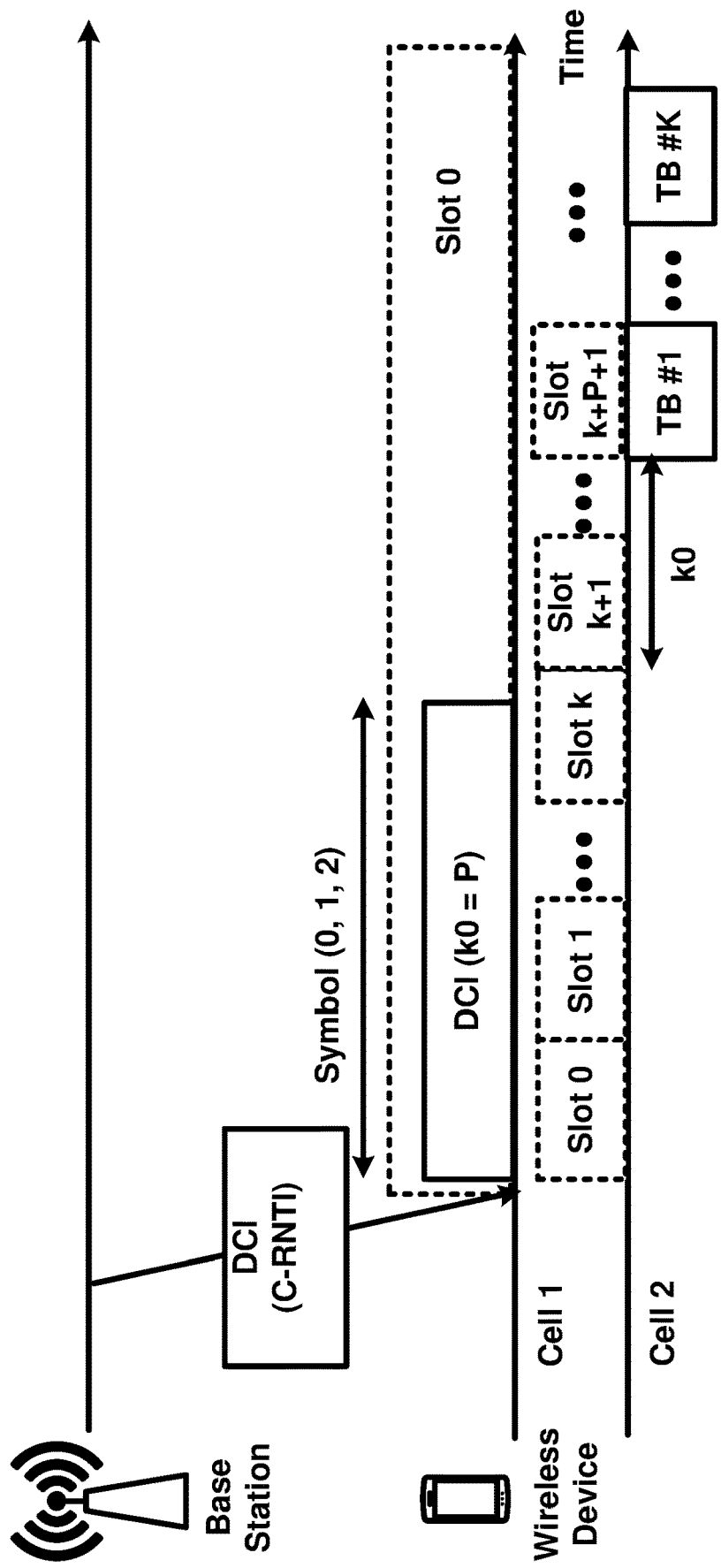
FIG. 29 illustrates an example embodiment as per an aspect of an embodiment of the present disclosure.

FIG. 29 illustrates an example embodiment as per an aspect of an embodiment of the present disclosure. The first cell (Cell 1) may transmit a DCI between symbol [0, 2]. A symbol with index 2 (e.g., a third symbol) of the first cell may overlap with a slot with index k (e.g., k+1-th slot of the scheduled cell). The DCI may indicate k0 as a scheduling offset. The wireless device may determine a first slot of one or more PDSCHs (e.g., for TB #1, . . . , TB #k) based on k0 counting starting from slot k+1. Slot k+1 is a next slot of the slot with index k that is a latest slot overlapping with the DCI. The wireless device may determine the first slot of the one or more PDSCHs based on k0 counting starting from the slot k.

The wireless device may receive a first DCI via the first cell scheduling resources for the first cell. The first DCI may comprise a first scheduling offset. The wireless device may determine a first slot (e.g., an earliest slot) of the resources based on the first scheduling offset and a slot, of the first cell, where the first DCI has been transmitted. For example, the slot is a latest slot where the first DCI has been transmitted.

The wireless device may receive a second DCI via the first cell scheduling second resources for the second cell. The second DCI may comprise a second scheduling offset. The wireless device may determine a ratio between a first SCS of the first cell and a second SCS of the second cell. In response to the ratio being larger than or equal to a ratio threshold (e.g., the ratio threshold=64), the wireless device may determine a second slot (e.g., an earliest slot) of the second resources based on the second scheduling offset and a second slot, of the second cell, where the second slot is a latest slot that overlaps in time with the second DCI.

The base station may configure the ratio threshold via RRC signaling, MAC-CE and/or DCI signaling.

FIG. 29 illustrates that the DCI indicates a scheduling offset P. The wireless device may determine the first slot of one or more PDSCHs based on a last slot of the scheduled cell that overlaps with the DCI transmission (e.g., symbols [0-2] of the scheduling cell) and the scheduling offset P. In FIG. 29, the slot k is a last slot overlapping with the DCI. The wireless device may determine the first slot that is a slot k+P+1 assuming k0=0 falls in to the slot k+1. In another example, the wireless device may determine the first slot that is a slot k+P assuming k0=0 falls in to the slot k.

In an example, the wireless device may determine additional processing delay d after the last slot of the scheduled cell that overlaps with the DCI. For example, the configuration parameters may comprise/indicate the value of d. For example, the configuration parameters may comprise one or more values of d, where each of the one or more values may correspond to a second SCS of the scheduling cell or may correspond to each pair of {a first SCS of the scheduling cell, a second SCS of the scheduled cell} or may correspond to each ratio between a first SCS of the scheduling cell and a second SCS of the scheduled cell (e.g., floor/ceil (the second SCS/the first SCS), floor/ceil (the first SCS/the second SCS)).

In an example, the additional processing delay may be determined based on a capability of the wireless device. The wireless device may determine a capability of an additional processing delay for each subcarrier spacing of a scheduled cell, or for each pair of {a first SCS of a scheduling cell, a second SCS of a scheduled cell}, or for each ratio between a first SCS of a scheduling cell and a second SCS of a scheduled cell (e.g., floor/ceil (the second SCS/the first SCS), floor/ceil (the first SCS/the second SCS)). The capability of the additional processing delay may be pre-determined or pre-configured for each case.

In an example, a DCI may comprise a time domain resource allocation field. The time domain resource allocation field may comprise a first sub-field indicating an additional scheduling offset. The time domain resource allocation field may additionally comprise a second sub-field indicating a scheduling offset (e.g., k0) and at least one SLIV value. The additional scheduling offset may be added to a slot index of a scheduling cell. For example, the wireless device may receive the DCI at a slot with an index n of the scheduling cell. The DCI may indicate the additional scheduling offset p slots. The wireless device may determine a scheduling slot as the n+p. The wireless device may determine a scheduled slot or a first slot of resources indicated by the DCI based on the slot n+p of the scheduling cell and the scheduling offset value indicated by the DCI.

For example, an index of the first slot or the scheduled slot may be floor ((n+p)*(a second SCS of the scheduled cell/a first SCS of the scheduling cell))+the scheduling offset (e.g., floor ((n+the additional scheduling offset)*(2^u_PDSCH/2^u_PDCCH)+k0).

In an example, an entry of a TDRA table may indicate a first scheduling offset value (k0_1) and a second scheduling offset value (k0_2). For example, the first scheduling offset value may be applied or used or determined based on a first SCS of the scheduling cell. The second scheduling offset value may be applied or used or determined based on a second SCS of the scheduled cell. For example, a first slot of resources indicated by the DCI may be determined as floor ((n+k0_1)*(2^u_PDSCH/2^u_PDCCH))+k0_2.

In an example, a base station may transmit one or more RRC messages comprising/indicating configuration parameters. The configuration parameters may comprise/indicate a subset of SLIV values. Each of the subset of SLIV values may indicate a SLIV value of possible SLIV values. For example, a size of the subset of SLIV values may be smaller than a total number SLIV values. For example, the total number of SLIV values may be 128 to capture combinations of {starting symbol in a slot, a length<=a number of symbols in the slot}. For example, the slot may comprise 14 symbols or 12 symbols depending on a cyclic prefix of a numerology of a cell.

The configuration parameters may comprise a list of TDRA entries or a TDRA table. Each of the list of TDRA entries or the TDRA table may comprise {a scheduling offset k0, one or more SLIV indexes}. Each of the one or more SLIV indexes may indicate an index of the subset of SLIV values for a PDSCH of one or more PDSCHs scheduled by a DCI. For example, when the DCI schedules K PDSCHs, K indexes may be configured in an entry of the TDRA table or the list of TDRA entries. i-th index may indicate a SLIV value of the subset of SLIV values for i-th PDSCH of K PDSCHs scheduled by the DCI.

FIG. 30 illustrates an example embodiment as per an aspect of an embodiment of the present disclosure. For example, configuration parameters may comprise a list of SLIV values (e.g., PUSCH-SLIVList or PDSCH-SLIVList). The list of SLIV values may comprises one or more SLIV values, where an index of each value may start from 0 to K−1 where K is a number of the one or more SLIV values or the size of the list.

A TDRA table (e.g., PUSCH-TimeDomainResourceAllocationList, PDSCH-TimeDomainResourceAllocatinoList) may comprise one or more entires of TDRA. Each TDRA entry may comprise a scheduling offset (e.g., k2-r17 for PUSCH, k0-r17 for PDSCH) and one or more indexes to the list of SLIV values. Each of the one or more indexes may correspond to each PDSCH of one or more PDSCHs scheduled by a DCI or each PSCH of one or more PUSCHs scheduled by a DCI.

For example, a first entry (e.g., PUSCH-SLIVList[0]) may be reserved for a skipping (e.g., a duration is 0 or a starting symbol is a last symbol of a slot).

In an example, the subset of SLIV values may comprise a reserved state or a duration of zero. For example, a first SLIV value of the subset of SLIV values (e.g., a SLIV value with index=0 or index=1) may be reserved for indicating zero duration or no resource allocation. When the reserved state or the first SLIV value is indicated by a DCI for a PDSCH or a slot n, the wireless device may determine that resource is not allocated for the PDSCH or the slot n. The wireless device may determine to skip the PDSCH or the slot.

For example, a DCI of a multi-PDSCH scheduling, may comprise K indexes of SLIV values for K PDSCHs or K slots. When i-th index of the K indexes indicates the reserved state or the first SLIV value with duration 0, the wireless device may determine that i-th PDSCH is skipped or i-th slot (a slot with index n+i, where the first slot has a slot index n) is skipped.

The wireless device may determine that one or more slots or one or more PDSCHs are skipped for a multi-PDSCH scheduling based on one or more SLIV values corresponding to the one or more slots or the one or more PDSCHs. The wireless device may determine that a PDSCH or a slot is skipped in response to a SLIV value, corresponding to the PDSCH or the slot, being set to a reserved value (e.g., a duration is zero, a stating symbol is a last symbol) or an index of the SLIV value being a predetermined value (e.g., 0 or 1).

In an example, a DCI, of a multi-PDSCH or a multi-PUSCH scheduling, may comprise one or more NDI bits/fields, where each of the one or more NDI bits/fields corresponds to each PDSCH of one or more PDSCHs scheduled by the DCI or each PUSCH of one or more PUSCHs scheduled by the DCI. The DCI may also comprise one or more RV fields/bits, where each of the one or more RV bits/fields corresponds to the each PDSCH or the each PUSCH.

The wireless device may determine whether a PDSCH of the one or more PDSCHs or a PUSCH of the one or more PUSCHs is scheduled or is skipped in a slot based on a NDI bit/field of the one or more NDI bits/fields and a RV bit/field of the one or more RV bits/fields. For example, the NDI bit/field corresponds to the PDSCH or the PUSCH. The RV bit/field corresponds to the PDSCH or the PUSCH. For example, when the NDI bit/field is set to a first predetermined value and the RV bit/field is set to a second predetermined value, the wireless device may determine that the PDSCH or the PUSCH is skipped. For example, when the NDI bit/field is toggled (e.g., indicates a new data) and the RV bit/field is set to a second predetermined value, the wireless device may determine that the PDSCH or the PUSCH is skipped. For example, the first predetermined value may be 0 (or 1). For example, the second predetermined value may be RV=2 (or RV=3 or RV=1).

The wireless device may determine whether a PDSCH or a PUSCH is skipped or not based on a first field and a second field. A DCI, of a multi-PDSCH or a multi-PUSCH scheduling, may comprise the first field and the second field. The first field and the second field may correspond to the PDSCH or the PUSCH.

The wireless device may determine that the PDSCH or the PUSCH is skipped in response to the first field being set to a first predetermined value (or toggled or non-toggled) and the second field being set to a second predetermined value (or toggled or non-toggled). Examples of the first field may comprise at least one of a NDI field, a RV field, a MCS field, a HARQ process ID field, a TPC field. Examples of the second field may comprise at least one of a NDI field, a RV field, a MCS field, a HARQ process ID field, a TPC field. The first field and the second field may be different.

In an example, a DCI, of a multi-PDSCH or a multi-PUSCH scheduling, may comprise a HARQ process identifier (a HARQ ID). The DCI may comprise resources for one or more PDSCHs via one or more slots. The DCI may comprise resources for one or more PUSCHs via one or more second slots.

The wireless device may determine a HARQ process ID of a PDSCH of the one or more PDSCHs based on the HARQ ID and a gap between a second slot and a first slot. For example, the first slot is a slot where an earliest PDSCH of the one or more PDSCHs start. For example, the wireless device may determine the first slot based on a scheduling offset indicated by the DCI. The second slot is a slot where the PDSCH of the one or more PDSCHs is scheduled or mapped or determined.

For example, the DCI schedules K slots/PDSCHs with k0=p. The wireless device may determine an earliest slot (the first slot) as n+p where the wireless device receives the DCI in the slot n. The DCI indicates HARQ ID=Q. The wireless device may determine a HARQ process ID of a first PDSCH (e.g., an earliest PDSCH) of the one or more PDSCHs as Q. The wireless device may determine a HARQ process ID of a second PDSCH or a next slot (e.g., n+p+1) as a Q+1. The wireless device may determine a HARQ process ID of a i-th PDCCH or a i-th next slot (e.g., n+p+i) as a Q+i.

The wireless device may increment a HARQ process ID by 1 in every slot between an earliest slot and a latest slot of the one or more slots scheduled by the DCI.

The wireless device may determine one or more second PDSCHs of the one or more PDSCHs being skipped based on one or more rules in the specification. The wireless device may continue incrementing HARQ process IDs across the one or more second PDSCHs regardless the one or more second PDSCHs being skipped.

The wireless device may continue incrementing HARQ process ID based on a slot index or over contiguous slots starting from a first slot (or an earliest slot) determined based on a time domain resource allocation field of a DCI, regardless whether the wireless device may not have any data scheduled in one or more slots of the contiguous slots.

For example, the wireless device may not continue incrementing HARQ process IDs over slot(s) that are configured as uplink slots or the wireless device may not expect to receive any downlink data via the slot(s) as resources are indicated as uplink.

For example, the wireless device may increment a HARQ process ID in a slot that is skipped based on the one or more rules in the specification. The wireless device may not increment the HARQ process ID in the slot if the slot is skipped due to slot formation information or due to resource conflict (e.g., uplink resource for the downlink data).

Figure 31:
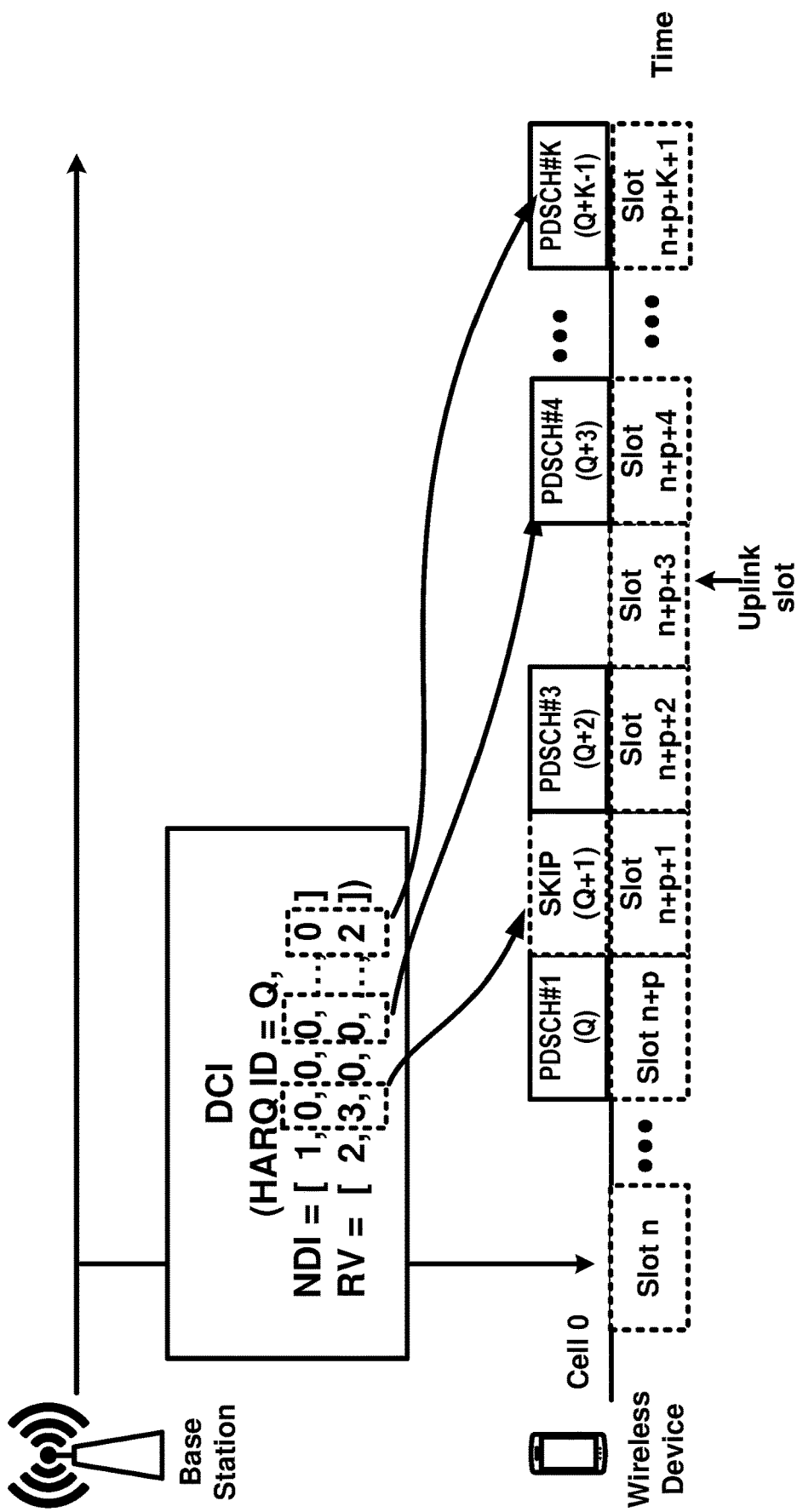
FIG. 31 illustrates an example embodiment for a HARQ process ID for a multi-PDSCH/multi-PUSCH scheduling as per an aspect of an embodiment of the present disclosure.

FIG. 31 illustrates an example of embodiment for a HARQ process ID for a multi-PDSCH/multi-PUSCH scheduling as per an aspect of an embodiment of the present disclosure.

.For example, a DCI, of a multi-PDSCH scheduling, may schedule a plurality of PDSCHs over a plurality of slots. For example, the DCI may indicate a HARQ process ID=Q. The DCI may indicate a set of NDI fields/bits where each field/bit of the set of NDI fields/bits corresponds to a PDSCH of the plurality of PDSCHs or a slot of the plurality of slots. The DCI may indicate a set of RV fields/bits where each field/bits of the set of RV fields/bits corresponds to the PDSCH or the slot. For example, $2^{nd}$ bit of a NDI bitmap or a set of NDI fields/bits indicate a NDI value for a second PDSCH (e.g., PDSCH#2) or a second slot (e.g., slot n+p+1). For example, $2^{nd}$ two bits of a RV bitmap or a set of RV fields/bits may correspond to the second PDSCH or the second slot (e.g., NDI=0, RV=3).

For example, $3^{rd}$ NDI bit of the NDI bitmap and $3^{rd}$ two bits of RV bits of the RV bitmap may correspond to a third PDSCH (PDSCH #3) or a third slot (slot n+p+2). The k-th NDI bit of the NDI bitmap and k-th two bits of the RV bits of the RV bitmap may correspond to a K-th PDSCH (PDSCH #K) or k-th slot (slot n+p+K).

The DCI may indicate a first slot (slot n+p) for a first or an earliest PDSCH (e.g., PDSCH#1). The wireless device may map each PDSCH of the plurality of PDSCHs across one or more slots scheduled via a time domain resource allocation field by the DCI. For example, the time domain resource allocation field may comprise K SLIV values where each of the K SLIV values corresponds to each slot between [slot n+p, . . . , slot n+p+K]. For example, the K SLIV values may correspond to each downlink slot or each valid slot between slot [n+p, . . . , slot M] (e.g., M>=n+p+K). The wireless device may determine a slot is a valid slot or a downlink slot based on slot formation indication via RRC and/or DCI signaling. For example, the RRC signaling may comprise TDD-UL-DL-ConfigCommon indicating semi-static downlink and/or uplink resources within one or more periodicities. The RRC signaling may comprise TDD-UL-DL-Config (e.g., a UE-specific siganlign) indicating semi-static downlink and/or uplink resources for flexible resources indicated by the TDD-DL-UL-ConfigCommon.

The wireless device may determine a slot is a valid slot in response to symbol(s) indicated by a SLIV corresponding to the slot are configured with downlink resource and/or flexible resources by the RRC signaling. The wireless device may determine the slot is valid slot in response to the symbol(s) are indicated with downlink by RRC signaling and/or SFI DCI signaling.

In FIG. 31, the wireless device may determine slot n+p+3 are uplink slot. The wireless device may skip the slot n+p+3 from resource allocation by the DCI. The wireless device may determine a fourth PDSCH (PDSCH#4) in a slot n+p+4 by skipping the uplink slot or invalid slot.

For example, $4^{th}$ NDI bit of the NDI bitmap and $4^{th}$ two RV bits of the RV bitmap may correspond to a fourth PDSCH (PDSCH#4) in the slot n+p+4. The wireless device may skip the slot n+p+3 as the slot is an uplink slot or invalid slot.

The wireless device may determine a NDI bit is set to a first pre-determined value and a RV bits are set to a second pre-determined value for a PDSCH. In response to the determining, the wireless device may determine that the PDSCH is skipped.

For example, in FIG. 31, the wireless device may determine $2^{nd}$ NDI bit being set to the first predetermined value (e.g., 0, or toggled or non-toggled) and $2^{nd}$ two RV bits being set to the second predetermined value (e.g., 3, 2 or 1). The wireless device may determine that the second PDSCH or the second slot is skipped.

The wireless device may increment a HARQ process ID of each PDSCH by 1 in each slot allocated by the time domain resource allocation field of the DCI. The wireless device may determine a HARQ process ID of the first PDSCH (PDSCH#1) or the first slot as Q based on the DCI.

The wireless device may determine a HARQ process ID of the second PDSCH (PDSCH #2) or the second slot (slot n+p+1) as Q+1 even if the second PDSCH has been skipped. The wireless device may determine a HARQ process ID of the second slot as Q+1.

The wireless device may determine a HARQ process ID of the third PDSCH (PDSCH #3) or the third slot (slot n+p+2) as Q+2. The wireless device may skip incrementing the HARQ process ID for an invalid slot or uplink slot (e.g., skip slot n+p+3). The wireless device may determine a HARQ process ID of the fourth PDSCH (PDSCH #4) or the fifth slot (slot n+p+4) as Q+3 based on the fifth slot being fourth slot since the first slot based on the time domain resource allocation field of the DCI.

The wireless device may increment the HARQ process ID per each valid slot or for each allocated slot by the time domain allocation table by the DCI.

In an example, the wireless device may determine a slot is skipped or a PDSCH is skipped based on a SLIV value corresponding to the slot or the PDSCH. For example, if the SLIV value may indicate 0 duration or a reserved value, the wireless device may determine that the slot is skipped or the PDSCH is skipped.

In an example, a DCI, of a multi-PDSCH or a multi-PUSCH scheduling, may comprise a first SLIV value and one or more second SLIV values. For example, the first SLIV value may indicate a starting slot offset/scheduling offset and a number of slots of resources indicated/scheduled by the DCI. Each of the one or more second SLIV values may indicate a starting symbol and a duration in terms of a number of symbols in a slot. For example, a number of one or more second SLIV values may be determined based on a maximum duration of the first SLIV value. For example, a number of the one or more second SLIV values may be determined based on a duration of the first SLIV value.

The wireless device may determine one or more slots where an earliest slot of the one or more slots may be determined based on the starting slot offset/scheduling offset based on the first SLIV value and a latest slot of the one or more slots may be determined based on the duration of the first SLIV value and the earliest slot. The wireless device may be configured with a set of first SLIV values or a set of {a starting slot/scheduling offset, a duration}, where a scheduling DCI may indicate one of the set of first SLIV values or the set of {a starting slot/scheduling offset, a duration}.

Figure 32:
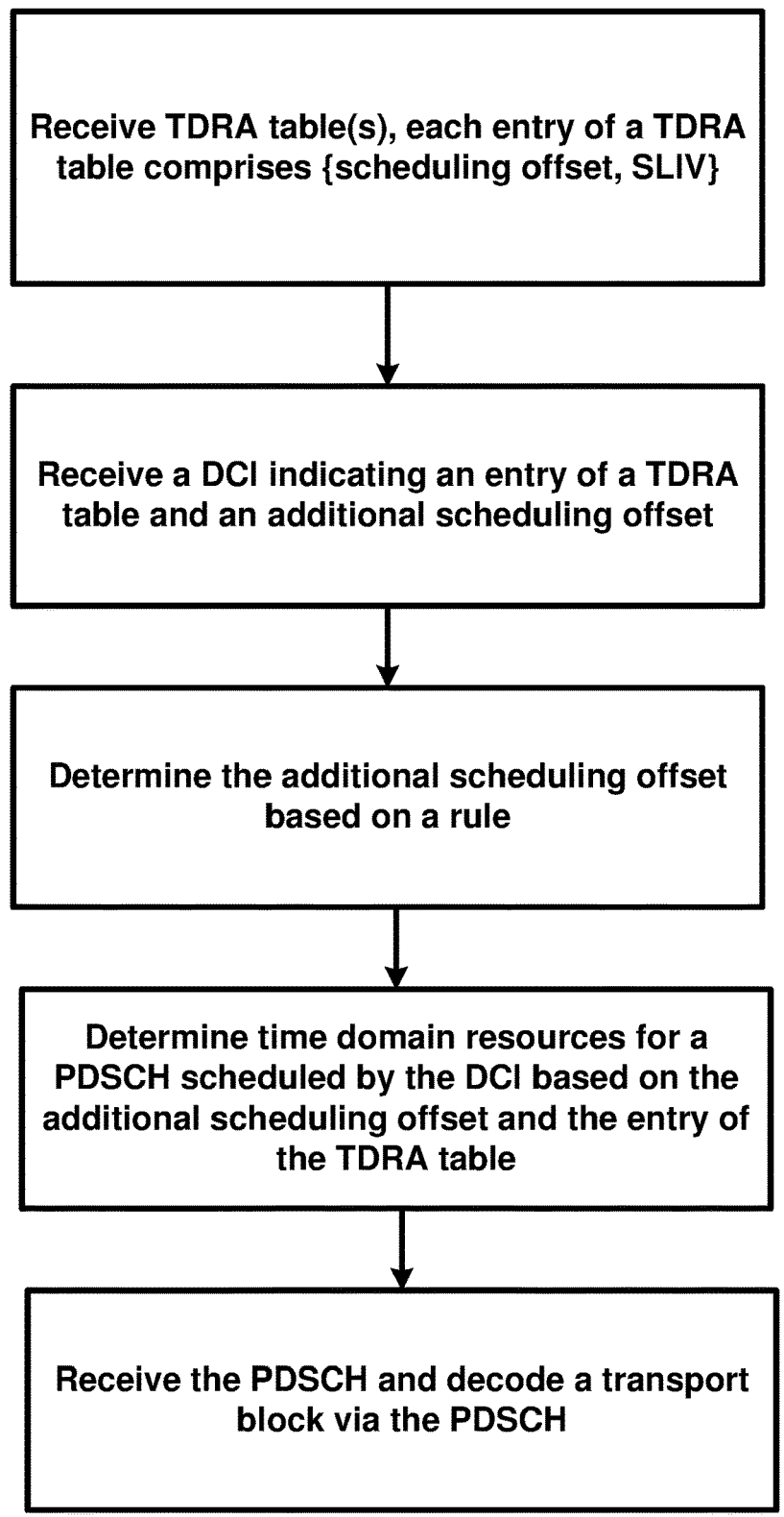
FIG. 32 illustrates a flow diagram of an example embodiment as per an aspect of an embodiment of the present disclosure.

FIG. 32 illustrates a flow diagram of an example embodiment as per an aspect of an embodiment of the present disclosure. The wireless device may receive one or more RRC messages comprising/indicating configuration parameters for a first cell. The configuration parameters may comprise/indicate parameters for one or more TDRA tables. A row or an entry of a TDRA table may comprise a scheduling offset and a SLIV value. For example, the configuration parameters may comprise a sequence of {a scheduling offset, a SLIV value} for a TDRA table. Based on the configuration parameters, the wireless device may determine/configure the one or more TDRA tables, where each TDRA table comprises a sequence of {a scheduling offset, a SLIV value} received via the one or more RRC messages. The wireless device may receive a DCI indicating/comprising an index to a row or an entry of a TDRA table of the one or more TDRA tables. The DCI may additionally indicate/comprise an additional scheduling offset. The wireless device may determine the TDRA table of the one or more TDRA tables based on a rule.

In an example, the wireless device may determine/update a TDRA table of the one or more TDRA tables that comprises a sequence of {a scheduling offset+an additional scheduling offset, a SLIV value}. For example, the configuration parameters may indicate the additional scheduling offset. For example, the additional scheduling offset may be configured via RRC, MAC CE and/or DCI signaling. For example, the wireless device may determine/update a first TDRA table of the one or more TDRA tables that comprises a sequence of {a scheduling offset+a first additional scheduling offset, a SLIV value}. The wireless device may determine/update a second TDRA table of the one or more TDRA tables that comprises a sequence of {a scheduling offset+a second additional scheduling offset, a SLIV value}. The configuration parameters may comprise a list of additional scheduling offset values comprising the first additional scheduling offset and the second additional scheduling offset.

For example, the wireless device may determine a first TDRA table of the one or more TDRA tables in response to the DCI is transmitted based on a self-carrier scheduling (e.g., the DCI is transmitted via the first cell). The wireless device may determine a second TDRA table of the one or more TDRA tables in response to the DCI is transmitted based on a cross-carrier scheduling (e.g., the DCI is transmitted via a second cell, that is configured as a scheduling cell for the first cell). The wireless device may determine a TDRA table based on an order of the DCI. The wireless device may determine a TDRA table based on a RNTI of the DCI.

The wireless device may determine the additional scheduling offset based on a second rule. Fore example, the wireless device may determine a first additional scheduling offset of one or more additional scheduling offset values in response to the DCI is transmitted based on a self-carrier scheduling (e.g., the DCI is transmitted via the first cell). The wireless device may determine a second additional scheduling offset of the one or more additional scheduling offset values in response to the DCI is transmitted based on a cross-carrier scheduling (e.g., the DCI is transmitted via a second cell, that is configured as a scheduling cell for the first cell). The wireless device may determine an additional scheduling offset of the one or more additional scheduling offset values based on an order of the DCI. The wireless device may determine an additional scheduling offset of the one or more additional scheduling offset values based on a RNTI of the DCI.

The wireless device may determine resources in time domain for one or more PDSCHs scheduled by the DCI based on the additional scheduling offset and the entry of the TDRA table. For example, the wireless device may determine a first slot (e.g., an earliest) slot, of one or more slots for the one or more PDSCHs, based on a scheduling offset by the entry of the TDRA table and the additional scheduling offset (e.g., the scheduling offset+the additional scheduling offset). The wireless device may determine one or more symbols for a first PDSCH in the first slot based on the SLIV value of the entry of the TDRA table. The wireless device may receive the first PDSCH of the one or more PDSCHs via the one or more symbols of the first slot. The wireless device may receive the one or more PDSCHs via the one or more slots. In an example, each PDSCH of the one or more PDSCHs may comprise one or more transport blocks in response to the each PDSCH being not skipped (e.g., a duration of the each PDSCH is greater than zero or greater than X (e.g., X=2)). The first PDSCH may comprise a first transport block. The wireless device may decode the first transport block in response to receiving the first PDSCH via the first slot. The DCI may indicate a PUCCH timing offset (e.g., PDSCH-to-HARD) and a PUCCH resource indicator (PUCCH RI) as shown in FIG. 19. The wireless device may determine whether the decoding the first transport block is successful or unsuccessful. The wireless device may transmit a feedback (e.g., ACK or NACK) in response to the decoding the first transport block. The wireless device may transmit an ACK in response to the decoding being successful. The wireless device may transmit a NACK in response to the decoding being unsuccessful.

The wireless device may receive one or more RRC messages comprising/indicating configuration parameters for a first uplink cell. The configuration parameters may comprise/indicate one or more TDRA tables. A row or an entry of a TDRA table may comprise a scheduling offset and a SLIV value. The wireless device may receive a DCI indicating/comprising an index to a row or an entry of a TDRA table of the one or more TDRA tables. The DCI may additionally indicate/comprise an additional scheduling offset. The wireless device may determine the TDRA table of the one or more TDRA tables based on the rule (e.g., the rule used for downlink scheduling). The wireless device may determine the additional scheduling offset based on the second rule (e.g., the second rule used for downlink scheduling).

In an example, the DCI may schedule uplink resources. The wireless device may determine resources in time domain for one or more PUSCHs scheduled by the DCI based on the additional scheduling offset and the entry of the TDRA table. For example, the wireless device may determine a first slot (e.g., an earliest) slot, of one or more slots for the one or more PUSCHs, based on a scheduling offset by the entry of the TDRA table and the additional scheduling offset (e.g., the scheduling offset+the additional scheduling offset). The wireless device may determine one or more symbols for a first PUSCH in the first slot based on the SLIV value of the entry of the TDRA table. The wireless device may transmit the first PUSCH of the one or more PDSCHs via the one or more symbols of the first slot. The wireless device may transmit the one or more PUSCHs via the one or more slots of the first uplink cell. In an example, each PUSCH of the one or more PUSCHs may comprise one or more transport blocks in response to the each PUSCH being not skipped (e.g., a duration of the each PUSCH is greater than zero or greater than X (e.g., X=2)).

In an example, a wireless device may receive one or more RRC messages indicating/comprising parameters for a semi-persistent scheduling (e.g., downlink resource) and/or a configured grant (e.g., uplink resource). The parameters may comprise a resource allocation in a time domain (e.g., a time domain resource allocation field). The time domain resource allocation field of the parameters may indicate an entry or a row of a TDRA table, similar to a time domain resource allocation field in a DCI. The parameters may additionally comprise an additional scheduling offset. The wireless device may determine resources of the SPS or the CG based on the entry or the row of the TDRA table and the additional scheduling offset.

Figure 33:
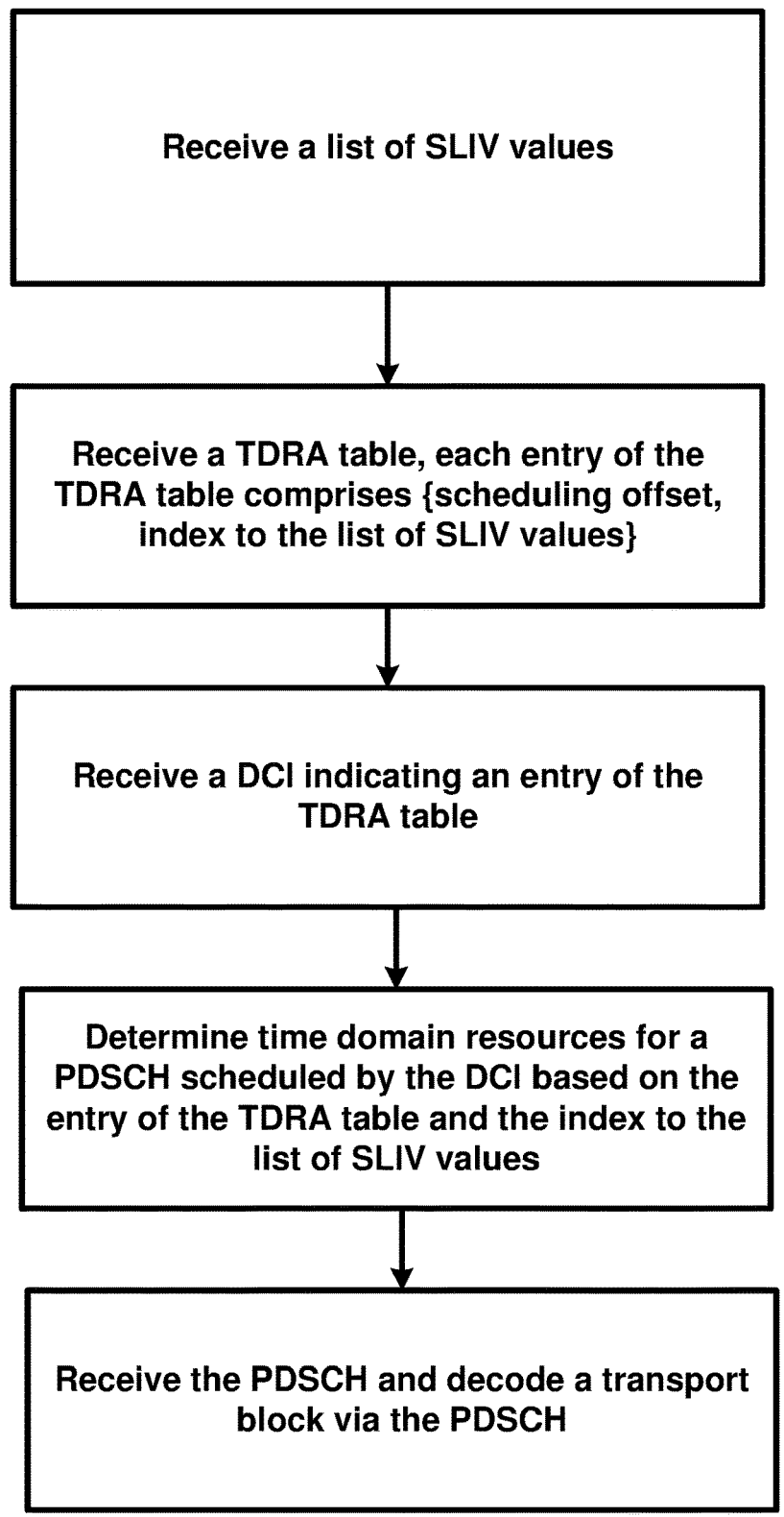
FIG. 33 illustrates a flow diagram of an example embodiment as per an aspect of an embodiment of the present disclosure.

FIG. 33 illustrates a flow diagram of an example embodiment as per an aspect of an embodiment of the present disclosure. The wireless device may receive one or more RRC messages comprising/indicating configuration parameters for a first cell. The configuration parameters may comprise a list of SLIV values. The configuration parameters may comprise/indicate a TDRA tale. For example, an entry or a row of the TDRA table may comprise a scheduling offset and an index to the list of SLIV values. The wireless device may receive a DCI indicating an entry or a row of the TDRA table. The wireless device may determine resources in time domain for a PDSCH (e.g., a first PDSCH of one or more PDSCHs) scheduled by the DCI based on the entry or the row of the TDRA table and the index to the list of SLIV values. For example, the wireless device may determine the scheduling offset based on the entry of the TDRA table. For example, the wireless device may determine a starting symbol and a duration in the first slot based on a SLIV value, of the list of SLIV values, indicated by the index. The wireless device may receive the first PDSCH, for the first cell, via the first slot based on the determination.

In an example, the first PDSCH may comprise a first transport block. The wireless device may decode the first transport block in response to receiving the first PDSCH via the first slot. The DCI may indicate a PUCCH timing offset (e.g., PDSCH-to-HARD) and a PUCCH resource indicator (PUCCH RI) as shown in FIG. 19. The wireless device may determine whether the decoding the first transport block is successful or unsuccessful. The wireless device may transmit a feedback (e.g., ACK or NACK) in response to the decoding the first transport block. The wireless device may transmit an ACK in response to the decoding being successful. The wireless device may transmit a NACK in response to the decoding being unsuccessful.

The wireless device may receive one or more RRC messages comprising/indicating configuration parameters for a first uplink cell. The configuration parameters may comprise a list of SLIV values. The configuration parameters may comprise/indicate a TDRA tale. For example, an entry or a row of the TDRA table may comprise a scheduling offset and an index to the list of SLIV values. The wireless device may receive a DCI indicating an entry or a row of the TDRA table. The wireless device may determine resources in time domain for a PUSCH (e.g., a first PUSCH of one or more PUSCHs) scheduled by the DCI based on the entry or the row of the TDRA table and the index to the list of SLIV values. For example, the wireless device may determine the scheduling offset based on the entry of the TDRA table. For example, the wireless device may determine a starting symbol and a duration in the first slot based on a SLIV value, of the list of SLIV values, indicated by the index. The wireless device may trasnmit the first PUSCH, for the first uplink cell, via the first slot based on the determination.

Figure 34:
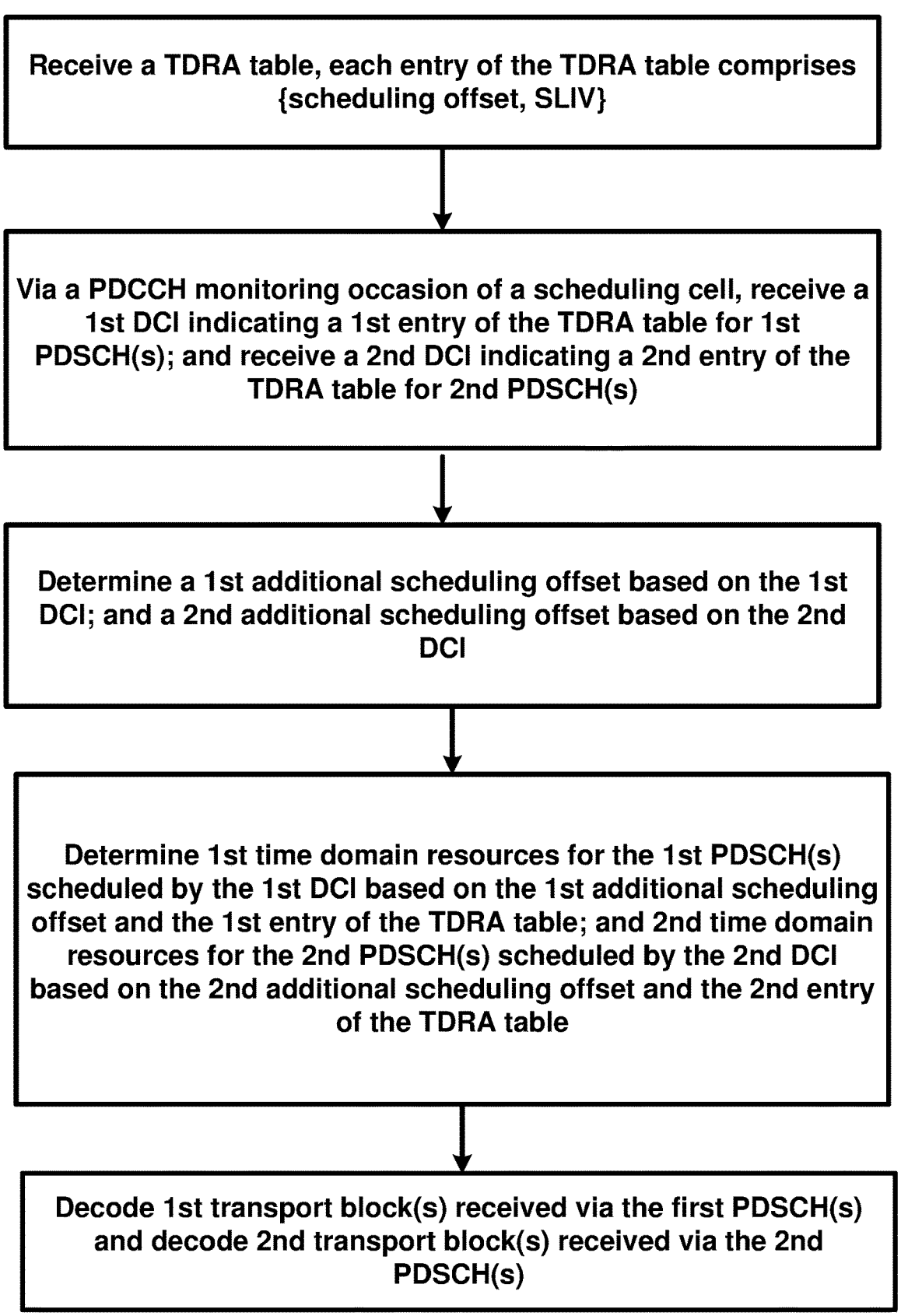
FIG. 34 illustrates a flow diagram of an example embodiment as per an aspect of an embodiment of the present disclosure.

FIG. 34 illustrates a flow diagram of an example embodiment as per an aspect of an embodiment of the present disclosure. The wireless device may receive one or more RRC messages comprising/indicating configuration parameters for a first cell. The configuration parameters may comprise/indicate a TDRA table. An entry or a row of the TDRA table may comprise a scheduling offset and a SLIV value. The configuration parameters may comprise/indicate a number of DCIs via a PDCCH monitoring or a slot of a scheduling cell (e.g., a second cell). The second cell may be same to the first cell or may be different from the first cell. The wireless device may receive a first DCI indicating a first entry of the TDRA table, for one or more first PDSCHs, via a PDCCH monitoring occasion or a slot. The wireless device may receive a second DCI indicating a second entry of the TDRA table, for one or more second PDSCHs, via the PDCCH monitoring occasion or the slot. The wireless device may determine a first additional scheduling offset based on the first DCI. For example, the first additional scheduling offset may be determined based on a first order of the first DCI (e.g., $1^{st}$). The wireless device may determine a second additional scheduling offset based on the second DCI. For example, the second additional scheduling offset may be determined based on the first additional scheduling offset and a gap (e.g., a maximum number of slots/PDSCHs scheduled by a single DCI).

The wireless device may determine first time domain resources for the one or more first PDSCHs based on the first additional scheduling offset and the first entry of the TDRA table. The wireless device may determine second time domain resources for the one or more second PDSCHs based on the second additional scheduling offset and the second entry of the TDRA table.

The wireless device may receive the one or more first PDSCHs via the first time domain resources. The wireless device may receive the one or more second PDSCHs via the second time domain resources. The one or more first PDSCHs may comprise one or more first transport blocks. The one or more second PDSCHs may comprise one or more second transport blocks. The wireless device may decode the one or more first transport blocks in response to receiving the one or more first PDSCHs. The wireless device may decode the one or more second transport blocks in response to receiving the one or more second PDSCHs. The wireless device may transmit first feedback(s) in response to the decoding of the one or more first transport blocks. The wireless device may transmit second feedback(s) in response to the decoding of the one or more second transport blocks.

The wireless device may receive one or more RRC messages comprising/indicating configuration parameters for a first uplink cell. The configuration parameters may comprise/indicate a TDRA table. An entry or a row of the TDRA table may comprise a scheduling offset and a SLIV value. The configuration parameters may comprise/indicate a number of DCIs via a PDCCH monitoring or a slot of a scheduling cell (e.g., a second cell). The second cell may be same to the first cell or may be different from the first cell. The wireless device may receive a first DCI indicating a first entry of the TDRA table, for one or more first PUSCHs, via a PDCCH monitoring occasion or a slot. The wireless device may receive a second DCI indicating a second entry of the TDRA table, for one or more second PUSCHs, via the PDCCH monitoring occasion or the slot. The wireless device may determine a first additional scheduling offset based on the first DCI. For example, the first additional scheduling offset may be determined based on a first order of the first DCI (e.g., $1^{st}$). The wireless device may determine a second additional scheduling offset based on the second DCI. For example, the second additional scheduling offset may be determined based on the first additional scheduling offset and a gap (e.g., a maximum number of slots/PDSCHs scheduled by a single DCI).

The wireless device may determine first time domain resources for the one or more first PUSCHs based on the first additional scheduling offset and the first entry of the TDRA table. The wireless device may determine second time domain resources for the one or more second PUSCHs based on the second additional scheduling offset and the second entry of the TDRA table.

The wireless device may transmit the one or more first PUSCHs via the first time domain resources. The wireless device may transmit the one or more second PUSCHs via the second time domain resources.

According to an embodiment, a wireless device may receive configuration parameters. The configuration parameters may indicate a time domain resource allocation table comprising one or more time domain resource allocation entries. A time domain resource allocation may indicate: a scheduling offset in a unit of slot, a starting symbol, and a duration; and a plurality of additional scheduling offset values. The wireless device may receive a downlink control information (DCI). The DCI may indicate: a first value of the plurality of additional scheduling offset values; and a second value indicating an entry of the time domain resource allocation table. The wireless device may decode downlink data of a physical downlink shared channel (PDSCH) received via one or more symbols of a first slot. The first slot may be determined based on the first value and the scheduling offset of the entry. The one or more symbols may be determined based on the starting symbol of the entry and the duration of the entry.

In an embodiment, the DCI comprises a field indicating an index indicating the first value of the plurality of additional scheduling offset values.

In an embodiment, the DCI comprises a field indicating an order of the DCI, wherein the wireless device determines the first value based on the order of the DCI.

In an embodiment, the DCI is cyclic redundancy check (CRC) scrambled with a first radio network temporary identifier (RNTI), wherein the wireless device determines the first value based on the first RNTI.

In an embodiment, the first slot is determined based on a sum of the first value and the scheduling offset.

In an embodiment, the first slot is determined based on a multiplication of the first value and the scheduling offset. In an embodiment, the first slot is determined based on the first value is divided by the scheduling offset.

In an embodiment, the first slot is after the sum after a slot of a first cell, wherein the wireless device receives the DCI via the slot.

In an embodiment, the configuration parameters indicate a multi-PDSCH scheduling.

In an embodiment, the DCI indicating resources of one or more PDSCHs for a second cell, wherein the PDSCH is an earliest PDSCH of the one or more PDSCHs.

In an embodiment, the wireless device may determine one or more slots of the one or more PDSCHs based on the first slot and the entry of the time domain resource allocation table.

In an embodiment, the entry of the time domain resource allocation table comprises one or more SLIV values for the one or more slots of the one or more PDSCHs, wherein each of the one or more SLIV values corresponds to each of the one or more slots of the one or more PDSCHs.

In an embodiment, the wireless device may receive one or more radio resource control messages indicating a cross-carrier scheduling for a second cell, wherein a first cell is a scheduling cell for the second cell, wherein the wireless device receives the PDSCH via the second cell.

In an embodiment, the wireless device receives the DCI via the first cell.

In an embodiment, a first cell operates with a first subcarrier spacing.

In an embodiment, the second cell operates with a second subcarrier spacing.

In an embodiment, the wireless device may determine a ratio between the second subcarrier spacing and the first subcarrier spacing.

In an embodiment, the configuration parameters indicate a threshold.

In an embodiment, the first offset value is zero in response to the ratio being smaller than the threshold.

In an embodiment, the first offset value is greater than zero in response to the ratio being greater than or equal to the threshold.

In an embodiment, the first offset value is zero in response to the first cell being same to the second cell.

In an embodiment, the first offset value is greater than zero in response to the first cell being different form the second cell.

In an embodiment, the wireless device may transmit a feedback indicating a result of the decoding downlink data, wherein the feedback is an acknowledgement (ACK) in response to the decoding being successful, and a negative acknowledgement (NACK) in response to the decoding being unsuccessful.

According to an embodiment, a wireless device may receive configuration parameters. The configuration parameters may indicate: a time domain resource allocation table. The time domain resource allocation table may comprise one or more time domain resource allocation entries, where a time domain resource allocation may indicate a scheduling offset in a unit of slot, a starting symbol, and a duration. The time domain resource allocation may indicate a plurality of additional scheduling offset values. The wireless device may receive a downlink control information (DCI). The DCI may indicate: a first value of the plurality of additional scheduling offset values; and a second value indicating an entry of the time domain resource allocation table. The wireless device may transmit a physical downlink shared channel (PUSCH) received via one or more symbols of a first slot. The first slot may be determined based on the first value and the scheduling offset of the entry, and the one or more symbols may be determined based on the starting symbol of the entry and the duration of the entry.

According to an embodiment, a wireless device may receive configuration parameters. The configuration parameters may indicate: a time domain resource allocation table comprising one or more time domain resource allocation entries, where a time domain resource allocation may indicate a scheduling offset in a unit of slot, a starting symbol, and a duration. The time domain resource allocation may indicate a plurality of additional scheduling offset values. The wireless device may receive a downlink control information (DCI). The DCI may indicate: a first value of the plurality of additional scheduling offset values; and a second value indicating an entry of the time domain resource allocation table. The wireless device may determine one or more symbols of a first slot to receive a physical downlink shared channel (PDSCH), where: the first slot may be determined based on the first value of additional scheduling offset values and the scheduling offset of the entry in the time domain resource allocation table. The one or more symbols may be determined based on the starting symbol of the entry and the duration of the entry in the time domain resource allocation table.

In an embodiment, the wireless device may configure the time domain resource allocation table based on the scheduling offset, the starting symbol, and the duration.

According to an embodiment, a wireless device may receive configuration parameters. The configuration parameters may indicate: a list of starting and length indicator vector (SLIV) values, where each of values in the list may comprise a starting symbol and a duration; and a time domain resource allocation table comprising one or more time domain resource allocation entries, where a time domain resource allocation may comprise a scheduling offset in a unit of slot and a SLIV index indicating a SLIV value of the list of SLIV values. The wireless device may receive a downlink control information (DCI). The DCI may indicate a value indicating an entry of the time domain resource allocation table. The wireless device may decode downlink data of a first physical downlink shared channel (PDSCH) received via one or more symbols of a first slot. The first slot may be determined based on the scheduling offset of the entry. The one or more symbols corresponding to the SLIV value may be based on the SLIV index of the entry.

In an embodiment, a size of the list of SLV values is smaller than 128.

In an embodiment, the first slot is the scheduling offset after a slot where the wireless device receives the DCI.

In an embodiment, the DCI comprises resources for one or more PDSCHs, wherein the first PDSCH is an earliest PDSCH of the one or more PDSCHs.

In an embodiment, the wireless device may transmit a feedback indicating a result of the decoding downlink data, wherein the feedback is: an acknowledgement (ACK) in response to the decoding being successful, and a negative acknowledgement (NACK) in response to the decoding being unsuccessful.

According to an embodiment, a wireless device may receive configuration parameters. The configuration parameters may indicate: a time domain resource allocation table comprising one or more time domain resource allocation entries. A time domain resource allocation may indicate a scheduling offset in a unit of slot, a starting symbol, and a duration. The wireless device may receive a downlink control information indicating an additional scheduling offset and a value indicating an entry of the time domain resource allocation table.

The wireless device may decode a transport block based on receiving a first physical downlink shared channel (PDSCH) via one or more symbols of a first slot. The first slot may be determined based on the additional scheduling offset and the scheduling offset of the entry. The one or more symbols may be determined based on the starting symbol of the entry and the duration of the entry.

In an embodiment, the DCI comprises a field indicating an index indicating the first value of the plurality of additional scheduling offset values.

In an embodiment, the DCI comprises a field indicating an order of the DCI, wherein the wireless device determines the first value based on the order of the DCI.

In an embodiment, the DCI is cyclic redundancy check (CRC) scrambled with a first radio network temporary identifier (RNTI), wherein the wireless device determines the first value based on the first RNTI.

In an embodiment, the first slot is determined based on a sum of the first value and the scheduling offset.

In an embodiment, the first slot is determined based on a multiplication of the first value and the scheduling offset.

In an embodiment, the first slot is after the sum after a slot of a first cell, wherein the wireless device receives the DCI via the slot.

In an embodiment, the configuration parameters indicate a multi-PDSCH scheduling.

In an embodiment, the DCI indicating resources of one or more PDSCHs for a second cell, wherein the PDSCH is an earliest PDSCH of the one or more PDSCHs.

In an embodiment, the wireless device may determine one or more slots of the one or more PDSCHs based on the first slot and the entry of the time domain resource allocation table.

In an embodiment, the entry of the time domain resource allocation table comprises one or more SLIV values for the one or more slots of the one or more PDSCHs, wherein each of the one or more SLIV values corresponds to each of the one or more slots of the one or more PDSCHs.

In an embodiment, the wireless device may receive one or more radio resource control messages indicating a cross-carrier scheduling for a second cell, wherein a first cell is a scheduling cell for the second cell, wherein the wireless device receives the PDSCH via the second cell.

In an embodiment, the wireless device receives the DCI via the first cell.

In an embodiment, a first cell operates with a first subcarrier spacing.

In an embodiment, the second cell operates with a second subcarrier spacing.

In an embodiment, the wireless device may determine a ratio between the second subcarrier spacing and the first subcarrier spacing.

In an embodiment, the configuration parameters indicate a threshold.

In an embodiment, the first offset value is zero in response to the ratio being smaller than the threshold.

In an embodiment, the first offset value is greater than zero in response to the ratio being greater than or equal to the threshold.

In an embodiment, the first offset value is zero in response to the first cell being same to the second cell.

In an embodiment, the first offset value is greater than zero in response to the first cell being different form the second cell.

In an embodiment, the wireless device may transmit a feedback indicating a result of the decoding the transport block, wherein the feedback is: an acknowledgement (ACK) in response to the decoding being successful, and a negative acknowledgement (NACK) in response to the decoding being unsuccessful.

According to an embodiment, a wireless device may receive configuration parameters. The configuration parameters may indicate: a time domain resource allocation table comprising one or more time domain resource allocation entries. A time domain resource allocation may indicate a scheduling offset in a unit of slot, a starting symbol, and a duration. The wireless device may receive a downlink control information (DCI) indicating a value indicating an entry of the time domain resource allocation table. The wireless device may determine an additional scheduling offset based on the DCI. The wireless device may decode a transport block via a first physical downlink shared channel (PDSCH). The first PDSCH may be received via one or more symbols of a first slot. The first slot may be determined based on the additional scheduling offset and the scheduling offset of the entry. The one or more symbols may be determined based on the starting symbol of the entry and the duration of the entry.

In an embodiment, the wireless device may determine the additional scheduling offset based on an order of the DCI among one or more DCIs via a slot of a scheduling cell, wherein the one or more DCIs schedule resources for a scheduled cell.

In an embodiment, the wireless device receives the first PDSCH via the scheduled cell.

In an embodiment, the order of the DCI is determined based on a control channel element (CCE) index of the DCI.

In an embodiment, the order of the DCI is determined based on a radio network temporary identifier (RNTI) used in the DCI.

In an embodiment, the order of the DCI is determined based on a value of a field of the DCI.

In an embodiment, the order of the DCI is determined based on one or more field of the DCI.

In an embodiment, the wireless device may transmit a feedback indicating a result of the decoding the transport block, wherein the feedback is: an acknowledgement (ACK) in response to the decoding being successful; and a negative acknowledgement (NACK) in response to the decoding being unsuccessful.

According to an embodiment, a wireless device may receive one or more RRC messages indicating configuration parameters. The configuration parameters may indicate a time domain resource allocation table, for a first cell, comprising one or more time domain resource allocation entries. A time domain resource allocation may indicate a scheduling offset in a unit of slot, a starting symbol and a duration. The configuration parameters may further indicate a second cell cross-carrier scheduling the first cell, a first subcarrier spacing of the first cell; and a second subcarrier spacing of the second cell. The wireless device may determine an additional scheduling offset based on the first subcarrier spacing and the second subcarrier spacing. The wireless device may receive a DCI, via the second cell in a slot, indicating an entry of the time domain resource allocation table. The wireless device may receive a physical downlink shared channel (PDSCH) received via one or more symbols of a first slot. The wireless device may decode downlink data transmitted via the PDSCH. The wireless device may determine the first slot that is after a K slots, determined based on the additional scheduling offset and the scheduling offset of the entry, the slot. The wireless device may determine the one or more symbols based on the starting symbol of the entry and the duration of the entry.

In an embodiment, the configuration parameters may indicate a list of additional offset values. For example, each additional offset value of the list of additional offset values may correspond to a pair of {a third subcarrier spacing of a scheduling cell, a fourth subcarrier spacing of a scheduled cell}. For example, the scheduling cell may be the second cell and the scheduled cell is the first cell.

In an embodiment, the wireless device may determine the first subcarrier spacing of the first cell based on a subcarrier spacing of an active bandwidth part of the first cell. The wireless device may determine the second subcarrier spacing of the second cell based on a subcarrier spacing of an active bandwidth part of the second cell.

In an embodiment, the wireless device may determine the K slots where K may be a sum of the additional scheduling offset and the scheduling offset.

In an embodiment, the wireless device may determine the K slots where K may be a multiplication of the additional scheduling offset and the scheduling offset In an embodiment, the additional scheduling offset may comprise a ratio and an offset. The wireless device may determine the K slots where K may be a sum of a multiplication, of the ratio of the additional scheduling offset and the scheduling offset, and the offset, of the additional scheduling offset.

What is claimed is:

1. A method comprising:
   receiving, by a wireless device, one or more configuration parameters indicating:
   entries of a time domain resource allocation table, wherein each entry of the entries comprises a respective slot offset; and
   a set of scheduling offsets, wherein the set of scheduling offsets is not included in the time domain resource allocation table, each scheduling offset comprising a respective ratio sub-value and a respective scheduling offset sub-value;
   receiving downlink control information (DCI) indicating:
   a first index value indicating a slot offset of a first entry of the entries; and
   a second index value indicating a scheduling offset of the set of scheduling offsets, the scheduling offset comprising a ratio sub-value and a scheduling offset sub-value;
   determining a first slot for receiving downlink data, based on the slot offset indicated by the first index value of the first entry and the scheduling offset indicated by the second index value, wherein the first slot is determined based on the sum of the slot offset multiplied by the ratio sub-value and the scheduling offset sub-value; and
   receiving the downlink data in the first slot.

2. The method of claim 1, wherein each entry of the entries further comprises a starting symbol and a duration, in symbols, of the downlink data.

3. The method of claim 2, wherein the starting symbol and the duration, of each entry of the entries, are jointly encoded as a start and length indicator value (SLIVs).

4. The method of claim 1, wherein the first slot is determined based on the sum of the scheduling offset and the slot offset.

5. The method of claim 1, wherein the one or more configuration parameters indicate the set of scheduling offsets in an order.

6. The method of claim 1, wherein:
the DCI is received via a first cell; and
the DCI schedules the downlink data for a second cell.

7. The method of claim 6, wherein:
the first cell operates with a first subcarrier spacing of one or more first subcarrier spacings;
the second cell operates with a second subcarrier spacing of one or more second subcarrier spacings; and
each of the set of scheduling offsets corresponds to a pair of the one or more first subcarrier spacings and the one or more second subcarrier spacings.

8. The method of claim 7, further comprising determining a ratio between the second subcarrier spacing and the first subcarrier spacing, wherein the one or more configuration parameters indicate a threshold for applying the set of scheduling offsets based on the ratio.

9. The method of claim 8, wherein a first scheduling offset is zero in response to the ratio not satisfying the threshold.

10. The method of claim 1, wherein the downlink data is one or more physical downlink shared channels (PDSCHs).

11. A wireless device comprising:
one or more processors; and
memory storing instructions that, when executed by the one or more processors, cause the wireless device to:
receive one or more configuration parameters indicating:
entries of a time domain resource allocation table, wherein each entry of the entries comprises a respective slot offset; and
a set of scheduling offsets, wherein the set of scheduling offsets is not included in the time domain resource allocation table, each scheduling offset comprising a respective ratio sub-value and a respective scheduling offset sub-value;
receive downlink control information (DCI) indicating:
a first index value indicating a slot offset of a first entry of the entries; and
a second index value indicating a scheduling offset of the set of scheduling offsets, the scheduling offset comprising a ratio sub-value and a scheduling offset sub-value;
determine a first slot for receiving downlink data, based on the slot offset indicated by the first index value of the first entry and the scheduling offset indicated by the second index value, wherein the first slot is determined based on the sum of the slot offset multiplied by the ratio sub-value and the scheduling offset sub-value; and
receive the downlink data in the first slot.

12. The wireless device of claim 11, wherein each entry of the entries further comprises a starting symbol and a duration, in symbols, of the downlink data.

13. The wireless device of claim 12, wherein the starting symbol and the duration, of each entry of the entries, are jointly encoded as a start and length indicator value (SLIVs).

14. The wireless device of claim 11, wherein the first slot is determined based on the sum of the scheduling offset and the slot offset.

15. The wireless device of claim 11, wherein the one or more configuration parameters indicate the set of scheduling offsets in an order.

16. The wireless device of claim 11, wherein:
the DCI is received via a first cell; and
the DCI schedules the downlink data for a second cell.

17. The wireless device of claim 16, wherein:
the first cell operates with a first subcarrier spacing of one or more first subcarrier spacings;
the second cell operates with a second subcarrier spacing of one or more second subcarrier spacings; and
each of the set of scheduling offsets corresponds to a pair of the one or more first subcarrier spacings and the one or more second subcarrier spacings.

18. The wireless device of claim 17, wherein the instructions further cause the wireless device to determine a ratio between the second subcarrier spacing and the first subcarrier spacing, wherein:
the one or more configuration parameters indicate a threshold for applying the set of scheduling offsets based on the ratio; and
a first scheduling offset is zero in response to the ratio not satisfying the threshold.

19. The wireless device of claim 11, wherein the downlink data is one or more physical downlink shared channels (PDSCHs).

20. A non-transitory computer-readable medium comprising instructions that, when executed by one or more processors of a wireless device, cause the wireless device to:
receive, from a base station, one or more configuration parameters indicating:
entries of a time domain resource allocation table, wherein each entry of the entries comprises a respective slot offset; and
a set of scheduling offsets, wherein the set of scheduling offsets is not included in the time domain resource allocation table, each scheduling offset comprising a respective ratio sub-value and a respective scheduling offset sub-value;
receive, from the base station, downlink control information (DCI) indicating:
a first index value indicating a slot offset of a first entry of the entries; and
a second index value indicating a scheduling offset of the set of scheduling offsets, the scheduling offset comprising a ratio sub-value and a scheduling offset sub-value;
determine a first slot for receiving downlink data, based on the slot offset indicated by the first index value of the first entry and the scheduling offset indicated by the second index value, wherein the first slot is determined based on the sum of the slot offset multiplied by the ratio sub-value and the scheduling offset sub-value; and
receive, from the base station, the downlink data in the first slot.

* * * * *